US012781817B2

(12) United States Patent
Uno et al.

(10) Patent No.: US 12,781,817 B2
(45) Date of Patent: Nov. 3, 2026

(54) DISC BRAKE AND CARRIER

(71) Applicant: Hitachi Astemo, Ltd., Ibaraki (JP)

(72) Inventors: Miyuki Uno, Hitachinaka (JP); Shinji Suzuki, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 508 days.

(21) Appl. No.: 18/281,334

(22) PCT Filed: Dec. 21, 2021

(86) PCT No.: PCT/JP2021/047397
§ 371 (c)(1),
(2) Date: Sep. 11, 2023

(87) PCT Pub. No.: WO2022/219849
PCT Pub. Date: Oct. 20, 2022

(65) Prior Publication Data

US 2024/0159281 A1 May 16, 2024

(30) Foreign Application Priority Data

Apr. 13, 2021 (JP) ................................ 2021-067812

(51) Int. Cl.
*F16D 65/00* (2006.01)
*F16D 55/226* (2006.01)
*F16D 55/00* (2006.01)

(52) U.S. Cl.
CPC ....... *F16D 65/0031* (2013.01); *F16D 55/226* (2013.01); *F16D 65/0068* (2013.01); *F16D 2055/0016* (2013.01)

(58) Field of Classification Search
None
See application file for complete search history.

(56) References Cited

U.S. PATENT DOCUMENTS

2007/0000740 A1 1/2007 Raab
2020/0271176 A1 8/2020 Bock et al.

FOREIGN PATENT DOCUMENTS

DE 103 36 984 A1 3/2005
DE 10 2016 108 793 A1 11/2017
DE 102018127039 A1 * 4/2020 ............ B60T 17/221
EP 3 470 700 A1 4/2019
JP 2017-219159 A 12/2017

OTHER PUBLICATIONS

DE-102018127039-A1: English Machine Translation (Year: 2020).*
(Continued)

*Primary Examiner* — Melanie Torres Williams
(74) *Attorney, Agent, or Firm* — MATTINGLY & MALUR, PC

(57) ABSTRACT

A disc brake (10) includes friction pads (24 and 25) that are provided at positions next to a disc rotor (11) in a disc axial direction and provided to be able to move in the disc axial direction, and a carrier (21) that has an inner circumferential surface (21*b*) supporting the friction pads (24 and 25) and formed along an outer circumferential edge of the disc rotor (11) and filter portions (55 and 56) provided on the inner circumferential surface (21*b*) in a manner of facing the outer circumferential edge of the disc rotor (11).

12 Claims, 59 Drawing Sheets

(56) References Cited

OTHER PUBLICATIONS

International Search Report received in corresponding International Application No. PCT/JP2021/047397 dated Feb. 22, 2022.
Written Opinion received in corresponding International Application No. PCT/JP2021/047397 dated Feb. 22, 2022.
Japanese Office Action received in corresponding Japanese Application No. 2023-514331 dated Apr. 16, 2024.
Extended European Search Report received in corresponding European Application No. 21937042.6 dated Mar. 19, 2025.

* cited by examiner

DISC BRAKE AND CARRIER

TECHNICAL FIELD

The present invention relates to a disc brake and a carrier. Priority is claimed on Japanese Patent Application No. 2021-067812, filed Apr. 13, 2021, the content of which is incorporated herein by reference.

BACKGROUND ART

Some disc brakes have a separate-type brake dust collector installed next to a brake caliper (for example, refer to Patent Document 1).

CITATION LIST

Patent Document

[Patent Document 1]
Specification of United States Patent Application, Publication No. 2020/0271176

SUMMARY OF INVENTION

Technical Problem

There is a demand for efficient collection of brake dust.

An object of the present invention is to provide a disc brake and a carrier in which brake dust can be efficiently collected.

Solution to Problem

In order to achieve the foregoing object, an aspect according to a disc brake of the present invention includes a friction pad that is provided at a position next to a disc rotor in a disc axial direction and provided to be able to move in the disc axial direction, and a carrier that has an inner circumferential surface supporting the friction pad and formed along an outer circumferential edge of the disc rotor and a filter portion provided on the inner circumferential surface in a manner of facing the outer circumferential edge of the disc rotor.

An aspect according to a carrier of the present invention includes an inner circumferential surface that supports a friction pad and is formed along an outer circumferential edge of a disc rotor, and a filter portion that is provided on the inner circumferential surface in a manner of facing the outer circumferential edge of the disc rotor.

Advantageous Effects of Invention

According to the present invention, brake dust can be efficiently collected.

DESCRIPTION OF EMBODIMENTS

First Embodiment

A first embodiment will be described below with reference to FIGS. 1 to 35. A disc brake 10 of the first embodiment is for a vehicle such as an automobile and applies a braking force to a vehicle. Specifically, it is for braking a front wheel of a four-wheeled automobile. As illustrated in FIGS. 1 to 5, the disc brake 10 brakes a vehicle by stopping rotation of a discoidal disc rotor 11 which rotates together with a wheel (not illustrated). Hereinafter, a state in which the disc brake 10 is attached to a vehicle will be described.

In the following description, an extending direction of a center axis of the disc rotor 11 will be referred to as a disc axial direction, a radial direction of the disc rotor 11 will be referred to as a disc radial direction, and a circumferential direction, namely, a rotation direction of the disc rotor 11 will be referred to as a disc circumferential direction. In addition, a center axis side of the disc rotor 11 in the disc radial direction will be referred to as an inward side in the disc radial direction, and a side opposite to the center axis of the disc rotor 11 in the disc radial direction will be referred to as an outward side in the disc radial direction. In addition, the outward side of the vehicle in the disc axial direction will be referred to as the outward side in the disc axial direction, and the inward side of the vehicle in the disc axial direction will be referred to as the inward side in the disc axial direction. In addition, an entrance side of the disc rotor 11 in a rotation direction R when the vehicle moves forward will be referred to as a disc entrance side, and an exit side of the disc rotor 11 in the rotation direction R when the vehicle moves forward will be referred to as a disc exit side.

Figure 1:
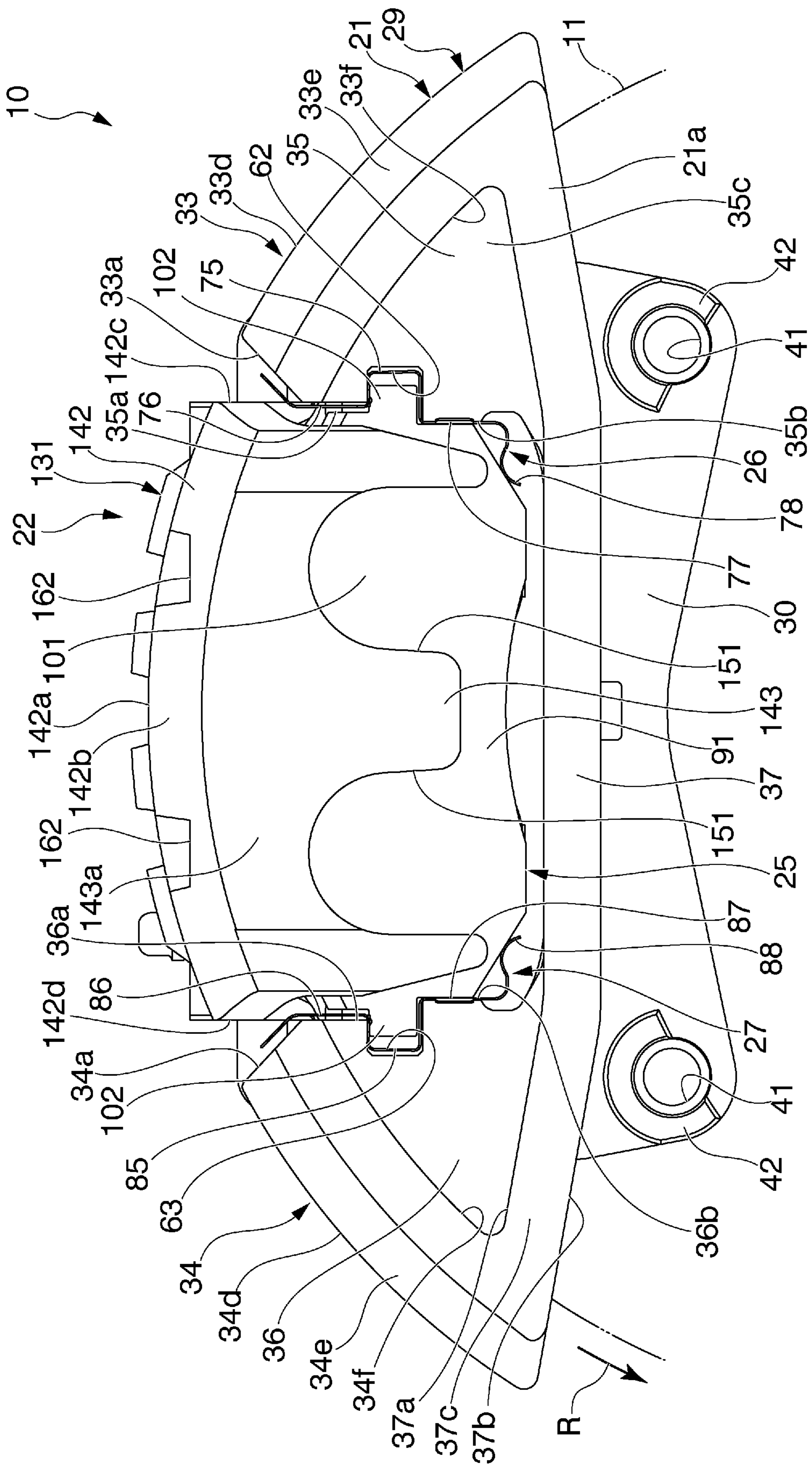
FIG. 1 is a front view illustrating a disc brake of a first embodiment.
Figure 4:
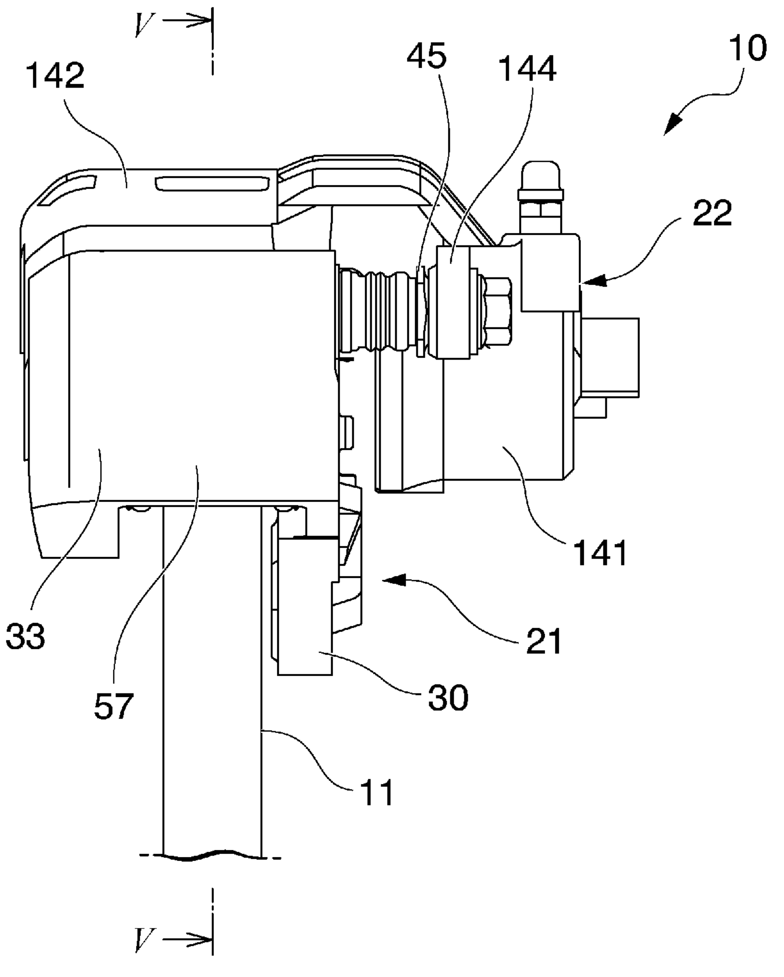
FIG. 4 is a side view illustrating the disc brake of the first embodiment.
Figure 5:
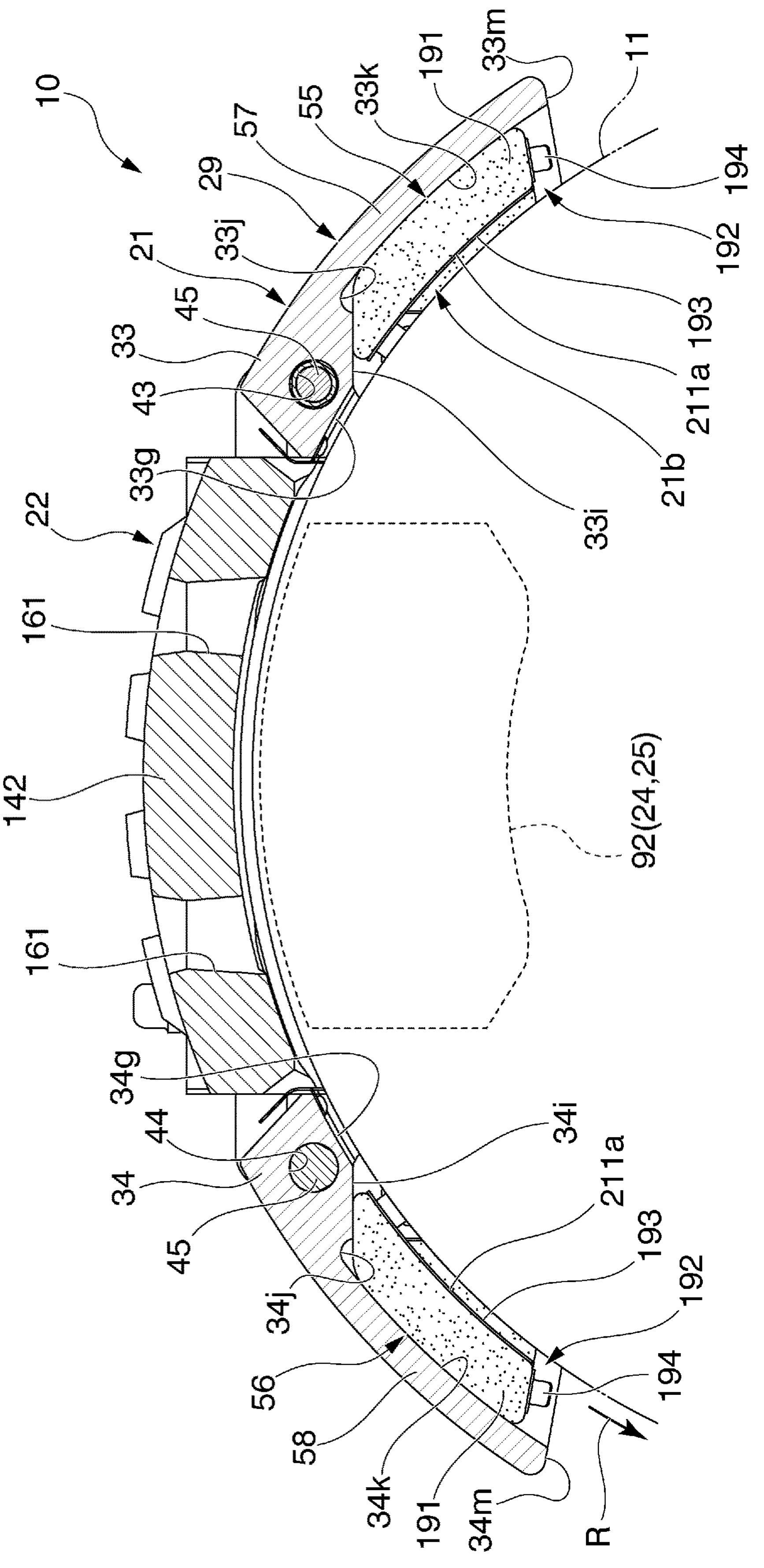
FIG. 5 is a cross-sectional view along V-V in FIG. 4 illustrating the disc brake of the first embodiment.
Figure 6:
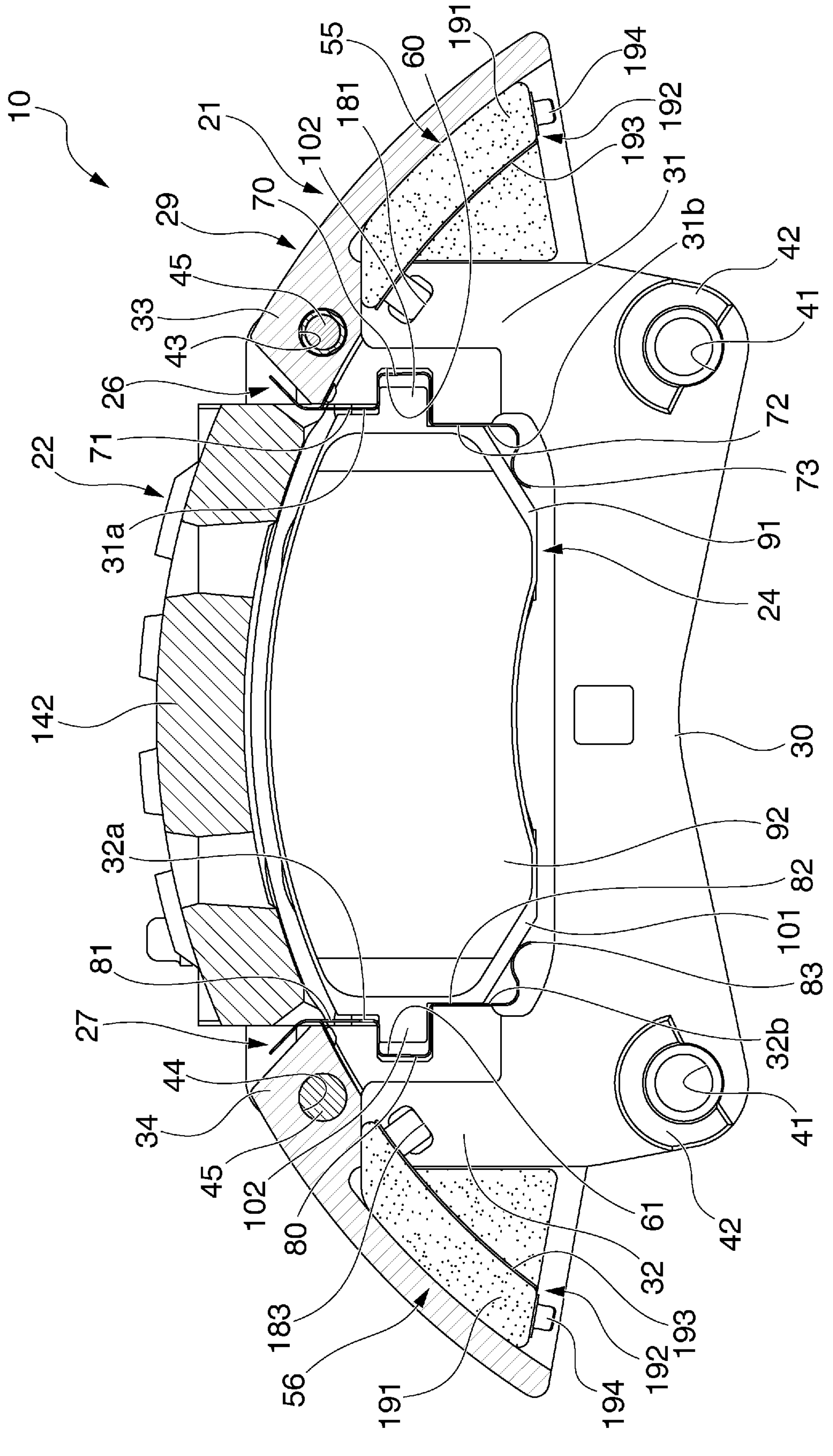
FIG. 6 is a cross-sectional view along V-V in FIG. 4 illustrating the disc brake of the first embodiment excluding a disc.

As illustrated in FIGS. 1 to 6, the disc brake 10 includes a carrier 21 and a caliper 22. In addition, the disc brake 10 includes a pair of boots 23 illustrated in FIGS. 2 and 3, a pair of friction pads 24 and 25 illustrated in FIGS. 6 and 1, and a pair of pad spring 26 and 27. The friction pad 24 illustrated in FIG. 6 is disposed on the inward side in the disc axial direction with respect to the disc rotor 11, and the friction pad 25 illustrated in FIG. 1 is disposed on the outward side in the disc axial direction with respect to the disc rotor 11. The pad spring 26 is disposed on the disc entrance side in the carrier 21. The pad spring 27 is disposed on the disc exit side in the carrier 21.

Figure 7:
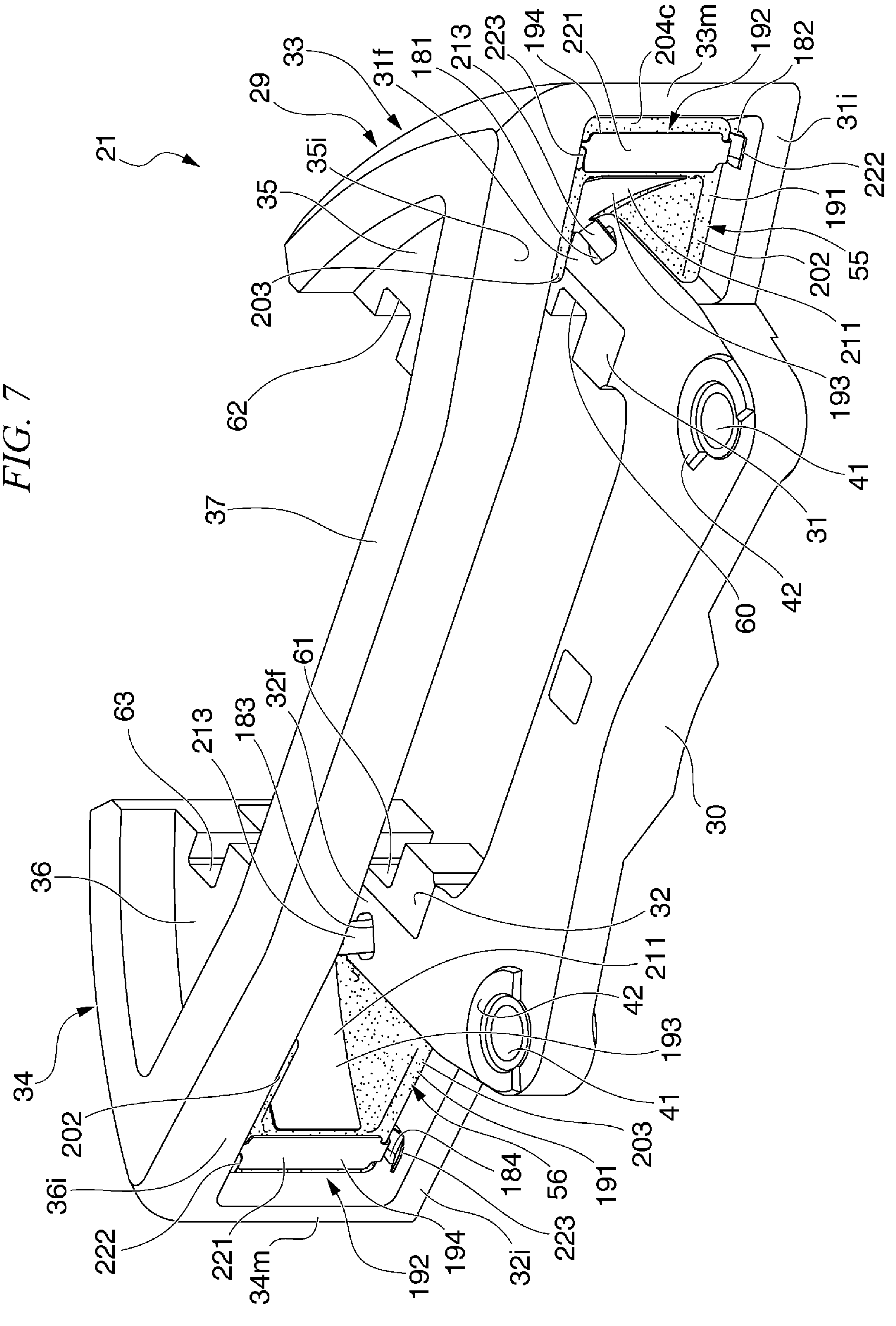
FIG. 7 is a perspective view illustrating a carrier of the disc brake of the first embodiment.
Figure 8:
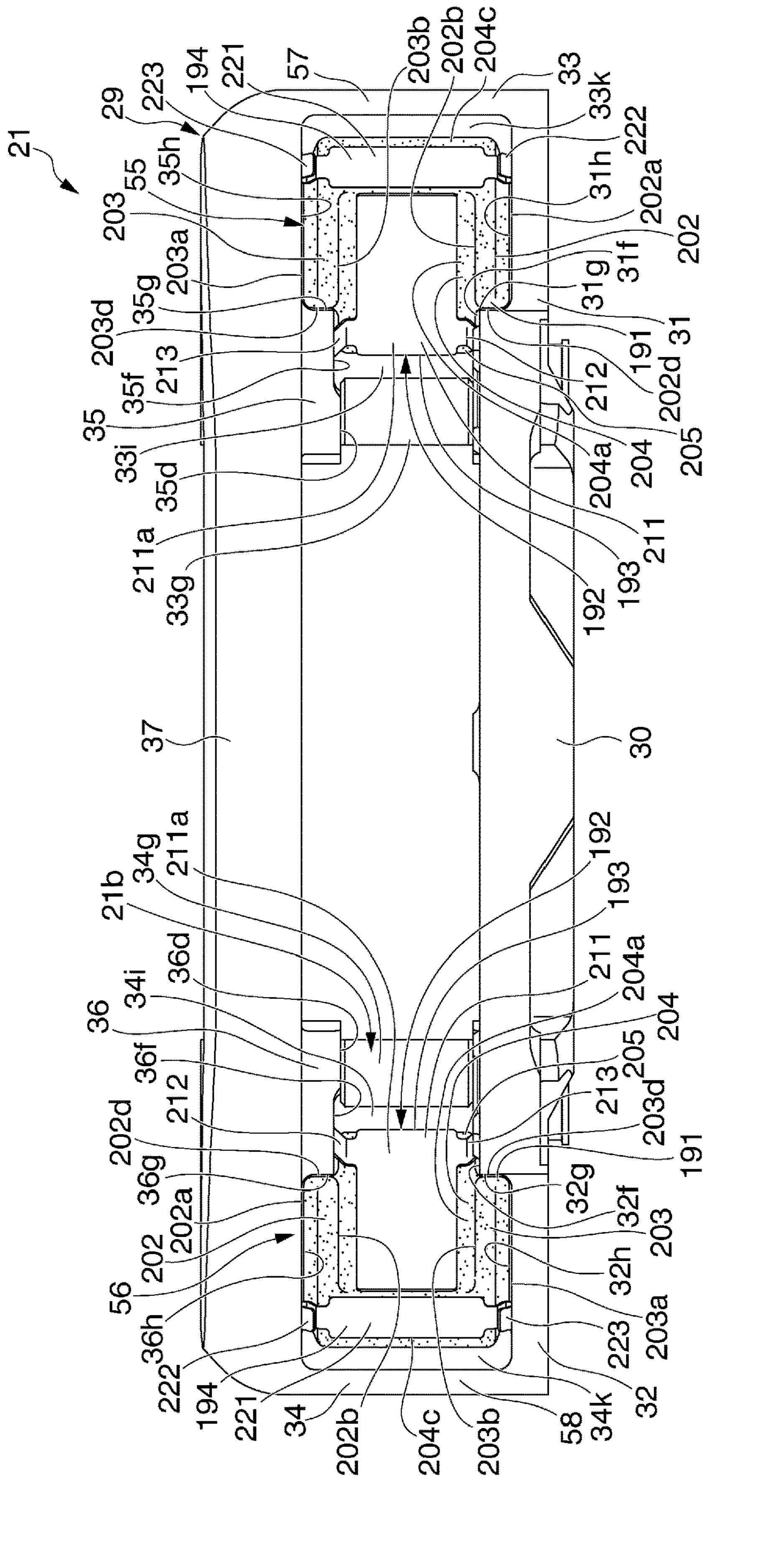
FIG. 8 is a view illustrating the carrier of the disc brake of the first embodiment viewed from the inward side in the disc radial direction.
Figure 9:
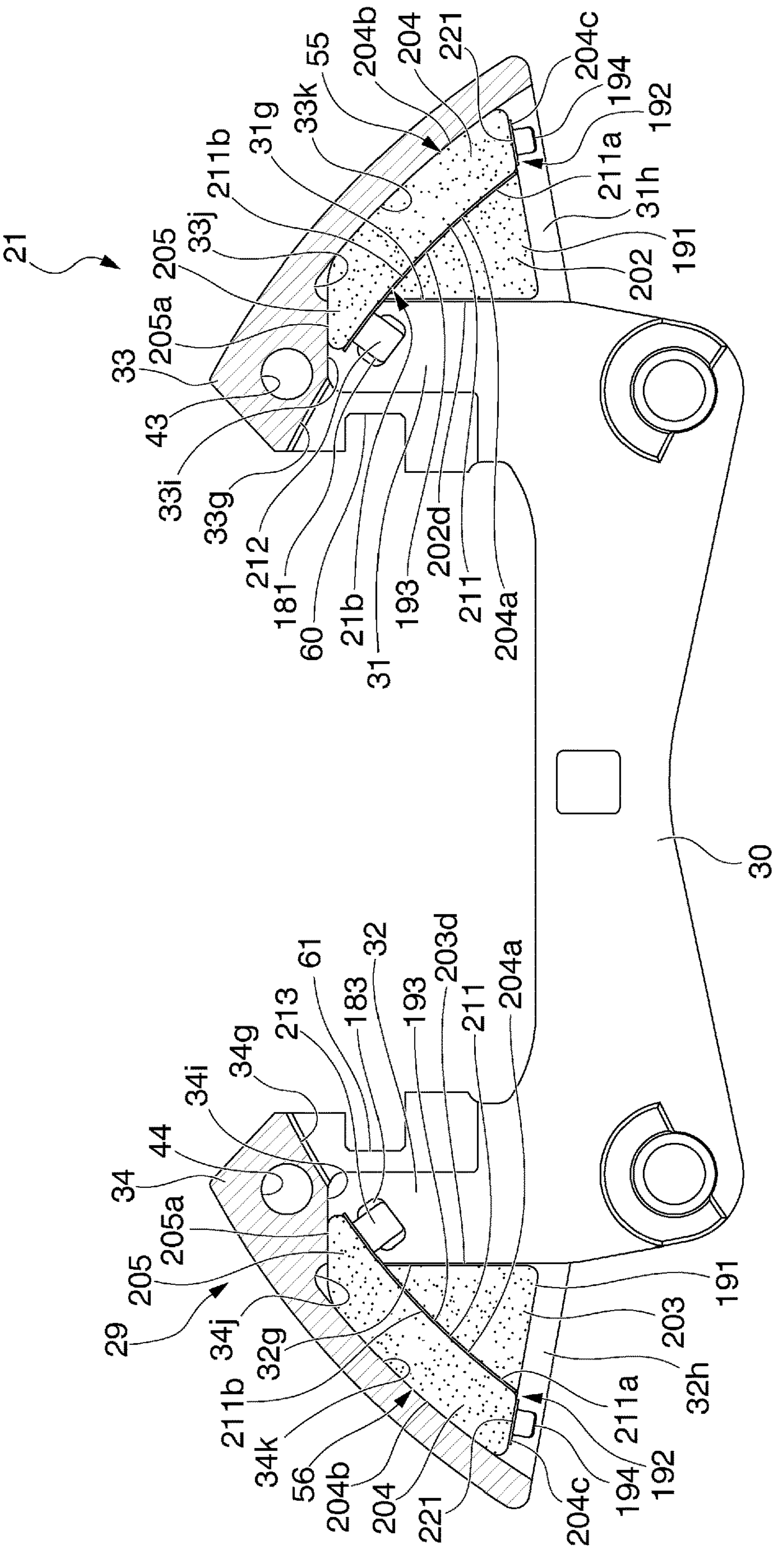
FIG. 9 is a cross-sectional view along V-V in FIG. 4 illustrating the carrier of the disc brake of the first embodiment.

As illustrated in FIGS. 7 to 9, the carrier 21 has a carrier main body 29 and a pair of filter portions 55 and 56.

The carrier main body 29 is an integrally formed product made of a metal and has the shape illustrated in FIGS. 10 to 15. The carrier main body 29 has a shape elongated in the disc circumferential direction. The carrier main body 29 has a fixed portion 30 illustrated in FIGS. 10 to 14, a pair of inner side pad support portions 31 and 32 illustrated in FIGS. 12 and 14, and a pair of outer circumferential frame portions 33 and 34 illustrated in FIGS. 10 to 12, 14, and 15. In addition, the carrier main body 29 has a pair of outer side pad support portions 35 and 36 illustrated in FIGS. 10 to 12 and 15 and a coupling beam portion 37. The carrier main body 29 has a shape of mirror symmetry based on the center in the disc circumferential direction.

Figure 3:
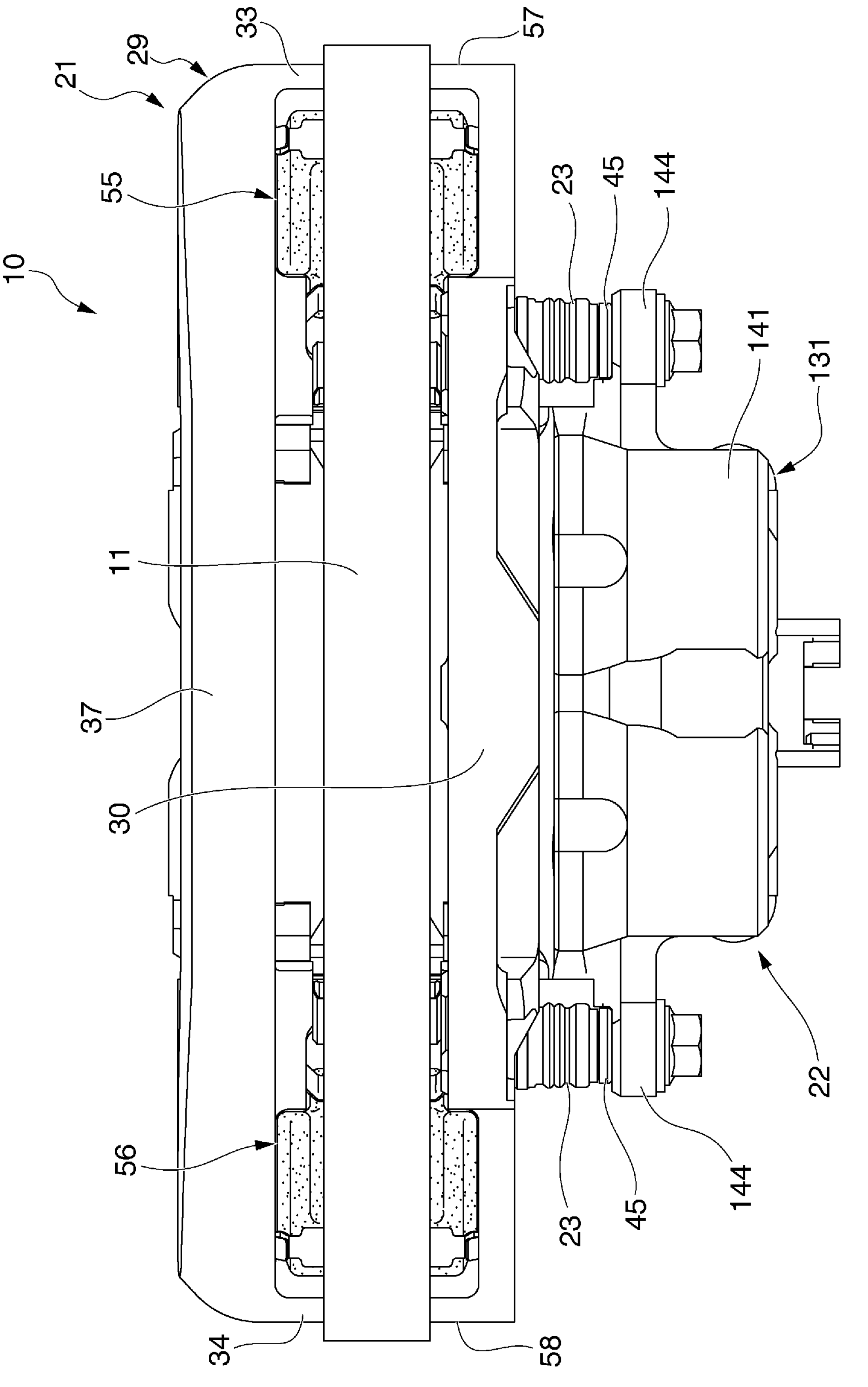
FIG. 3 is a view illustrating the disc brake of the first embodiment viewed from an inward side in a disc radial direction.

As illustrated in FIGS. 3 and 4, the fixed portion 30 is disposed on one side in the disc axial direction with respect to the disc rotor 11 and fixed to a non-rotation part (not illustrated) of the vehicle. Here, the non-rotation part of the vehicle having the carrier main body 29 attached thereto is disposed on the inward side in the disc axial direction with respect to the disc rotor 11, and the fixed portion 30 attached to this non-rotation part is also disposed on the inward side in the disc axial direction with respect to the disc rotor 11. As illustrated in FIG. 6, the fixed portion 30 is disposed in a manner of extending in the disc circumferential direction. The fixed portion 30 is provided with a pair of attachment boss portions 42 respectively having attachment holes 41 penetrating the fixed portion 30 in the disc axial direction in both end portions in the disc circumferential direction. The fixed portion 30 is attached to the non-rotation part of the vehicle in the pair of attachment boss portions 42.

As illustrated in FIG. 9, both the pair of inner side pad support portions 31 and 32 have a plate shape extending orthogonally with respect to the disc axial direction. The inner side pad support portion 31 on the disc entrance side extends to the outward side in the disc radial direction and the disc entrance side from an end portion of the fixed portion 30 on the disc entrance side. In addition, the inner side pad support portion 32 on the disc exit side extends to the outward side in the disc radial direction and the disc exit side from an end portion of the fixed portion 30 on the disc exit side. Similar to the fixed portion 30, the pair of inner side pad support portions 31 and 32 are disposed on the inward side in the disc axial direction with respect to the disc rotor 11.

Figure 12:
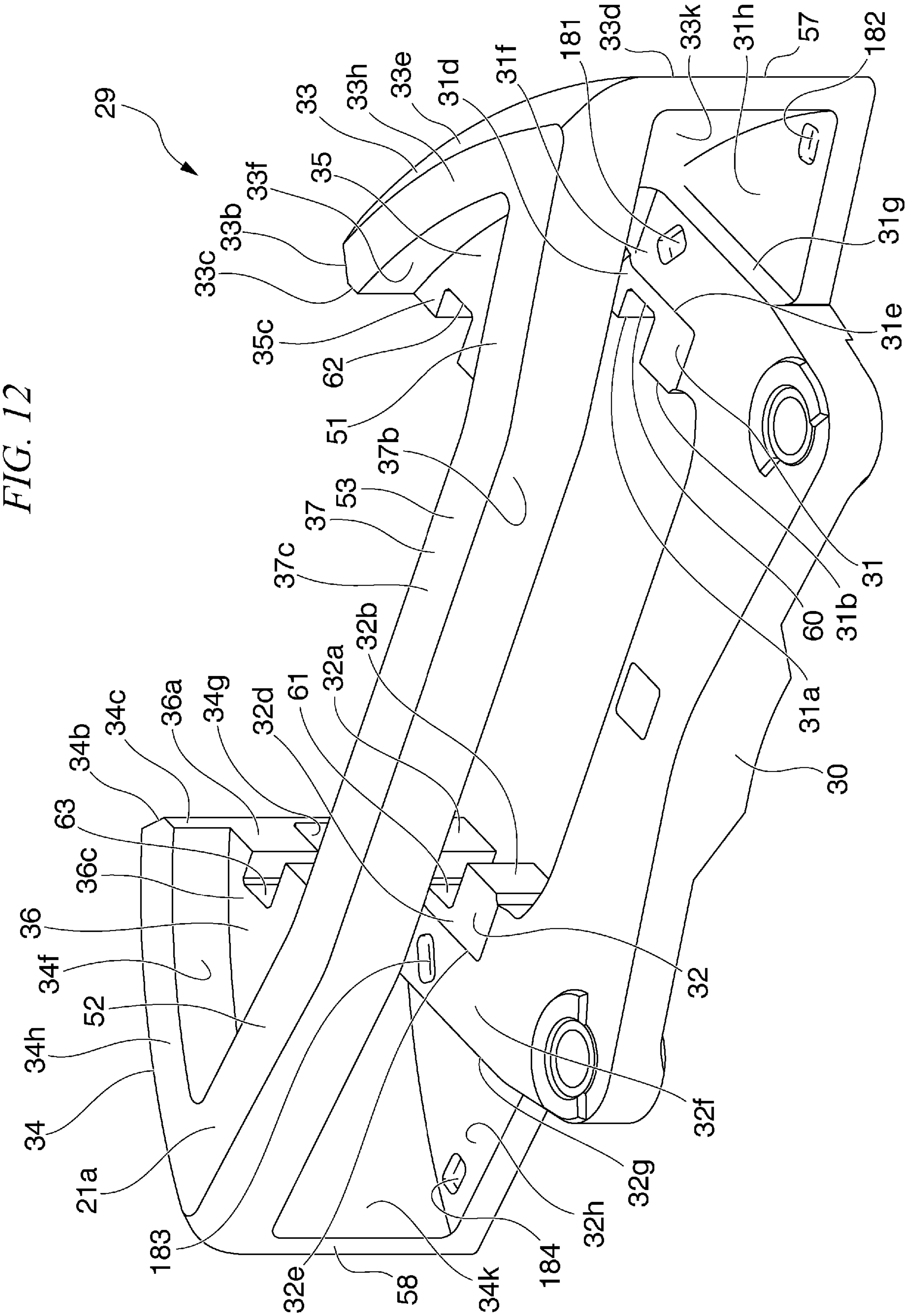
FIG. 12 is another perspective view illustrating the carrier main body of the disc brake of the first embodiment.
Figure 13:
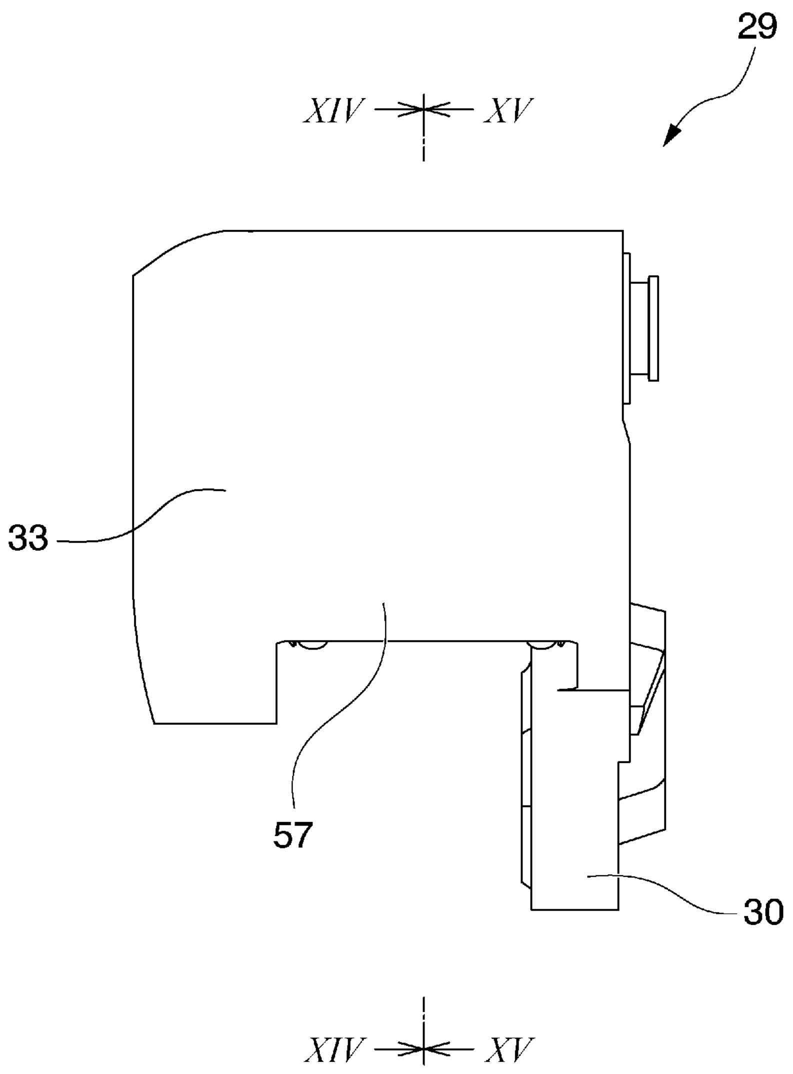
FIG. 13 is a side view illustrating the carrier main body of the disc brake of the first embodiment.

As illustrated in FIG. 12, the outer circumferential frame portion 33 on the disc entrance side extends in the disc axial direction toward the outward side in the disc axial direction from an end edge portion of the inner side pad support portion 31 on the disc entrance side on the outward side in the disc radial direction. In addition, the outer circumferential frame portion 34 on the disc exit side extends in the disc axial direction toward the outward side in the disc axial direction from an end edge portion of the inner side pad support portion 32 on the disc exit side on the outward side in the disc radial direction.

Figure 2:
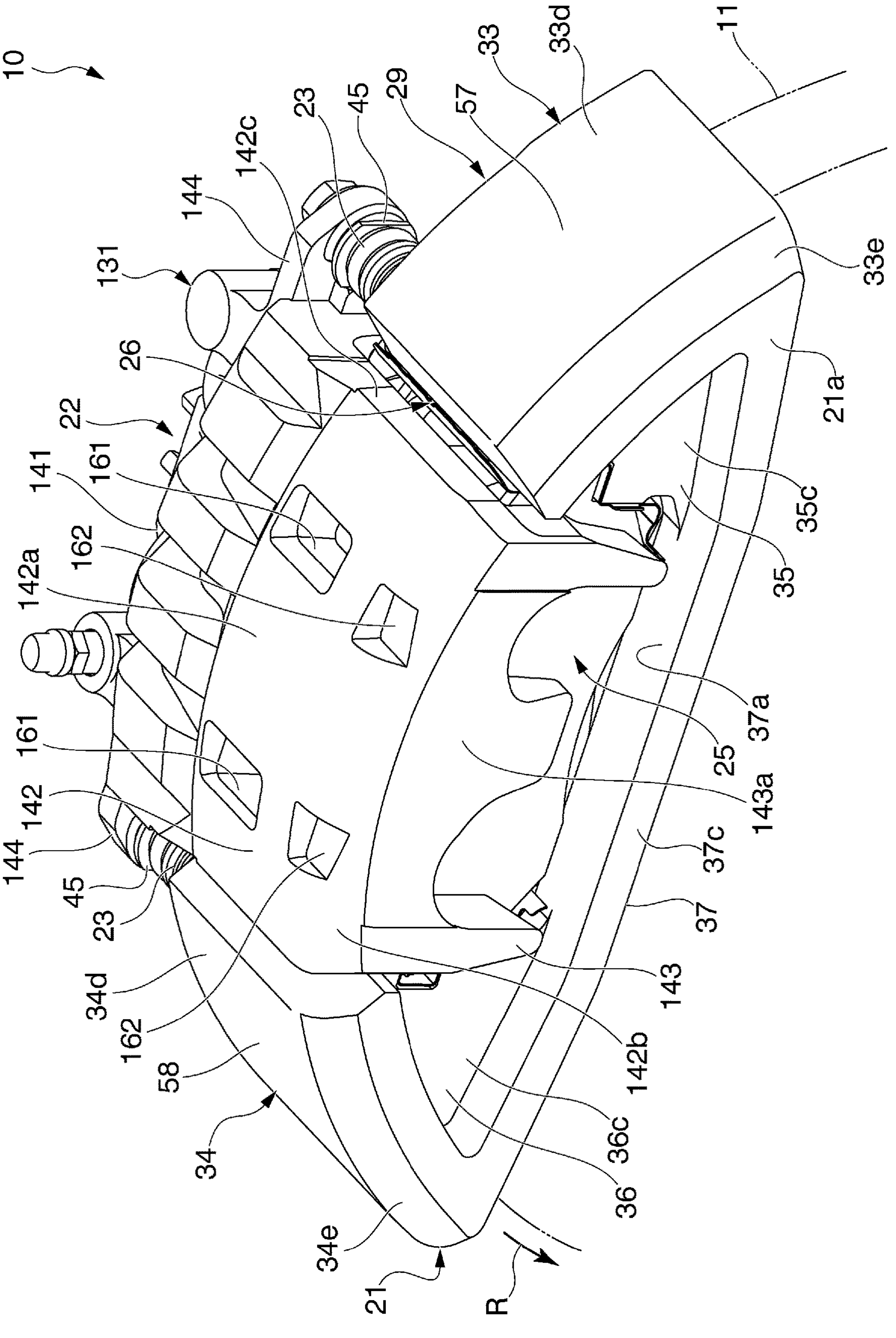
FIG. 2 is a perspective view illustrating the disc brake of the first embodiment.

As illustrated in FIG. 2, the outer circumferential frame portion 33 on the disc entrance side straddles an outer circumferential side of the disc rotor 11 in the disc axial direction and has an umbrella shape covering the disc rotor 11 on the outward side in the disc radial direction. The outer circumferential frame portion 33 extends in the disc circumferential direction. The outer circumferential frame portion 34 on the disc exit side also straddles the outer circumferential side of the disc rotor 11 in the disc axial direction and has an umbrella shape covering the disc rotor 11 on the outward side in the disc radial direction. The outer circumferential frame portion 34 also extends in the disc circumferential direction. Both the pair of outer circumferential frame portions 33 and 34 are curved in an arc shape along an outer circumferential surface of the disc rotor 11.

Figure 10:
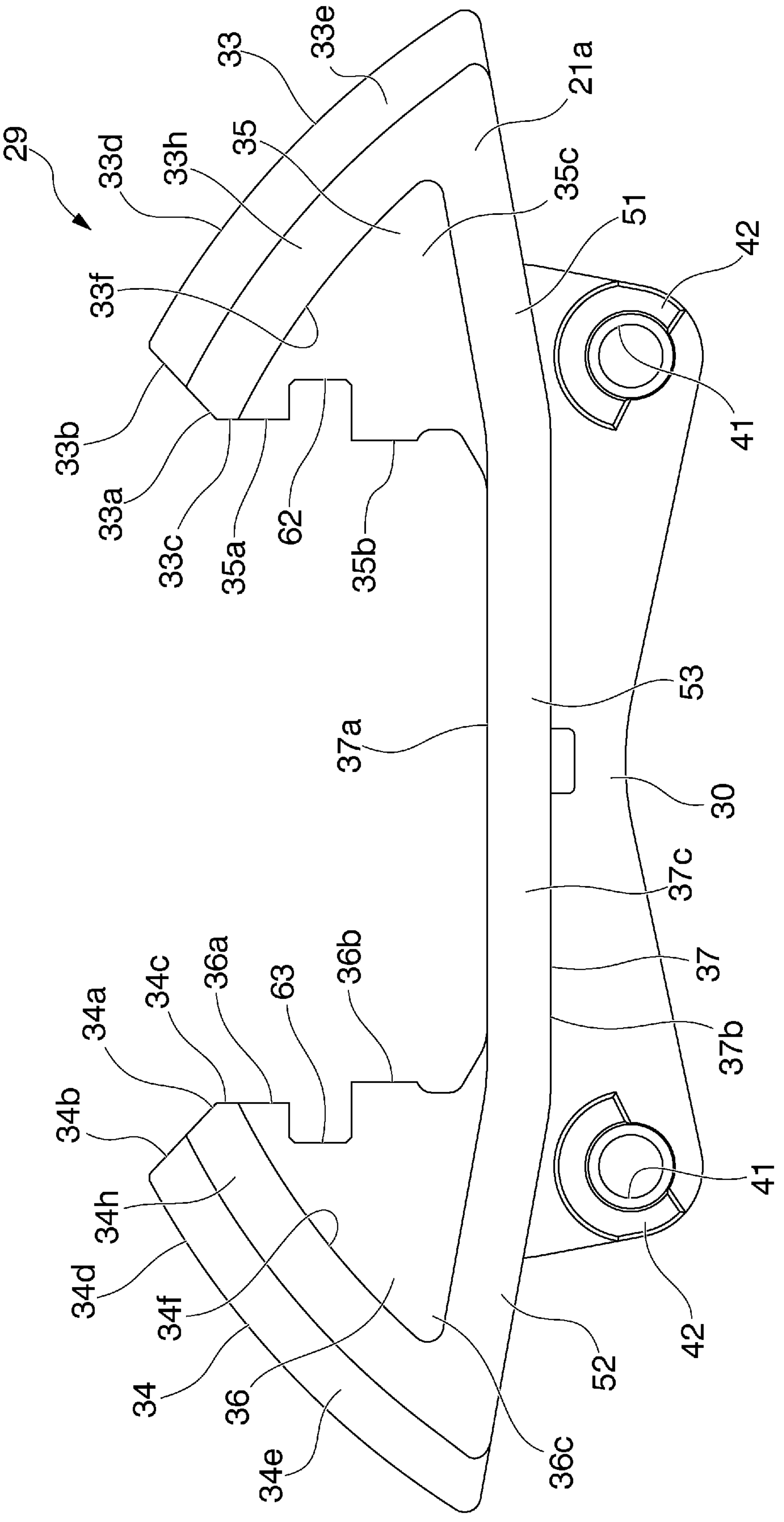
FIG. 10 is a front view illustrating a carrier main body of the disc brake of the first embodiment.

As illustrated in FIG. 10, in the pair of outer circumferential frame portions 33 and 34, facing surfaces **33*a* and 34*a* facing each other are respectively formed on sides closer to each other in the disc circumferential direction. The facing surface 33*a* formed on the outer circumferential frame portion 33 on the disc entrance side is made up of an outward side facing surface portion 33*b* on the outward side in the disc radial direction and an inward side facing surface portion 33*c* on the inward side in the disc radial direction. The facing surface 34*a* formed on the outer circumferential frame portion 34 on the disc exit side is made up of an outward side facing surface portion 34***b* on the outward side in the disc radial direction and an inward side facing surface portion 34*c* on the inward side in the disc radial direction. All the outward side facing surface portions 33*b* and 34*b* and the inward side facing surface portions 33*c* and 34*c* extend in the disc axial direction. The inward side facing surface portions 33*c* and 34*c* are parallel to each other.

Here, a line which connects center positions of the carrier 21 and the carrier main body 29 in the disc circumferential direction and a disc center axis and extends in the disc radial direction will be regarded as a reference line in the disc radial direction. Consequently, the inward side facing surface portions 33*c* and 34*c* extend parallel to this reference line in the disc radial direction. The outward side facing surface portion 33*b* is inclined with respect to the inward side facing surface portion 33*c* in a manner of being away from the inward side facing surface portion 34*c* in the disc circumferential direction toward the outward side in the disc radial direction. The outward side facing surface portion 34*b* is inclined with respect to the inward side facing surface portion 34*c* in a manner of being away from the inward side facing surface portion 33*c* in the disc circumferential direction toward the outward side in the disc radial direction. In the carrier 21 and the carrier main body 29, a central side in the disc circumferential direction will be regarded as the inward side in the disc circumferential direction, and a side opposite to the center in the disc circumferential direction will be regarded as the outward side in the disc circumferential direction.

In the pair of outer circumferential frame portions 33 and 34, outer circumferential end surfaces 33*d* and 34*d* facing the outward side in the disc radial direction are respectively formed in end portions on the outward side in the disc radial direction. The outer circumferential end surface 33*d* formed in the outer circumferential frame portion 33 and the outer circumferential end surface 34*d* formed in the outer circumferential frame portion 34 are disposed on the same cylindrical surface. The pair of outer circumferential end surfaces 33*d* and 34*d* are provided in the carrier 21 and the carrier main body 29 on the outermost side in the disc radial direction.

Figure 11:
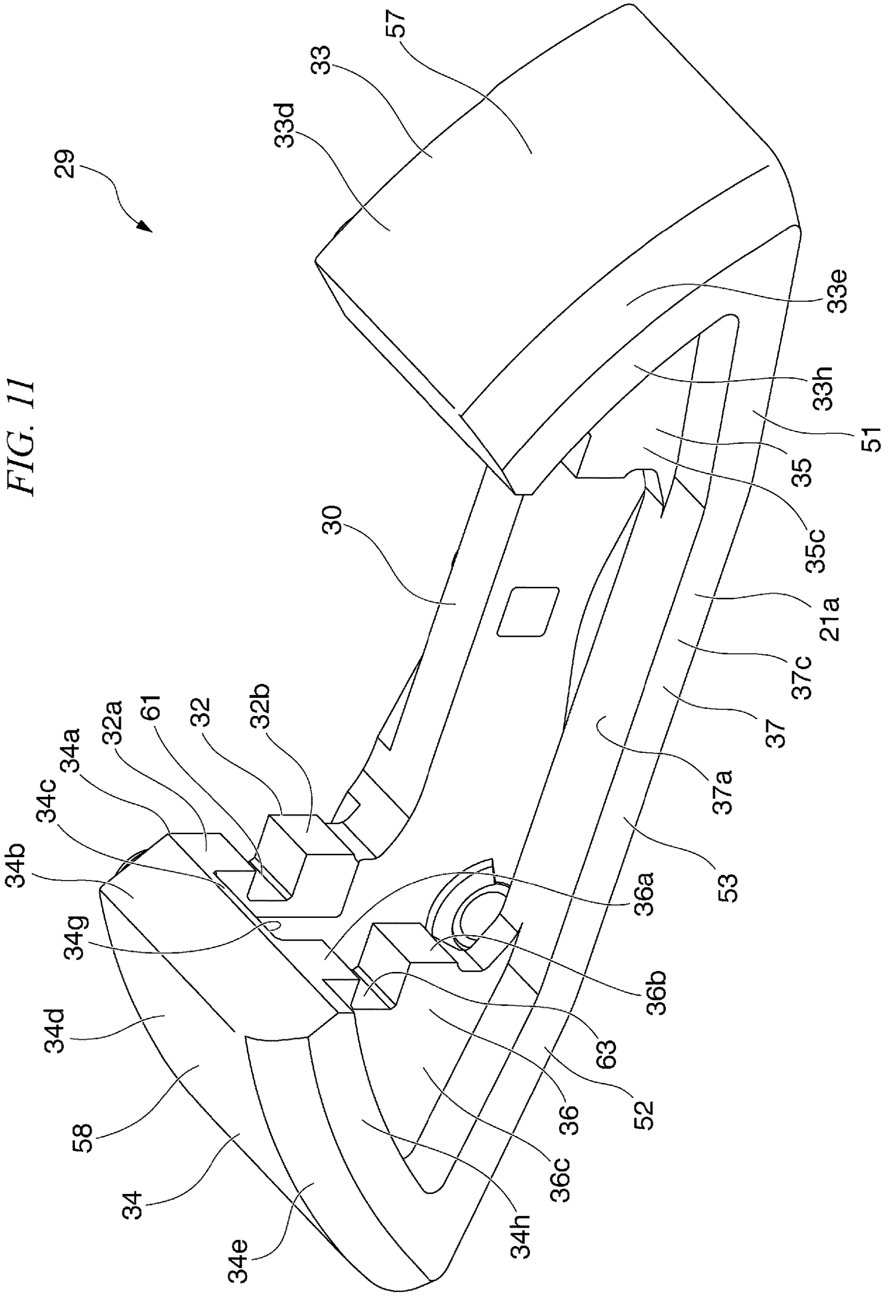
FIG. 11 is a perspective view illustrating the carrier main body of the disc brake of the first embodiment.

As illustrated in FIG. 11, in the outer circumferential frame portion 33 on the disc entrance side, a chamfer 33*e* is formed adjacent to the outward side on the outer circumferential end surface 33*d* thereof in the disc axial direction. In the outer circumferential frame portion 34 on the disc exit side, a chamfer 34*e* is formed adjacent to the outward side on the outer circumferential end surface 34*d* thereof in the disc axial direction. The chamfers 33*e* and 34*e* face the outward side in the disc radial direction and the outward side in the disc axial direction. The chamfers 33*e* and 34*e* have a tapered shape in a manner of being positioned on the inward side in the disc radial direction toward the outward side in the disc axial direction. The chamfer 33*e* and the chamfer 34*e* are disposed on the same tapered surface.

As illustrated in FIG. 12, in the pair of outer circumferential frame portions 33 and 34, inner circumferential end surfaces 33*f* and 34*f* facing the inward side in the disc radial direction are formed on the outward side in the disc axial direction from the respective outer side pad support portions 35 and 36. The inner circumferential end surface 33*f* formed in the outer circumferential frame portion 33 and the inner circumferential end surface 34*f* formed in the outer circumferential frame portion 34 are disposed on the same cylindrical surface.

Figure 14:
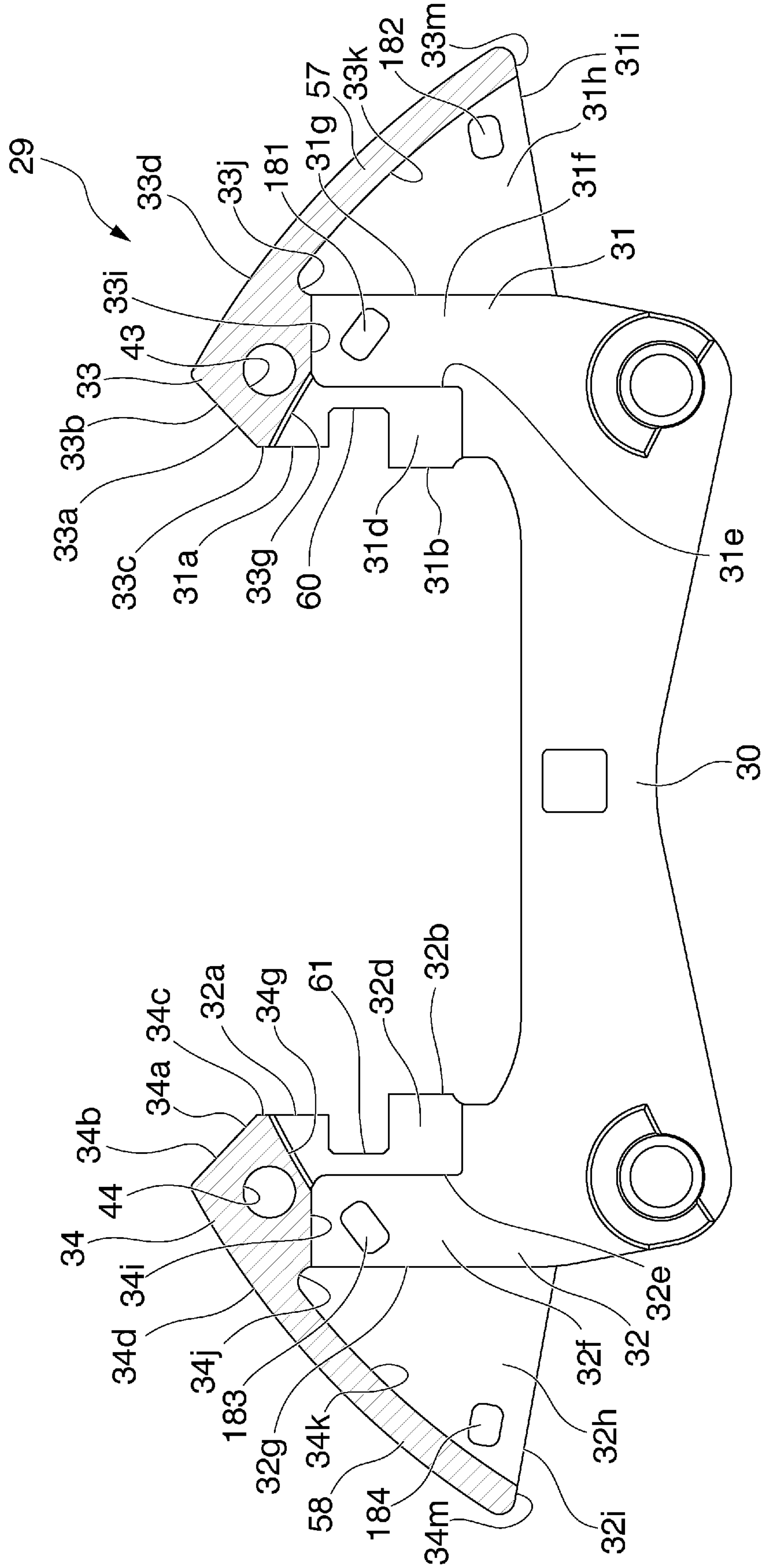
FIG. 14 is a cross-sectional view along XIV-XIV in FIG. 13 illustrating the carrier main body of the disc brake of the first embodiment.
Figure 15:
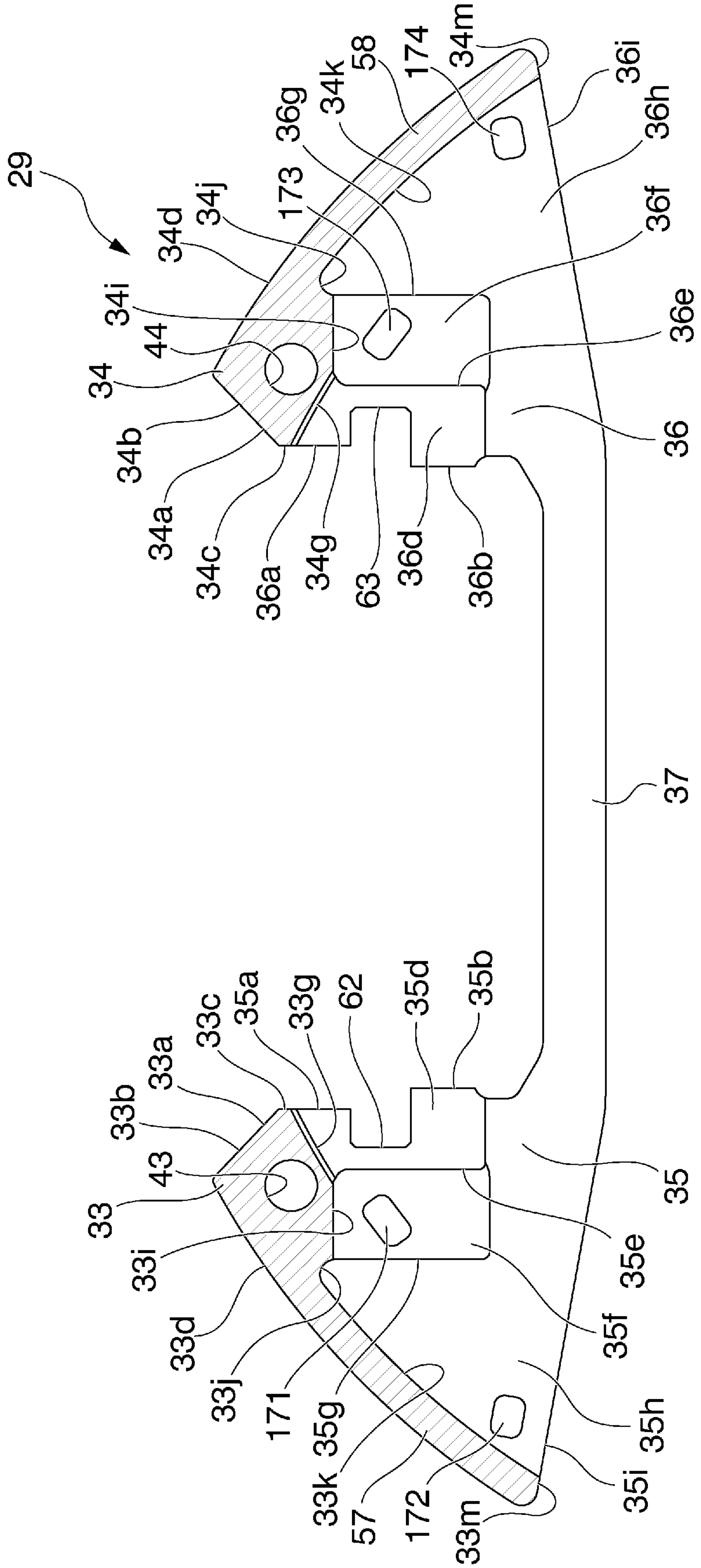
FIG. 15 is a cross-sectional view along XV-XV in FIG. 13 illustrating the carrier main body of the disc brake of the first embodiment.

In the pair of outer circumferential frame portions 33 and 34, inner circumferential end surfaces 33*g* and 34*g* having a flat surface shape facing the inward side in the disc radial direction, as illustrated in FIGS. 14 and 15, are respectively formed between the outer side pad support portions 35 and 36 and between the inner side pad support portions 31 and 32. The inner circumferential end surface 33*g* formed in the outer circumferential frame portion 33 extends to the outward side in the disc circumferential direction from the end edge portion of the inward side facing surface portion 33*c* on the inward side in the disc radial direction. The inner circumferential end surface 34*g* formed in the outer circumferential frame portion 34 extends to the outward side in the disc circumferential direction from the end edge portion of the inward side facing surface portion 34*c* on the inward side in the disc radial direction. The inner circumferential end surfaces 33*g* and 34*g* extend in the disc axial direction and the disc circumferential direction.

In the pair of outer circumferential frame portions 33 and 34, inward side flat surfaces 33*i* and 34*i* facing the inward side in the disc radial direction are respectively formed between the outer side pad support portions 35 and 36 and between the inner side pad support portions 31 and 32. The inward side flat surface 33*i* formed in the outer circumferential frame portion 33 extends in a flat surface shape to the outward side in the disc circumferential direction from the end edge portion of the inner circumferential end surface 33*g* on the outward side in the disc circumferential direction. The inward side flat surface 33*i* extends in the disc axial direction. The inward side flat surface 34*i* formed in the outer circumferential frame portion 34 extends in a flat surface shape to the outward side in the disc circumferential direction from the end edge portion of the inner circumferential end surface 34*g* on the outward side in the disc circumferential direction. The inward side flat surface 34*i* extends in the disc axial direction. The inward side flat surface 33*i* and the inward side flat surface 34*i* are disposed in the same plane. The plane having the inward side flat surface 33*i* and the inward side flat surface 34*i* disposed therein extends orthogonally with respect to the reference line in the disc radial direction.

In the pair of outer circumferential frame portions 33 and 34, inner circumferential recessed surfaces 33*j* and 34*j* facing the inward side in the disc radial direction are respectively formed between the outer side pad support portions 35 and 36 and between the inner side pad support portions 31 and 32. The inner circumferential recessed surface 33*j* formed in the outer circumferential frame portion 33 extends to the outward side in the disc circumferential direction from the end edge portion of the inward side flat surface 33*i* on the outward side in the disc circumferential direction. The inner circumferential recessed surface 33*j* is recessed outward in the disc radial direction from the inward side flat surface 33*i* in a curved surface shape. The inner circumferential recessed surface 34*j* formed in the outer circumferential frame portion 34 extends to the outward side in the disc circumferential direction from the end edge portion of the inward side flat surface 34*i* on the outward side in the disc circumferential direction. The inner circumferential recessed surface 34*j* is recessed outward in the disc radial direction from the inward side flat surface 34*i* in a curved surface shape.

In the pair of outer circumferential frame portions 33 and 34, inner circumferential abutment surfaces 33*k* and 34*k* facing the inward side in the disc radial direction are respectively formed between the outer side pad support portions 35 and 36 and between the inner side pad support portions 31 and 32. The inner circumferential abutment surface 33*k* formed in the outer circumferential frame portion 33 extends to the outward side in the disc circumferential direction from the end edge portion of the inner circumferential recessed surface 33*j* on the outward side in the disc circumferential direction in a curved surface shape. The inner circumferential abutment surface 34*k* formed in the outer circumferential frame portion 34 extends to the outward side in the disc circumferential direction from the end edge portion of the inner circumferential recessed surface 34*j* on the outward side in the disc circumferential direction in a curved surface shape. The inner circumferential abutment surface 33*k* and the inner circumferential abutment surface 34*k* are disposed on the same cylindrical surface centering on the disc center axis.

In the outer circumferential frame portion 33, a circumferential direction end surface 33*m* having a flat surface shape positioned at an outer end in the disc circumferential direction is formed between the outer side pad support portions 35 and 36 and between the inner side pad support portions 31 and 32. In the outer circumferential frame portion 34, a circumferential direction end surface 34*m* having a flat surface shape positioned at the outer end in the disc circumferential direction is formed between the outer side pad support portions 35 and 36 and between the inner side pad support portions 31 and 32. Here, the inner side pad support portion 31 illustrated in FIG. 14 and the outer side pad support portion 35 illustrated in FIG. 15 extend to the circumferential direction end surface 33*m* in the disc circumferential direction, and the inner side pad support portion 32 illustrated in FIG. 14 and the outer side pad support portion 36 illustrated in FIG. 15 extend to the circumferential direction end surface 34*m* in the disc circumferential direction.

As illustrated in FIG. 5, in the pair of outer circumferential frame portions 33 and 34, the inner circumferential end surfaces 33*g* and 34*g*, the inward side flat surfaces 33*i* and 34*i*, the inner circumferential recessed surfaces 33*j* and 34*j*, and the inner circumferential abutment surfaces 33*k* and 34*k* respectively face each other in the disc radial direction with respect to the disc rotor 11. The inner circumferential end surfaces 33*g* and 34*g*, the inward side flat surfaces 33*i* and 34*i*, the inner circumferential recessed surfaces 33*j* and 34*j*, the inner circumferential abutment surfaces 33*k* and 34*k*, and the circumferential direction end surfaces 33*m* and 34*m* are at positions overlapping the disc rotor 11 in the disc axial direction.

As illustrated in FIG. 12, in the outer circumferential frame portion 33, a range between the inner side pad support portion 31 and the outer side pad support portion 35 in the disc axial direction becomes a disc path portion 57. In the outer circumferential frame portion 34, a range between the inner side pad support portion 32 and the outer side pad support portion 36 in the disc axial direction becomes a disc path portion 58. As illustrated in FIG. 5, in the outer circumferential frame portions 33 and 34, the disc path portions 57 and 58 cover the disc rotor 11 on the outward side in the disc radial direction. The inner circumferential end surface 33*g*, the inward side flat surface 33*i*, the inner circumferential recessed surface 33*j*, the inner circumferential abutment surface 33*k*, and the circumferential direction end surface 33*m* are provided in the disc path portion 57, and the inner circumferential end surface 34*g*, the inward side flat surface 34*i*, the inner circumferential recessed surface 34*j*, the inner circumferential abutment surface 34*k*, and the circumferential direction end surface 34*m* are provided in the disc path portion 58.

As illustrated in FIGS. 11 and 12, in the pair of outer circumferential frame portions 33 and 34, outward side end surfaces 33*h* and 34*h* facing the outward side in the disc axial direction are respectively formed at the end portions on the outward side in the disc axial direction. The outward side end surface 33*h* formed in the outer circumferential frame portion 33 and the outward side end surface 34*h* formed in the outer circumferential frame portion 34 are disposed in the same plane. This plane is a plane extending orthogonally with respect to the disc axial direction.

As illustrated in FIGS. 14 and 15, in the carrier main body 29, a pair of pin insertion holes 43 and 44 extending in the disc axial direction are formed at respective parts of the pair of outer circumferential frame portions 33 and 34 on the inward side in the disc circumferential direction. One pin insertion hole 43 is formed in the outer circumferential frame portion 33 from the end portion on the inward side in the disc axial direction to a predetermined intermediate position. The other pin insertion hole 44 is formed in the outer circumferential frame portion 34 from the end portion on the inward side in the disc axial direction to a predetermined intermediate position.

In the carrier main body 29, a pair of slide pins 45 on both sides of the caliper 22 in the disc circumferential direction illustrated in FIG. 2 are slidably fitted into the pair of pin insertion holes 43 and 44. Accordingly, the carrier main body 29 supports the caliper 22 in the pair of outer circumferential frame portions 33 and 34 thereof in a manner of being able to slide in the disc axial direction. In other words, in the caliper 22, the pair of slide pins 45 provided on both sides in the disc circumferential direction are respectively slidably fitted into the corresponding pin insertion holes 43 and 44 of the carrier main body 29 as illustrated in FIGS. 5 and 6. Accordingly, the caliper 22 is supported by the carrier main body 29 in a manner of being able to move in the disc axial direction.

Both the pair of outer side pad support portions 35 and 36 illustrated in FIG. 15 have a plate shape extending orthogonally with respect to the disc axial direction. As illustrated in FIG. 12, in the pair of outer side pad support portions 35 and 36, one outer side pad support portion 35 on the disc entrance side extends to the inward side in the disc radial direction from an intermediate position of the outer circumferential frame portion 33 on the disc entrance side on the outward side in the disc axial direction from the inner side pad support portion 31. In the pair of outer side pad support portions 35 and 36, the other outer side pad support portion 36 on the disc exit side extends to the inward side in the disc radial direction from an intermediate position of the outer circumferential frame portion 34 on the disc exit side on the outward side in the disc axial direction from the inner side pad support portion 32. As illustrated in FIG. 2, the pair of outer side pad support portions 35 and 36 are disposed on the outward side in the disc axial direction with respect to the disc rotor 11.

As illustrated in FIG. 12, the pair of outer side pad support portions 35 and 36 are positioned on the inward side in the disc axial direction from the respective outward side end surfaces 33*h* and 34*h* of the pair of outer circumferential frame portions 33 and 34. In other words, the pair of outer circumferential frame portions 33 and 34 protrude to the outward side in the disc axial direction beyond respective outward side end surfaces 35*c* and 36*c* in the end portions of the pair of outer side pad support portions 35 and 36 on the outward side in the disc axial direction. The outward side end surface 35*c* of the outer side pad support portion 35 and the outward side end surface 36*c* of the outer side pad support portion 36 are disposed in the same plane in a manner of facing the outward side in the disc axial direction. This plane is parallel to the plane in which the outward side end surfaces 33*h* and 34*h* of the pair of outer circumferential frame portions 33 and 34 are disposed.

The coupling beam portion 37 extends in the disc circumferential direction and couples parts of the pair of outer side pad support portions 35 and 36 on the inward side in the disc radial direction to each other. In addition, the end portion of the coupling beam portion 37 on the disc entrance side is coupled to the end portion of the outer circumferential frame portion 33 on the disc entrance side. The end portion of the coupling beam portion 37 on the disc exit side is coupled to the end portion of the outer circumferential frame portion 34 on the disc exit side. Similar to the pair of outer side pad support portions 35 and 36, the coupling beam portion 37 is disposed on the outward side in the disc axial direction with respect to the disc rotor 11.

As illustrated in FIG. 11, in the coupling beam portion 37, an outward facing end surface 37*a* facing the outward side in the disc radial direction is formed in the end portion on the outward side in the disc radial direction, and as illustrated in FIG. 12, an inward facing end surface 37*b* facing the inward side in the disc radial direction is formed in the end portion on the inward side in the disc radial direction. In the coupling beam portion 37, an outward side end surface 37*c* facing the outward side in the disc axial direction is formed in the end portion on the outward side in the disc axial direction.

As illustrated in FIG. 11, the coupling beam portion 37 in its entirety protrudes to the outward side in the disc axial direction beyond the respective outward side end surfaces 35*c* and 36*c* of the pair of outer side pad support portions 35 and 36. In other words, the pair of outer side pad support portions 35 and 36 are positioned on the inward side in the disc axial direction from the outward side end surface 37*c* in the end portion of the coupling beam portion 37 on the outward side in the disc axial direction. The outward side end surface 37*c* of the coupling beam portion 37 and the outward side end surfaces 33*h* and 34*h* of the pair of outer circumferential frame portions 33 and 34 are disposed in the same plane and constitute an outward side end surface 21*a* in the end portion on the outward side in the disc axial direction in the carrier 21 and the carrier main body 29.

The coupling beam portion 37 is adjacently connected to the outer circumferential frame portion 33 on the disc entrance side so as to form an acute angle shape. The coupling beam portion 37 is also adjacently connected to the outer circumferential frame portion 34 on the disc exit side so as to form an acute angle shape. In other words, each of the pair of outer circumferential frame portions 33 and 34 is connected to the coupling beam portion 37 in an acute angle shape.

The coupling beam portion 37 is made up of a part constitution portion 51 on the disc entrance side, a part constitution portion 52 on the disc exit side, and an intermediate constitution portion 53 therebetween. The intermediate constitution portion 53 forms a straight line shape and extends orthogonally with respect to the reference line in the disc radial direction. The part constitution portion 51 is at a position overlapping the outer side pad support portion 35 in the disc circumferential direction. The part constitution portion 52 is at a position overlapping the outer side pad support portion 36 in the disc circumferential direction. The intermediate constitution portion 53 is provided at a position between the pair of outer side pad support portions 35 and 36 in the disc circumferential direction. The part constitution portion 51 and the part constitution portion 52 are inclined with respect to the intermediate constitution portion 53 in a manner of being positioned on the outward side in the disc radial direction in a direction of the reference line in the disc radial direction as being away from the intermediate constitution portion 53 in the disc circumferential direction.

As illustrated in FIG. 14, in the pair of inner side pad support portions 31 and 32, a pair of support main body portions 60 and 61 having a recessed shape are formed. As illustrated in FIG. 15, in the pair of outer side pad support portions 35 and 36, a pair of support main body portions 62 and 63 having a recessed shape are formed. These support main body portions 60, 61, 62, and 63 have a similar shape.

As illustrated in FIG. 14, in one inner side pad support portion 31 on the disc entrance side, a support main body portion 60 having a shape recessed toward the outward side in the disc circumferential direction from a surface 31*a* on the outward side in the disc radial direction and a surface 31*b* on the inward side in the disc radial direction located on the inward side thereof in the disc circumferential direction is formed. The surface 31*a* and the surface 31*b* extend in the disc axial direction along the reference line in the disc radial direction. In the inner side pad support portion 31, the surface 31*a* on the outward side in the disc radial direction is disposed on the outward side in the disc circumferential direction from the surface 31*b* on inward side in the disc radial direction. The surface 31*a* and the inward side facing surface portion 33*c* of the outer circumferential frame portion 33 adjacent to the inner side pad support portion 31 are continuously disposed in the same plane.

In the other inner side pad support portion 32 on the disc exit side as well, a support main body portion 61 having a shape recessed toward the outward side in the disc circumferential direction from a surface 32*a* on the outward side in the disc radial direction and a surface 32*b* on the inward side in the disc radial direction located on the inward side thereof in the disc circumferential direction is formed. The surface 32*a* and the surface 32*b* extend in the disc axial direction along the reference line in the disc radial direction. In the inner side pad support portion 32 as well, the surface 32*a* on the outward side in the disc radial direction is disposed on the outward side in the disc circumferential direction from the surface 32*b* on the inward side in the disc radial direction. The surface 32*a* and the inward side facing surface portion 34*c* of the outer circumferential frame portion 34 adjacent to the inner side pad support portion 32 are continuously disposed in the same plane.

In the pair of inner side pad support portions 31 and 32, the surfaces 31*a* and 32*a* thereof are disposed parallel in a manner of being positionally aligned in the disc axial direction and the disc radial direction. In addition, in the pair of inner side pad support portions 31 and 32, the surfaces 31*b* and 32*b* thereof are disposed parallel in a manner of being positionally aligned in the disc axial direction and the disc radial direction. In the pair of inner side pad support portions 31 and 32, the support main body portions 60 and 61 thereof are positionally aligned in the disc axial direction and the disc radial direction. Thus, in the pair of inner side pad support portions 31 and 32, the support main body portions 60 and 61 having a recessed shape recessed in a direction in which they are separated from each other in the disc circumferential direction are formed on sides facing each other. As illustrated in FIG. 6, one friction pad 24 of the pair of friction pads 24 and 25 is supported by the support main body portion 60 provided in the inner side pad support portion 31 and the support main body portion 61 provided in the inner side pad support portion 32.

As illustrated in FIG. 15, in one outer side pad support portion 35, the support main body portion 62 having a shape recessed toward the outward side in the disc circumferential direction from a surface 35*a* on the outward side in the disc radial direction and a surface 35*b* on the inward side in the disc radial direction located on the inward side thereof in the disc circumferential direction is formed. The surface 35*a* and the surface 35*b* extend in the disc axial direction along the reference line in the disc radial direction. In the outer side pad support portion 35, the surface 35*a* positioned on the outward side in the disc radial direction is disposed on the outward side in the disc circumferential direction from the surface 35*b* positioned on the inward side in the disc radial direction. The surface 35*a* and the inward side facing surface portion 33*c* of the outer circumferential frame portion 33 adjacent to the outer side pad support portion 35 are continuously disposed in the same plane.

In the other outer side pad support portion 36 as well, the support main body portion 63 having a shape recessed toward the outward side in the disc circumferential direction from a surface 36*a* on the outward side in the disc radial direction and a surface 36*b* on the inward side in the disc radial direction located on the inward side thereof in the disc circumferential direction is formed. The surface 36*a* and the surface 36*b* extend in the disc axial direction along the reference line in the disc radial direction. In the outer side pad support portion 36, the surface 36*a* on the outward side in the disc radial direction is disposed on the outward side in the disc circumferential direction from the surface 36*b* on the inward side in the disc radial direction. The surface 36*a* and the inward side facing surface portion 34*c* of the outer circumferential frame portion 34 adjacent to the outer side pad support portion 36 are continuously disposed in the same plane.

In the pair of outer side pad support portions 35 and 36, the surfaces 35*a* and 36*a* thereof are disposed parallel in a manner of being positionally aligned in the disc axial direction and the disc radial direction. In addition, in the pair of outer side pad support portions 35 and 36, the surfaces 35*b* and 36*b* thereof are disposed parallel in a manner of being positionally aligned in the disc axial direction and the disc radial direction. In the pair of outer side pad support portions 35 and 36, the support main body portions 62 and 63 thereof are positionally aligned in the disc axial direction and the disc radial direction.

Thus, in the pair of outer side pad support portions 35 and 36, the support main body portions 62 and 63 having a recessed shape recessed in a direction in which they are separated from each other in the disc circumferential direction are formed on sides facing each other. As illustrated in FIG. 1, the other friction pad 25 of the pair of friction pads 24 and 25 is supported by the support main body portion 62 provided in the outer side pad support portion 35 and the support main body portion 63 provided in the outer side pad support portion 36.

Here, as illustrated in FIG. 14, in the pair of outer circumferential frame portions 33 and 34, in the extending direction of the reference line in the disc radial direction, the circumferential direction end surfaces 33*m* and 34*m* are positioned on the inward side in the disc radial direction from the end portions of the surfaces 31*b* and 32*b* of the pair of inner side pad support portions 31 and 32 on the inward side in the disc radial direction. In addition, as illustrated in FIG. 15, in the pair of outer circumferential frame portions 33 and 34, in the extending direction of the reference line in the disc radial direction, the circumferential direction end surfaces 33*m* and 34*m* are positioned on the inward side in the disc radial direction from the end portions of the surfaces 35*b* and 36*b* of the pair of outer side pad support portions 35 and 36 on the inward side in the disc radial direction.

In the outer side pad support portion 35, on the inward side in the disc axial direction, an inward facing end surface 35*d* extending to the outward side in the disc circumferential direction from the support main body portion 62 and the surfaces 35*a* and 35*b*, a small stepped surface 35*e* slightly extending to the outward side in the disc axial direction from the outward side of the inward facing end surface 35*d* in the disc circumferential direction, and an intermediate surface 35*f* extending to the outward side in the disc circumferential direction from the end edge portion of the small stepped surface 35*e* on the outward side in the disc axial direction are formed.

In addition, in the outer side pad support portion 35, a large stepped surface 35*g* extending to the outward side in the disc axial direction from the outward side of the intermediate surface 35*f* in the disc circumferential direction, and an inward facing abutment surface 35*h* extending to the outward side in the disc circumferential direction from the end edge portion of the large stepped surface 35*g* on the outward side in the disc axial direction are formed. The inward facing abutment surface 35*h* extends to the end edge portions of the inner circumferential recessed surface 33*j* and the inner circumferential abutment surface 33*k* on the outward side in the disc axial direction. In addition, the inward facing abutment surface 35*h* extends to a surface portion 35*i* facing the outward side of the outer side pad support portion 35 in the disc circumferential direction. The surface portion 35*i* has a flat surface shape and is inclined in a manner of being positioned on the outward side in the disc radial direction in the direction of the reference line in the disc radial direction as being away from the outer side pad support portion 36 in the disc circumferential direction. The surface portion 35*i* is flush with the circumferential direction end surface 33*m* of the outer circumferential frame portion 33.

The inward facing end surface 35*d*, the intermediate surface 35*f*, and the inward facing abutment surface 35*h* have a flat surface shape extending orthogonally with respect to the disc axial direction. The large stepped surface 35*g* has a flat surface shape in the disc axial direction along the reference line in the disc radial direction.

In the outer side pad support portion 35, a first engagement hole 171 recessed to the outward side in the disc axial direction from the intermediate surface 35*f* is formed on the intermediate surface 35*f*. The first engagement hole 171 is a long hole having a rectangular shape elongated in the disc circumferential direction. In the outer side pad support portion 35, a second engagement hole 172 recessed to the outward side in the disc axial direction from the inward facing abutment surface 35*h* is formed in the vicinity of the end portion of the inward facing abutment surface 35*h* on a side opposite to the outer side pad support portion 36 in the disc circumferential direction. The second engagement hole 172 is a long hole having a rectangular shape elongated along the surface portion 35*i*.

In the outer side pad support portion 36, on the inward side in the disc axial direction, an inward facing end surface 36*d* extending to the outward side in the disc circumferential direction from the support main body portion 63 and the surfaces 36*a* and 36*b*, a small stepped surface 36*e* slightly extending to the outward side in the disc axial direction from the outward side of the inward facing end surface 36*d* in the disc circumferential direction, and an intermediate surface 36*f* extending to the outward side in the disc circumferential direction from the end edge portion of the small stepped surface 36*e* on the outward side in the disc axial direction are formed.

In addition, in the outer side pad support portion 36, a large stepped surface 36*g* extending to the outward side in the disc axial direction from the outward side of the intermediate surface 36*f* in the disc circumferential direction, and an inward facing abutment surface 36*h* extending to the outward side in the disc circumferential direction from the end edge portion of the large stepped surface 36*g* on the outward side in the disc axial direction are formed. The inward facing abutment surface 36*h* extends to the end edge portions of the inner circumferential recessed surface 34*j* and the inner circumferential abutment surface 34*k* on the outward side in the disc axial direction. In addition, the inward facing abutment surface 36*h* extends to a surface portion 36*i* facing the outward side of the outer side pad support portion 36 in the disc circumferential direction. The surface portion 36*i* has a flat surface shape and is inclined in a manner of being positioned on the outward side in the disc radial direction in the direction of the reference line in the disc radial direction as being away from the outer side pad support portion 35 in the disc circumferential direction. The surface portion 36*i* is flush with the circumferential direction end surface 34*m* of the outer circumferential frame portion 34.

The inward facing end surface 36*d*, the intermediate surface 36*f*, and the inward facing abutment surface 36*h* have a flat surface shape extending orthogonally with respect to the disc axial direction. The large stepped surface 36*g* has a flat surface shape in the disc axial direction along the reference line in the disc radial direction. The inward facing end surface 35*d* and the inward facing end surface 36*d* are disposed in the same plane. The intermediate surface 35*f* and the intermediate surface 36*f* are also disposed in the same plane. The inward facing abutment surface 35*h* and the inward facing abutment surface 36*h* are also disposed in the same plane.

In the outer side pad support portion 36, a first engagement hole 173 recessed to the outward side in the disc axial direction from the intermediate surface 36*f* is formed on the intermediate surface 36*f*. The first engagement hole 173 is a long hole having a rectangular shape elongated in the disc circumferential direction. In the outer side pad support portion 36, a second engagement hole 174 recessed to the outward side in the disc axial direction from the inward facing abutment surface 36*h* is formed in the vicinity of the end portion of the inward facing abutment surface 36*h* on a side opposite to the outer side pad support portion 35 in the disc circumferential direction. The second engagement hole 174 is a long hole having a rectangular shape elongated along the surface portion 36*i*.

As illustrated in FIG. 14, in the inner side pad support portion 31, on the outward side in the disc axial direction, an outward facing end surface 31*d* extending to the outward side in the disc circumferential direction from the support main body portion 60 and the surfaces 31*a* and 31*b*, a small stepped surface 31*e* slightly extending to the inward side in the disc axial direction from the outward side of the outward facing end surface 31*d* in the disc circumferential direction, and an intermediate surface 31*f* extending to the outward side in the disc circumferential direction from the end edge portion of the small stepped surface 31*e* on the inward side in the disc axial direction are formed.

In addition, in the inner side pad support portion 31, a large stepped surface 31*g* extending to the inward side in the disc axial direction from the outward side of the intermediate surface 31*f* in the disc circumferential direction, and an outward facing abutment surface 31*h* extending to the outward side in the disc circumferential direction from the end edge portion of the large stepped surface 31*g* on the inward side in the disc axial direction are formed. The outward facing abutment surface 31*h* extends to the end edge portions of the inner circumferential recessed surface 33*j* and the inner circumferential abutment surface 33*k* on the inward side in the disc axial direction. In addition, the outward facing abutment surface 31*h* extends to a surface portion 31*i* facing the outward side of the inner side pad support portion 31 in the disc circumferential direction. The surface portion 31*i* has a flat surface shape and is inclined in a manner of being positioned on the outward side in the disc radial direction in the direction of the reference line in the disc radial direction as being away from the inner side pad support portion 32 in the disc circumferential direction.

The outward facing end surface 31*d*, the intermediate surface 31*f*, and the outward facing abutment surface 31*h* have a flat surface shape extending orthogonally with respect to the disc axial direction. The large stepped surface 31*g* has a flat surface shape in the disc axial direction along the reference line in the disc radial direction. The large stepped surface 31*g* and the large stepped surface 35*g* are disposed in the same plane.

In the inner side pad support portion 31, a first engagement hole 181 recessed to the inward side in the disc axial direction from the intermediate surface 31*f* is formed on the intermediate surface 31*f*. The first engagement hole 181 is a long hole having a rectangular shape elongated in the disc circumferential direction. The first engagement hole 181 faces the first engagement hole 171 in the disc axial direction in a manner of being positionally aligned in the disc radial direction and the disc circumferential direction. In the inner side pad support portion 31, a second engagement hole 182 recessed to the inward side in the disc axial direction from the outward facing abutment surface 31*h* is formed in the vicinity of the end portion of the outward facing abutment surface 31*h* on a side opposite to the inner side pad support portion 32 in the disc circumferential direction. The second engagement hole 182 is a long hole having a rectangular shape elongated along the surface portion 31*i*. The second engagement hole 182 faces the second engagement hole 172 in the disc axial direction in a manner of being positionally aligned in the disc radial direction and the disc circumferential direction.

In the inner side pad support portion 32, on the outward side in the disc axial direction, an outward facing end surface 32*d* extending to the outward side in the disc circumferential direction from the support main body portion 61 and the surfaces 32*a* and 32*b*, a small stepped surface 32*e* slightly extending to the inward side in the disc axial direction from the outward side of the outward facing end surface 32*d* in the disc circumferential direction, and an intermediate surface 32*f* extending to the outward side in the disc circumferential direction from the end edge portion of the small stepped surface 32*e* on the inward side in the disc axial direction are formed.

In addition, in the inner side pad support portion 32, a large stepped surface 32*g* extending to the inward side in the disc axial direction from the outward side of the intermediate surface 32*f* in the disc circumferential direction, and an outward facing abutment surface 32*h* extending to the outward side in the disc circumferential direction from the end edge portion of the large stepped surface 32*g* on the inward side in the disc axial direction are formed. The outward facing abutment surface 32*h* extends to the end edge portions of the inner circumferential recessed surface 34*j* and the inner circumferential abutment surface 34*k* on the inward side in the disc axial direction. In addition, the outward facing abutment surface 32*h* extends to a surface portion 32*i* facing the outward side of the inner side pad support portion 32 in the disc circumferential direction. The surface portion 32*i* has a flat surface shape and is inclined in a manner of being positioned on the outward side in the disc radial direction in the direction of the reference line in the disc radial direction as being away from the inner side pad support portion 31 in the disc circumferential direction.

The outward facing end surface 32*d*, the intermediate surface 32*f*, and the outward facing abutment surface 32*h* have a flat surface shape extending orthogonally with respect to the disc axial direction. The outward facing end surface 31*d* and the outward facing end surface 32*d* are disposed in the same plane. The intermediate surface 31*f* and the intermediate surface 32*f* are also disposed in the same plane. The outward facing abutment surface 31*h* and the outward facing abutment surface 32*h* are also disposed in the same plane. The large stepped surface 32*g* has a flat surface shape in the disc axial direction along the reference line in the disc radial direction. The large stepped surface 32*g* and the large stepped surface 36*g* are disposed in the same plane.

In the inner side pad support portion 32, a first engagement hole 183 recessed to the inward side in the disc axial direction from the intermediate surface 32*f* is formed on the intermediate surface 32*f*. The first engagement hole 183 is a long hole having a rectangular shape elongated in the disc circumferential direction. The first engagement hole 183 faces the first engagement hole 173 in the disc axial direction in a manner of being positionally aligned in the disc radial direction and the disc circumferential direction. In the inner side pad support portion 32, a second engagement hole 184 recessed to the inward side in the disc axial direction from the outward facing abutment surface 32*h* is formed in the vicinity of the end portion of the outward facing abutment surface 32*h* on a side opposite to the inner side pad support portion 31 in the disc circumferential direction. The second engagement hole 184 is a long hole having a rectangular shape elongated along the surface portion 32*i*. The second engagement hole 184 faces the second engagement hole 174 in the disc axial direction in a manner of being positionally aligned in the disc radial direction and the disc circumferential direction.

As illustrated in FIG. 7, in the carrier main body 29, the filter portion 55 (second filter portion) on the disc entrance side is attached between the inner side pad support portion 31 on the disc entrance side and the outer side pad support portion 35 and on the inward side of the outer circumferential frame portion 33 in the disc radial direction. The filter portion 55 is provided on the disc entrance side in the carrier 21 in its entirety.

In the carrier main body 29, the filter portion 56 (first filter portion) on the disc exit side is attached between the inner side pad support portion 32 on the disc exit side and the outer side pad support portion 36 and on the inward side of the outer circumferential frame portion 34 in the disc radial direction. The filter portion 56 is provided on the disc exit side in the carrier 21 in its entirety.

The filter portions 55 and 56 are common components and disposed in the carrier main body 29 in a mirror symmetrical shape. As illustrated in FIGS. 7 to 9, each of the filter portions 55 and 56 is constituted of a dust collection portion 191 made up of a porous elastic body for capturing brake dust, and an attachment plate 192 made up of an elastic body for attaching the dust collection portion 191 to the carrier main body 29. The attachment plate 192 has a position setting plate portion 193 made up of an elastic body for positionally setting the dust collection portion 191, and a clip-type plate portion 194 made up of an elastic body for supporting the dust collection portion 191.

Figure 16:
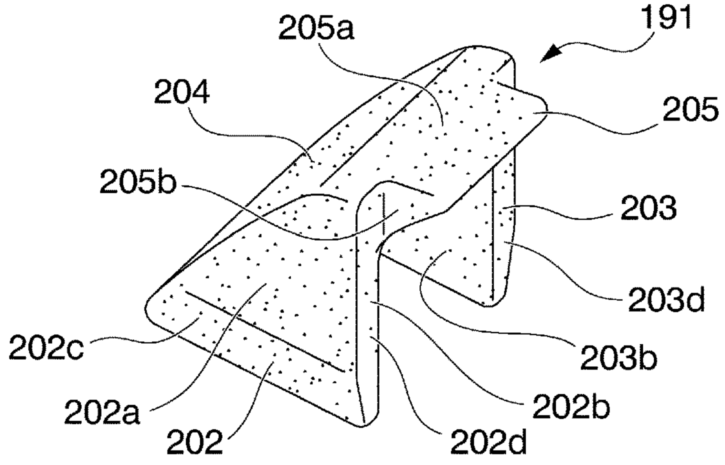
FIG. 16 is a perspective view illustrating a dust collection portion of the disc brake of the first embodiment.
Figure 17:
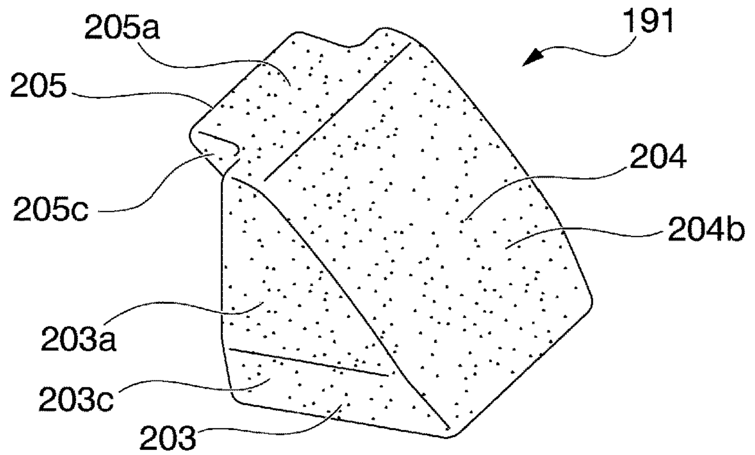
FIG. 17 is another perspective view illustrating the dust collection portion of the disc brake of the first embodiment.
Figure 18:
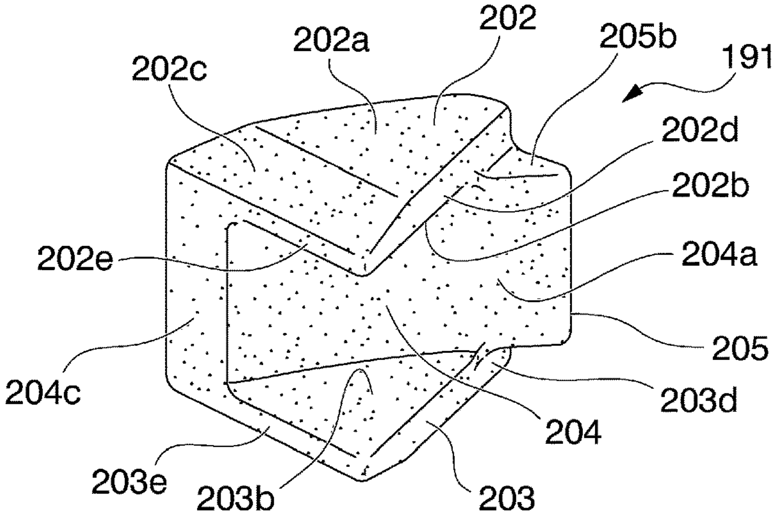
FIG. 18 is another perspective view illustrating the dust collection portion of the disc brake of the first embodiment.

As illustrated in FIGS. 16 to 18, the dust collection portion 191 has a pair of side plate portions 202 and 203 in flat plate shapes parallel to each other with a substantially similar fan shape, and a curved portion 204 forming a part of a substantially cylindrical shape connecting arc-shaped end edge portions of the pair of side plate portions 202 and 203 to each other. The curved portion 204 has a projection portion 205 protruding from between the pair of side plate portions 202 and 203.

The plate portion 202 has an outer surface portion 202*a* having a flat surface shape facing a side opposite to the plate portion 203; an inner surface portion 202*b* having a flat surface shape facing the plate portion 203 side; an inclined surface portion 202*c* having a flat surface shape extending in a direction opposite to the projection portion 205 from the outer surface portion 202*a* in a manner of being inclined with respect to the outer surface portion 202*a*; a surface portion 202*d* having a flat surface shape connecting the outer surface portion 202*a*, the inclined surface portion 202*c*, and the inner surface portion 202*b*; and a surface portion 202*e* having a flat surface shape connecting the end edge portion of the inclined surface portion 202*c* on a side opposite to the outer surface portion 202*a* and the inner surface portion 202*b*.

The plate portion 203 has an outer surface portion 203*a* having a flat surface shape facing a side opposite to the plate portion 202; an inner surface portion 203*b* having a flat surface shape facing the plate portion 202 side; an inclined surface portion 203*c* having a flat surface shape extending in a direction opposite to the projection portion 205 from the outer surface portion 203*a* in a manner of being inclined with respect to the outer surface portion 203*a*; a surface portion 203*d* having a flat surface shape connecting the outer surface portion 203*a*, the inclined surface portion 203*c*, and the inner surface portion 203*b*; and a surface portion 203*e* having a flat surface shape connecting the end edge portion of the inclined surface portion 203*c* on a side opposite to the outer surface portion 203*a* and the inner surface portion 203*b*. The outer surface portions 202*a* and 203*a* and the inner surface portions 202*b* and 203*b* extend parallel to each other. The surface portions 202*d* and 203*d* are disposed in the same plane orthogonal to the outer surface portions 202*a* and 203*a* and the inner surface portions 202*b* and 203*b*. The surface portions 202*e* and 203*e* are disposed in the same plane orthogonal to the surface portions 202*d* and 203*d*. The inclined surface portion 202*c* is inclined in a manner of approaching the inner surface portion 202*b* as being away from the outer surface portion 202*a*, and the inclined surface portion 203*c* is inclined in a manner of approaching the inner surface portion 203*b* as being away from the outer surface portion 203*a*.

In the dust collection portion 191, in the end portion of the curved portion 204 on a side opposite to the surface portions 202*e* and 203*e* including the projection portion 205, a top surface portion 205*a* having a flat surface shape facing a side opposite to the surface portions 202*e* and 203*e* is provided. The projection portion 205 is provided with a surface portion 205*b* connected to the surface portion 202*d*, and a surface portion 205*c* connected to the surface portion 203*d*.

The curved portion 204 has an inward side curved surface portion 204*a* located on the central side of the curvature thereof and forming a part of a cylindrical surface shape, an outward side curved surface portion 204*b* located on a side opposite to the center of the curvature thereof and forming a part of a cylindrical surface shape, and a surface portion 204*c* located on a side opposite to the top surface portion 205*a* and having a flat surface shape. The inward side curved surface portion 204*a* and the outward side curved surface portion 204*b* are substantially coaxial with each other. The surface portion 204*c* extends parallel to the top surface portion 205*a* and is disposed in the same plane as the surface portions 202*e* and 203*e*.

Figure 19:
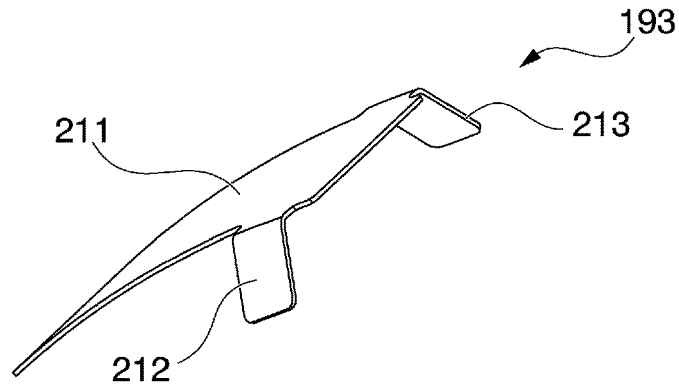
FIG. 19 is a perspective view illustrating a position setting plate portion of the disc brake of the first embodiment.
Figure 20:
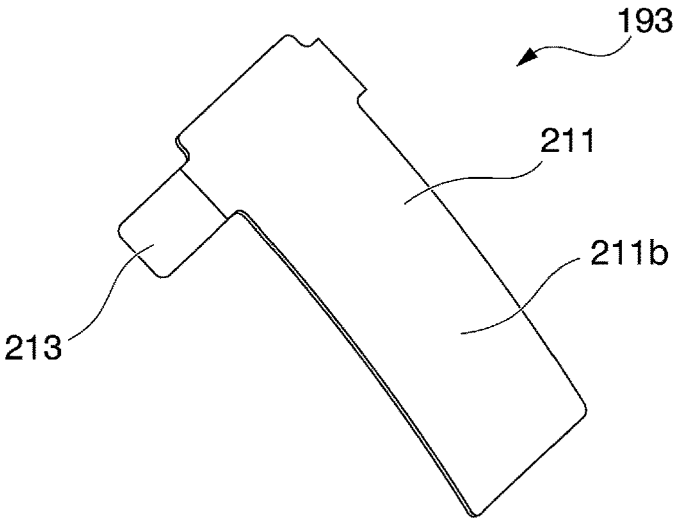
FIG. 20 is another perspective view illustrating the position setting plate portion of the disc brake of the first embodiment.
Figure 21:
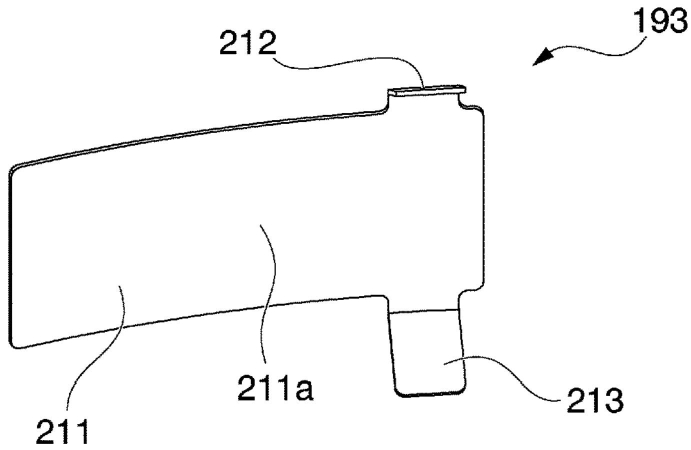
FIG. 21 is another perspective view illustrating the position setting plate portion of the disc brake of the first embodiment.

As illustrated in FIGS. 19 to 21, the position setting plate portion 193 has a curved plate portion 211 curved in a manner of forming a part of a cylindrical shape, and a pair of attachment portions 212 and 213 having a flat plate shape protruding to the outward side of the curved plate portion 211 in the axial direction from both end edge portions of the curved plate portion 211 in the axial direction on one end side of the curved plate portion 211 in the circumferential direction. The curved plate portion 211 forms a part of a cylindrical surface shape in which an inward side curved surface portion 211*a* on the inward side in the radial direction and an outward side curved surface portion 211*b* on the outward side in the radial direction are coaxial. The pair of attachment portions 212 and 213 are inclined with respect to the curved plate portion 211 in a manner of being positioned on the inward side of the curved plate portion 211 in the radial direction as being away from the curved plate portion 211 in the axial direction of the curved plate portion 211.

Figure 22:
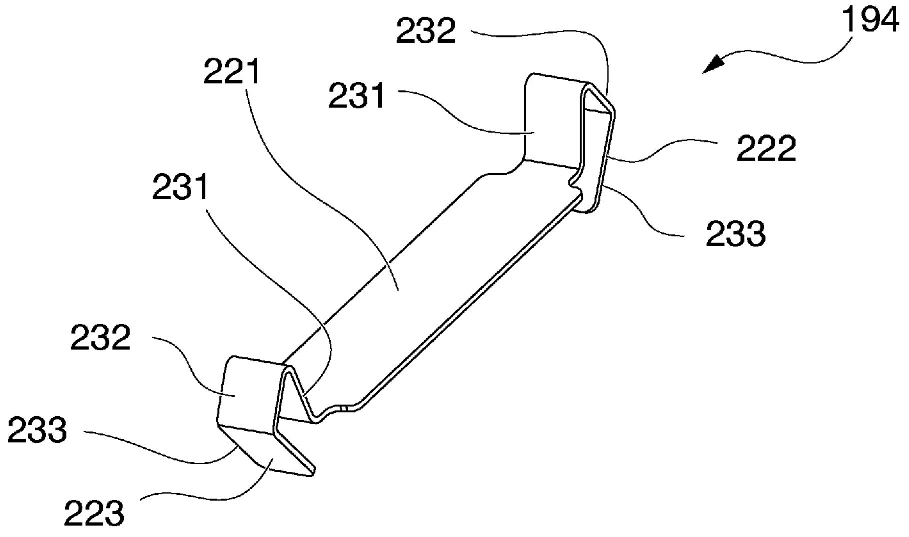
FIG. 22 is a perspective view illustrating a clip-type plate portion of the disc brake of the first embodiment.
Figure 23:
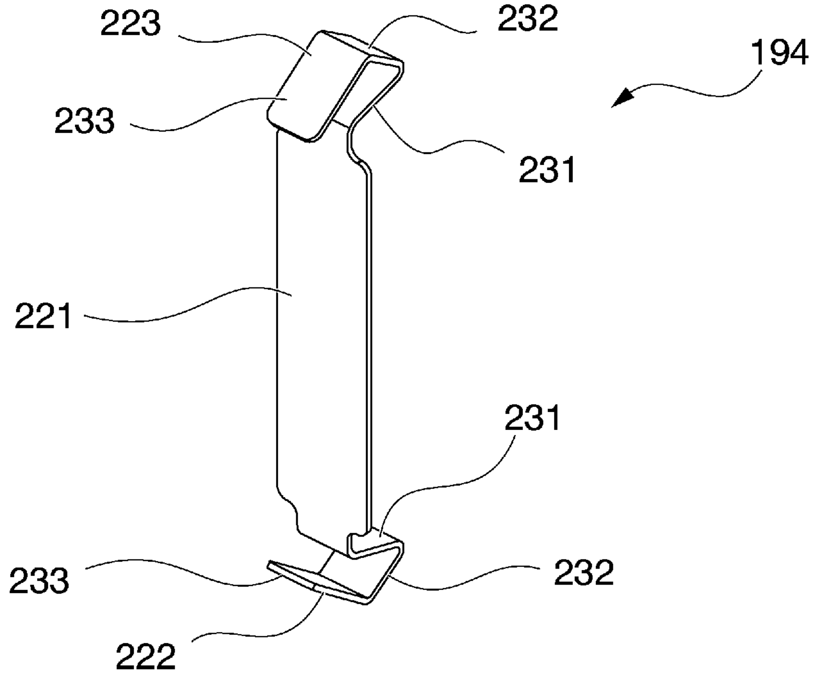
FIG. 23 is another perspective view illustrating the clip-type plate portion of the disc brake of the first embodiment.

As illustrated in FIGS. 22 and 23, the clip-type plate portion 194 has a substrate portion 221 having a flat plate shape, and a pair of attachment portions 222 and 223 having a bent plate shape protruding to both sides of the substrate portion 221 in a longitudinal direction from both end portions of the substrate portion 221 in the longitudinal direction. Since the attachment portions 222 and 223 has a mirror symmetrical shape, one attachment portion 222 will be described herein. The attachment portion 222 has a protrusion plate portion 231 obliquely protruding to the outward side of the substrate portion 221 in the longitudinal direction and one side of the substrate portion 221 in a plate thickness direction from one end portion of the substrate portion 221 in the longitudinal direction, an intermediate plate portion 232 obliquely protruding to the outward side of the substrate portion 221 in the longitudinal direction and the opposite side of the substrate portion 221 in the plate thickness direction from the end edge portion of the protrusion plate portion 231 on a side opposite to the substrate portion 221, and a tip plate portion 233 obliquely protruding to the inward side of the substrate portion 221 in the longitudinal direction and the opposite side of the substrate portion 221 in the plate thickness direction from the end edge portion of the intermediate plate portion 232 on a side opposite to the protrusion plate portion 231. The other attachment portion 223 also has the protrusion plate portion 231, the intermediate plate portion 232, and the tip plate portion 233 in a similar manner.

As illustrated in FIG. 8, when the filter portion 55 is attached to the carrier main body 29, the dust collection portion 191 thereof abuts the outward facing abutment surface 31*h* of the inner side pad support portion 31 in a surface contact manner in the outer surface portion 202*a* and abuts the large stepped surface 31*g* in a surface contact manner in the surface portion 202*d*. In addition, the dust collection portion 191 of the filter portion 55 abuts the inward facing abutment surface 35*h* of the outer side pad support portion 35 in a surface contact manner in the outer surface portion 203*a* and abuts the large stepped surface 35*g* in a surface contact manner in the surface portion 203*d*. In addition, as illustrated in FIG. 9, the dust collection portion 191 of the filter portion 55 abuts the inner circumferential abutment surface 33*k* of the outer circumferential frame portion 33 in a surface contact manner in the outward side curved surface portion 204*b* and abuts the inward side flat surface 33*i* in a surface contact manner in the top surface portion 205*a*.

Figure 24:
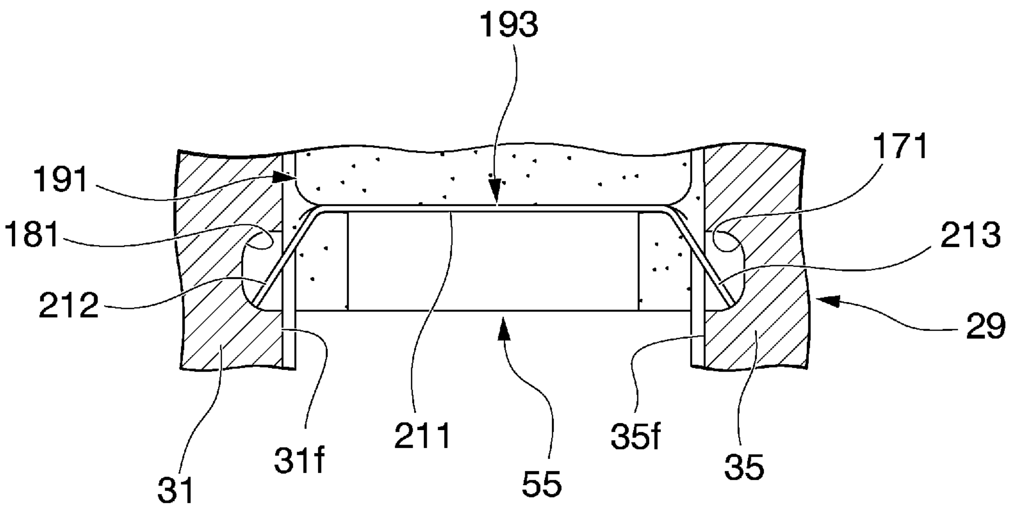
FIG. 24 is a partial cross-sectional view illustrating an attachment state of the position setting plate portion of the disc brake of the first embodiment.

In the filter portion 55, while having the dust collection portion 191 in such a state, the position setting plate portion 193 abuts the inward side curved surface portion 204*a* of the dust collection portion 191 in a surface contact manner in the outward side curved surface portion 211*b* of the curved plate portion 211. As illustrated in FIG. 24, in the position setting plate portion 193, the attachment portion 212 engages with the first engagement hole 181 of the inner side pad support portion 31, and the attachment portion 213 engages with the first engagement hole 171 of the outer side pad support portion 35. Consequently, the position setting plate portion 193 is provided in the direction of the disc center axis with respect to the dust collection portion 191. In this state, as illustrated in FIG. 9, the position setting plate portion 193 presses the curved portion 204 of the dust collection portion 191 against the outer circumferential frame portion 33 in a manner of coming into surface contact with the inner circumferential abutment surface 33*k* in the outward side curved surface portion 204*b*. The position setting plate portion 193 positionally sets the dust collection portion 191 with respect to the carrier main body 29. As illustrated in FIG. 8, the dust collection portion 191 positionally set by the position setting plate portion 193 abuts the outward facing abutment surface 31*h* in a surface contact manner in the outer surface portion 202*a*, abuts the inward facing abutment surface 35*h* in a surface contact manner in the outer surface portion 203*a*, and as illustrated in FIG. 9, abuts the inner circumferential abutment surface 33*k* in a surface contact manner in the outward side curved surface portion 204*b*.

Here, in order to positionally set the dust collection portion 191, when the position setting plate portion 193 is attached to the carrier main body 29 as illustrated in FIG. 24, in a state in which the attachment portions 212 and 213 extend to the inward side in the disc radial direction from the curved plate portion 211 and in a state in which the curved plate portion 211 extends to the disc entrance side from the attachment portions 212 and 213, the position setting plate portion 193 is moved to the outward side in the disc radial direction from the inward side in the disc radial direction. Consequently, the position setting plate portion 193 slides on the intermediate surfaces 31*f* and 35*f* in a state in which the attachment portions 212 and 213 are elastically deformed to the curved plate portion 211 side on the intermediate surfaces 31*f* and 35*f*, and when they are positioned at positions of the first engagement holes 181 and 171, the attachment portion 212 enters the first engagement hole 181 and the attachment portion 213 enters the first engagement hole 171 due to recovery of elastic deformation. Accordingly, the position setting plate portion 193 comes into surface contact with the curved portion 204 of the dust collection portion 191 in the curved plate portion 211 and supports the dust collection portion 191 by pressing it against the outer circumferential frame portion 33 in a manner of coming into surface contact with the carrier main body 29. The positional relationship and the angular relationship of the attachment portions 212 and 213 with respect to the first engagement holes 181 and 171 are set to be in such a state. The attachment portions 212 and 213 are parts for attaching the position setting plate portion 193 to the carrier main body 29.

When the dust collection portion 191 is positionally set, in the position setting plate portion 193, since the attachment portions 212 and 213 having a flat plate shape enter the first engagement holes 181 and 171 in tip portions in a state of obliquely extending to the inward side in the disc radial direction from the curved plate portion 211 such that the tip portions are separated from each other, it is in a state of being unlikely to be detached from the carrier main body 29.

Figure 25:
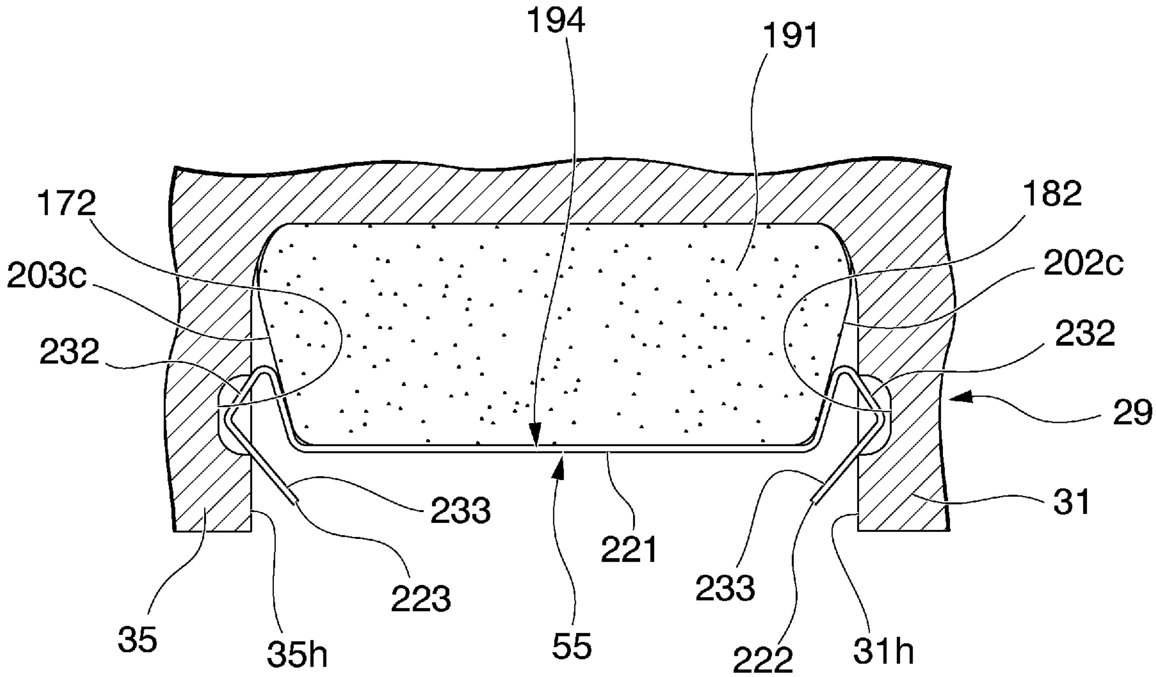
FIG. 25 is a partial cross-sectional view illustrating an attachment state of the clip-type plate portion of the disc brake of the first embodiment.

In the filter portion 55 on the disc entrance side, while having the dust collection portion 191 in the positionally set state as described above, as illustrated in FIG. 9, the clip-type plate portion 194 abuts the surface portion 204*c* of the dust collection portion 191 in a surface contact manner in the substrate portion 221. Furthermore, as illustrated in FIG. 25, the attachment portion 222 engages with the second engagement hole 182 of the inner side pad support portion 31, and the attachment portion 223 engages with the second engagement hole 172 of the outer side pad support portion 35. Consequently, the clip-type plate portion 194 is provided next to the dust collection portion 191 in the disc circumferential direction, specifically, on the disc entrance side. In this state, the clip-type plate portion 194 presses the dust collection portion 191 against the outer circumferential frame portion 33 in a manner of coming into surface contact with the inward side flat surface 33*i* in the top surface portion 205*a*. Accordingly, the clip-type plate portion 194 restricts movement of the dust collection portion 191 in the disc circumferential direction in a state of being positionally set in the carrier main body 29 by the position setting plate portion 193 together with the inward side flat surface 33*i*.

Here, in order to restrict coming-out of the dust collection portion 191 from between the position setting plate portion 193 and the carrier main body 29, the clip-type plate portion 194 is attached to the carrier main body 29 as illustrated in FIG. 25. When the clip-type plate portion 194 is attached to the carrier main body 29, in a state in which the attachment portions 222 and 223 protrude to the outward side in the disc radial direction from the substrate portion 221, the clip-type plate portion 194 is moved to the outward side in the disc radial direction from the inward side in the disc radial direction. Consequently, the clip-type plate portion 194 slides on the outward facing abutment surface 31*h* and the inward facing abutment surface 35*h* in a state in which the attachment portions 222 and 223 are elastically deformed to the substrate portion 221 side on the outward facing abutment surface 31*h* and the inward facing abutment surface 35*h*, and when they are positioned at positions of the second engagement holes 182 and 172, the attachment portion 222 enters the second engagement hole 182 at a boundary side part between the intermediate plate portion 232 and the tip plate portion 233 and the attachment portion 223 enters the second engagement hole 172 at a boundary side part between the intermediate plate portion 232 and the tip plate portion 233 due to recovery of elastic deformation. Accordingly, as illustrated in FIG. 9, the clip-type plate portion 194 abuts the surface portion 204*c* at a front end in a direction in which it comes out from between the position setting plate portion 193 of the dust collection portion 191 and the carrier main body 29 in the substrate portion 221, thereby restricting coming-out of the dust collection portion 191. At this time, as illustrated in FIG. 25, since the inclined surface portions 202*c* and 203*c* are formed in the dust collection portion 191, the attachment portions 222 and 223 can easily enter areas between the dust collection portion 191 and the carrier main body 29. The positional relationship and the angular relationship of the attachment portions 222 and 223 with respect to the second engagement holes 182 and 172 are set to be in such a state. The attachment portions 222 and 223 are parts for attaching the clip-type plate portion 194 to the carrier main body 29.

In the clip-type plate portion 194, the tip plate portion 233 of the attachment portion 222 and the tip plate portion 233 of the attachment portion 223 are inclined in a manner of approaching each other and extend to the disc entrance side from the outward facing abutment surface 31*h* and the inward facing abutment surface 35*h* facing each other. For this reason, the clip-type plate portion 194 can be easily detached from the carrier main body 29 by performing operation from the disc entrance side so as to cause the tip plate portions 233 of the attachment portions 222 and 223 to be elastically deformed such that they approach each other.

In the filter portion 55, at the time of maintenance of the dust collection portion 191, when the dust collection portion 191 is caused to slide in the disc circumferential direction to the disc entrance side where the clip-type plate portion 194 has been located after the clip-type plate portion 194 is detached from the carrier main body 29 as described above, the dust collection portion 191 can be easily pulled from between the position setting plate portion 193 and the carrier main body 29. Accordingly, the dust collection portion 191 can be detached from the carrier main body 29 without removing the carrier main body 29 from the vehicle. In addition, from a state in which the dust collection portion 191 is detached, the dust collection portion 191 can be fixed to the carrier main body 29 by attaching the clip-type plate portion 194 after the cleaned dust collection portion 191 or a dust collection portion 191 for replacement is inserted between the position setting plate portion 193 and the carrier main body 29 in the disc circumferential direction from a side where the clip-type plate portion 194 has been located.

Similar to the filter portion 55, the filter portion 56 on the disc exit side is attached to the carrier main body 29 in a mirror symmetrical shape with respect to the filter portion 55. Consequently, in the filter portion 56, as illustrated in FIG. 8, the dust collection portion 191 abuts the inward facing abutment surface 36*h* of the outer side pad support portion 36 in a surface contact manner in the outer surface portion 202*a* and abuts the large stepped surface 36*g* in a surface contact manner in the surface portion 202*d*. In addition, the dust collection portion 191 of the filter portion 56 abuts the outward facing abutment surface 32*h* of the inner side pad support portion 32 in a surface contact manner in the outer surface portion 203*a* and abuts the large stepped surface 32*g* in a surface contact manner in the surface portion 203*d*. In addition, as illustrated in FIG. 9, the dust collection portion 191 of the filter portion 56 abuts the inner circumferential abutment surface 34*k* of the outer circumferential frame portion 34 in a surface contact manner in the outward side curved surface portion 204*b* and abuts the inward side flat surface 34*i* in a surface contact manner in the top surface portion 205*a*. In addition, in the filter portion 56, the position setting plate portion 193 engages with the first engagement hole 173, illustrated in FIG. 15, of the outer side pad support portion 36 in the attachment portion 212 illustrated in FIG. 8 and engages with the first engagement hole 183 of the inner side pad support portion 32 in the attachment portion 213 as illustrated in FIG. 9. Accordingly, in the filter portion 56, the position setting plate portion 193 positionally sets the dust collection portion 191 in the foregoing state.

In addition, in the filter portion 56, the clip-type plate portion 194 engages with the second engagement hole 174, illustrated in FIG. 15, of the outer side pad support portion 36 in the attachment portion 222 illustrated in FIG. 8, and as illustrated in FIG. 7, the attachment portion 223 engages with the second engagement hole 184 of the inner side pad support portion 32. Accordingly, in the filter portion 56, the clip-type plate portion 194 supports the dust collection portion 191 so as to maintain the foregoing state.

As above, the carrier 21 is realized when the filter portion 55 and the filter portion 56 are attached to the carrier main body 29. As illustrated in FIG. 8, an inner circumferential surface 21*b* of the carrier 21 is constituted of the inner circumferential end surfaces 33*g* and 34*g* and the inward side flat surfaces 33*i* and 34*i* of the outer circumferential frame portions 33 and 34 of the carrier main body 29 on the inward side in the disc radial direction, the inward side curved surface portion 204*a* of the curved portion 204 of the dust collection portion 191 of the filter portion 55 on the inward side in the disc radial direction, the inward side curved surface portion 211*a* of the curved plate portion 211 of the position setting plate portion 193 of the filter portion 55 on the inward side in the disc radial direction, the inward side curved surface portion 204*a* of the curved portion 204 of the dust collection portion 191 of the filter portion 56 on the inward side in the disc radial direction, and the inward side curved surface portion 211*a* of the curved plate portion 211 of the position setting plate portion 193 of the filter portion 56 on the inward side in the disc radial direction. As illustrated in FIG. 5, the inner circumferential surface 21*b* is formed along an outer circumferential edge of the disc rotor 11 on the outward side in the disc radial direction.

The filter portion 55 and the filter portion 56 on the inner circumferential surface 21*b* of the carrier 21 are provided in a manner of facing the outer circumferential edge of the disc rotor 11. In other words, the carrier 21 includes the inner circumferential surface 21*b* formed along the outer circumferential edge of the disc rotor 11, and the filter portions 55 and 56 located on the inner circumferential surface 21*b* and provided in a manner of facing the outer circumferential edge of the disc rotor 11. The filter portion 55 and the filter portion 56 are provided on both the disc entrance side and the disc exit side, of the carrier 21. Thus, the dust collection portion 191 of the filter portion 55 and the dust collection portion 191 of the filter portion 56 are also provided on both the disc entrance side and the disc exit side, of the carrier 21.

In both the inner side pad support portion 31 illustrated in FIG. 6 and the outer side pad support portion 35 illustrated in FIG. 1 on the disc entrance side, the pad spring 26 having an integrated shape is attached at positions of these support main body portions 60 and 62. As illustrated in FIG. 6, the pad spring 26 has a guide portion 70 having a recessed shape fitted into the support main body portion 60, an outward side covering portion 71 located on the outward side of the guide portion 70 in the disc radial direction and covering the surface 31*a*, an inward side covering portion 72 located on the inward side of the guide portion 70 in the disc radial direction and covering the surface 31*b*, and a radial direction biasing portion 73 located on the inward side of the inward side covering portion 72 in the disc radial direction and biasing the friction pad 24 on the inward side in the disc axial direction toward the outward side in the disc radial direction and the disc exit side.

In addition, as illustrated in FIG. 1, the pad spring 26 has a guide portion 75 having a recessed shape fitted into the support main body portion 62, an outward side covering portion 76 located on the outward side of the guide portion 75 in the disc radial direction and covering the surface 35*a*, an inward side covering portion 77 located on the inward side of the guide portion 75 in the disc radial direction and covering the surface 35*b*, and a radial direction biasing portion 78 located on the inward side of the inward side covering portion 77 in the disc radial direction and biasing the friction pad 25 on the outward side in the disc axial direction toward the outward side in the disc radial direction and the disc exit side.

In both the inner side pad support portion 32 illustrated in FIG. 6 and the outer side pad support portion 36 illustrated in FIG. 1 on the disc exit side, the pad spring 27 having an integrated shape is attached at positions of these support main body portions 61 and 63. As illustrated in FIG. 6, the pad spring 27 has a guide portion 80 having a recessed shape fitted into the support main body portion 61, an outward side covering portion 81 located on the outward side of this guide portion 80 in the disc radial direction and covering the surface 32*a*, an inward side covering portion 82 located on the inward side of the guide portion 80 in the disc radial direction and covering the surface 32*b*, and a radial direction biasing portion 83 located on the inward side of this inward side covering portion 82 in the disc radial direction and biasing the friction pad 24 on the inward side in the disc axial direction toward the outward side in the disc radial direction and the disc entrance side.

In addition, as illustrated in FIG. 1, the pad spring 27 has a guide portion 85 having a recessed shape fitted into the support main body portion 63, an outward side covering portion 86 located on the outward side of the guide portion 85 in the disc radial direction and covering the surface 36*a*, an inward side covering portion 87 located on the inward side of the guide portion 85 in the disc radial direction and covering the surface 36*b*, and a radial direction biasing portion 88 located on the inward side of the inward side covering portion 87 in the disc radial direction and biasing the friction pad 25 on the outward side in the disc axial direction toward the outward side in the disc radial direction and the disc entrance side. The pad spring 27 is a common component having the same shape as the pad spring 26 and attached to the carrier main body 29 in a mirror symmetrical shape.

The friction pad 24 on the inward side in the disc axial direction illustrated in FIG. 6 and the friction pad 25 on the outward side in the disc axial direction illustrated in FIG. 1 are common components. As illustrated in FIG. 6, the friction pad 24 on the inward side in the disc axial direction is supported by the carrier main body 29 with the pad spring 26 and 27 therebetween. The friction pad 24 has a mirror symmetrical shape and has a rear plate 91 supported by the carrier main body 29, and a lining 92 coming into contact with the disc rotor 11. The rear plate 91 has a main plate portion 101, and a pair of projection-shaped portions 102 protruding to the outward side in the longitudinal direction of the main plate portion 101 from both end portions of the main plate portion 101 in the longitudinal direction. The lining 92 is adhered to the main plate portion 101.

The friction pad 24 is disposed with the lining 92 positioned on the disc rotor 11 side with respect to the rear plate 91. In the friction pad 24, one projection-shaped portion 102 of the rear plate 91 is disposed inside the support main body portion 60 of the inner side pad support portion 31 with the guide portion 70 of the pad spring 26 therebetween, and the other projection-shaped portion 102 of the rear plate 91 is disposed inside the support main body portion 61 of the inner side pad support portion 32 with the guide portion 80 of the pad spring 27 therebetween. Accordingly, the friction pad 24 is provided at a position next to the disc rotor 11 on the inward side in the disc axial direction and supported by the carrier 21 to be able to move in the disc axial direction.

In the friction pad 24, the main plate portion 101 of the rear plate 91 thereof is pressurized to the outward side in the disc radial direction by the radial direction biasing portions 73 and 83 of the pad spring 26 and 27 which they respectively abut. Here, the carrier 21 receives a force from the main plate portion 101 of the friction pad 24 at the time of braking with the surfaces 31*b* and 32*b* adjacent to the support main body portions 60 and 61 on the inward side in the disc radial direction. In other words, in the carrier 21, the surfaces 31*b* and 32*b* on the inward side in the disc radial direction from the support main body portions 60 and 61 become torque receiving surfaces. The surface 32*b* serves as a torque receiving surface when the vehicle moves forward, and the surface 31*b* serves as a torque receiving surface when the vehicle moves backward.

Similarly, the friction pad 25, illustrated in FIG. 1, on the outward side in the disc axial direction is also supported by the pair of outer side pad support portions 35 and 36 with the pad spring 26 and 27 therebetween to be able to move in the disc axial direction. Accordingly, the friction pad 25 on the outward side in the disc axial direction is provided at a position next to the disc rotor 11 on the outward side in the disc axial direction and supported by the carrier 21 to be able to move in the disc axial direction. Thus, the carrier 21 has the pair of inner side pad support portions 31 and 32 and the pair of outer side pad support portions 35 and 36 attached to a non-rotation portion of the vehicle and movably supporting the pair of friction pads 24 and 25.

As illustrated in FIGS. 1 to 3, the caliper 22 has a shape of nearly mirror symmetry. As illustrated in FIG. 2, the caliper 22 includes a caliper body 131, the pair of slide pins 45, and a piston (not illustrated).

The caliper body 131 is integrally formed by casting. The caliper body 131 has a cylinder portion 141 disposed on the inward side in the disc axial direction with respect to the disc rotor 11, a bridge portion 142 extending in the disc axial direction to the outward side in the disc axial direction in a manner of straddling the outer circumference of the disc rotor 11 from a part of the cylinder portion 141 on the outward side in the disc radial direction, a claw portion 143 extending to the inward side in the disc radial direction from the end edge portion of the bridge portion 142 on a side opposite to the cylinder portion 141 in the disc axial direction and disposed on the outward side of the disc rotor 11 in the disc axial direction, and a pair of pin attachment portions 144 extending to both sides in the disc circumferential direction from the cylinder portion 141. In the cylinder portion 141, a cylinder bore accommodating the piston (not illustrated) is formed in the disc axial direction from the claw portion 143 side.

In the caliper body 131, the slide pins 45 are attached to the pin attachment portion 144 on one side in the disc circumferential direction, and the slide pins 45 are also attached to the pin attachment portion 144 on the other side in the disc circumferential direction. The pair of slide pins 45 on both sides of the caliper 22 in the disc circumferential direction are slidably fitted into the pair of pin insertion holes 43 and 44, illustrated in FIGS. 5 and 6, of the carrier main body 29. Accordingly, the caliper 22 is supported by the carrier main body 29 of the carrier 21 to be able to slide in the disc axial direction. The pair of boots 23 illustrated in FIGS. 2 and 3 respectively cover parts of the corresponding slide pins 45 protruding from the carrier main bodies 29.

As illustrated in FIG. 1, the claw portion 143 is provided with a plurality of recesses 151 recessed outward in the disc radial direction from the end edge portions on the inward side in the disc radial direction. Specifically, two recesses 151 are provided. These recesses 151 have the same shape and are arranged in the disc circumferential direction at positions aligned with each other in the disc axial direction and the disc radial direction. One recess 151 is a part through which a tool for machining one cylinder bore (not illustrated) of the cylinder portion 141 is inserted. The other recess 151 is a part through which a tool for machining the other cylinder bore (not illustrated) of the cylinder portion 141 is inserted.

In the caliper body 131, an outer circumferential end surface 142*a* facing the outward side in the disc radial direction is formed in the end portion of the bridge portion 142 on the outward side in the disc radial direction. The outer circumferential end surfaces 33*d* and 34*d* of the outer circumferential frame portions 33 and 34 of the carrier 21 on the outward side in the disc radial direction and the outer circumferential end surface 142*a* of the caliper 22 on the outward side in the disc radial direction are disposed substantially without any step therebetween in the disc radial direction.

In the end portion of the bridge portion 142 on the outward side in the disc axial direction, a chamfer 142*b* is formed adjacent to the outward side of the outer circumferential end surface 142*a* in the disc axial direction. The chamfer 142*b* is disposed on the end portion on the outward side in the disc radial direction and the end portion on the outward side in the disc axial direction of the caliper 22. The chamfer 142*b* faces the outward side in the disc radial direction and the outward side in the disc axial direction. The chamfer 142*b* is inclined in a manner of being positioned on the inward side in the disc radial direction toward the outward side in the disc axial direction. The chamfer 142*b* of the bridge portion 142 is at a position substantially aligned with the chamfers 33*e* and 34*e* of the outer circumferential frame portions 33 and 34 of the carrier 21 in the disc radial direction.

In the end portion of the bridge portion 142 on the disc entrance side, an outer side surface 142*c* facing the outward side in the disc circumferential direction is formed. In the end portion of the bridge portion 142 on the disc exit side, an outer side surface 142*d* facing the outward side in the disc circumferential direction is formed.

In the carrier 21, one facing surface 33*a* of the pair of facing surfaces 33*a* and 34*a* faces one outer side surface 142*c* of the pair of outer side surfaces 142*c* and 142*d* of the caliper 22. In the carrier 21, one outer circumferential frame portion 33 including this one facing surface 33*a* extends in a direction in which it is away from the caliper 22 in the disc circumferential direction from this one facing surface 33*a* in a manner of covering the disc rotor 11 on the outward side in the disc radial direction. In addition, in the carrier 21, the other facing surface 34*a* of the pair of facing surfaces 33*a* and 34*a* faces the other outer side surface 142*d* of the pair of outer side surfaces 142*c* and 142*d* of the caliper 22. In the carrier 21, the other outer circumferential frame portion 34 including the other facing surface 34*a* extends in a direction in which it is away from the caliper 22 in the disc circumferential direction from the other facing surface 34*a* in a manner of covering the disc rotor 11 on the outward side in the disc radial direction.

In the carrier 21, the outer circumferential frame portion 33 extends in the disc circumferential direction from the facing surface 33*a* to the disc entrance side. The outer circumferential frame portion 33 extends to a position on the inward side in the disc radial direction in the direction of the reference line in the disc radial direction from the surfaces 31*b*, 32*b*, 35*b*, and 36*b* of the pair of inner side pad support portions 31 and 32 and the pair of outer side pad support portions 35 and 36 receiving a force from the friction pads 24 and 25 at the time of braking. In the carrier 21, the outer circumferential frame portion 34 extends in the disc circumferential direction from the facing surface 34*a* to the disc exit side. The outer circumferential frame portion 34 extends to a position on the inward side in the disc radial direction in the direction of the reference line in the disc radial direction from the surfaces 31*b*, 32*b*, 35*b*, and 36*b* of the pair of inner side pad support portions 31 and 32 and the pair of outer side pad support portions 35 and 36 receiving a force from the friction pads 24 and 25 at the time of braking.

As illustrated in FIG. 2, in the bridge portion 142, a plurality of window holes 161 penetrating it in the disc radial direction are formed at positions aligned with each other in the disc axial direction in a manner of being away from each other in the disc circumferential direction. The plurality of window holes 161, specifically, two window holes 161 are formed. The window holes 161 are holes for visually recognizing an abrasion state and the like of the friction pads 24 and 25 on both sides in the disc axial direction.

In the bridge portion 142, the plurality of recessed portions 162 recessed to the inward side in the disc radial direction from the outer circumferential end surface 142*a* are formed at positions aligned with each other in the disc axial direction in a manner of being away from each other in the disc circumferential direction. The plurality of recessed portions 162, specifically, two recessed portions 162 are formed. The recessed portions 162 are formed on the outward side in the disc axial direction from the window holes 161. One recessed portion 162 is positionally aligned with one window hole 161 in the disc circumferential direction. The other recessed portion 162 is positionally aligned with the other window hole 161 in the disc circumferential direction. The pair of recessed portions 162 are parts supported by a working machine when the caliper body 131 is set to the working machine.

In the caliper body 131, an outward side end surface 143*a* facing the outward side in the disc axial direction is formed in the end portion of the claw portion 143 on the outward side in the disc axial direction. The outward side end surface 143*a* is disposed in the end portion of the caliper 22 on the outermost side in the disc axial direction. The outward side end surface 143*a* has a flat surface shape extending orthogonally with respect to the disc axial direction.

In the disc brake 10 having the foregoing constitution, a brake fluid is introduced into the cylinder portion 141 of the caliper 22 through a brake piping (not illustrated). Consequently, in the caliper 22, the piston (not illustrated) moves forward to the disc rotor 11 side and pressurizes the friction pad 24 disposed between the piston and the disc rotor 11 on the inward side in the disc axial direction toward the disc rotor 11. Accordingly, the friction pad 24 on the inward side in the disc axial direction moves and comes into contact with the disc rotor 11 in the lining 92 thereof. In addition, due to a reaction force of this pressurization, the caliper body 131 causes the slide pins 45 to slide with respect to the carrier 21 and moves in the disc axial direction, and the claw portion 143 pressurizes the friction pad 25 on the outward side in the disc axial direction disposed between the claw portion 143 and the disc rotor 11 toward the disc rotor 11. Accordingly, the friction pad 25 on the outward side in the disc axial direction comes into contact with the disc rotor 11 in the lining 92. In this manner, the caliper 22 sandwiches the pair of friction pads 24 and 25 from both sides in the disc axial direction and pressurizes them against both surfaces of the disc rotor 11. As a result, the caliper 22 generates a braking force by applying a frictional resistance to the disc rotor 11. The caliper 22 is a floating-type caliper and is a first-type caliper.

Here, due to contact between the linings 92 of the friction pads 24 and 25 and the disc rotor 11 at the time of braking, the linings 92 are worn or the disc rotor 11 is worn, thereby generating brake dust. When the vehicle is traveling forward, such brake dust is mainly released to a side in front of the disc rotor 11 in the rotation direction from the lining 92, that is, the disc exit side due to rotation of the disc rotor 11. Consequently, brake dust released in this manner is captured mainly by the dust collection portion 191 of the filter portion 56 provided on the side in front of the disc rotor 11 in the rotation direction from the lining 92, that is, the disc exit side. In addition, when the vehicle is traveling backward, brake dust is mainly released to the side in front of the disc rotor 11 in the rotation direction from the lining 92 due to rotation of the disc rotor 11. Consequently, brake dust released in this manner is captured mainly by the dust collection portion 191 of the filter portion 55 provided on the side in front of the disc rotor 11 in the rotation direction from the lining 92.

The disc brake described in Patent Document 1 has a separate-type brake dust collector installed next to a brake caliper. Incidentally, it is required to efficiently collect brake dust.

In contrast, the disc brake 10 of the first embodiment is provided with the filter portions 55 and 56 facing the outer circumferential edge of the disc rotor 11 on the inner circumferential surface 21*b* formed along the outer circumferential edge of the disc rotor 11 of the carrier 21 supporting the friction pads 24 and 25. For this reason, brake dust can be collected very close to sliding surfaces of the friction pads 24 and 25 and the disc rotor 11 that are generation sources of brake dust. Accordingly, brake dust can be efficiently collected. Therefore, the amount of brake dust released into the air can be reduced. In other words, brake dust can be collected into the caliper 22 and the carrier 21 that are generation sources of brake dust, amount of brake dust released into the air can be reduced.

In addition, in the disc brake 10 of the first embodiment, since each of the filter portions 55 and 56 is constituted of the dust collection portion 191 and the attachment plate 192 for attaching the dust collection portion 191 to the carrier main body 29 of the carrier 21, it is possible to realize a structure in which the dust collection portion 191 can be detached from the carrier main body 29.

In addition, in the disc brake 10 of the first embodiment, since the attachment portions 212, 213, 222, and 223 for attachment with respect to the carrier main body 29 are provided in the attachment plate 192, it is possible to realize a structure in which the dust collection portion 191 can be detached from the carrier main body 29.

In addition, in the disc brake 10 of the first embodiment, since the attachment plate 192 includes the position setting plate portion 193 which positionally sets the dust collection portion 191 and is unlikely to be detached from the carrier main body 29, and the clip-type plate portion 194 which supports the dust collection portion 191 and can be detached from the carrier main body 29, erroneous detachment of the position setting plate portion 193 can be curbed.

In addition, in the disc brake 10 of the first embodiment, since the position setting plate portion 193 is provided in the direction of the disc center axis with respect to the dust collection portion 191, the dust collection portion 191 can be positionally set in the disc radial direction by the position setting plate portion 193.

In addition, in the disc brake 10 of the first embodiment, since the clip-type plate portion 194 is provided next to the dust collection portion 191 in the disc circumferential direction, the dust collection portion 191 can be moved in the disc circumferential direction and detached from the carrier main body 29 and the position setting plate portion 193 by detaching the clip-type plate portion 194 from the carrier main body 29.

In addition, in the disc brake 10 of the first embodiment, since the respective dust collection portions 191 of the filter portion 55 and the filter portion 56 are provided on both the disc entrance side and the disc exit side, of the carrier 21, brake dust generated when the vehicle moves forward and brake dust generated when the vehicle moves backward can be efficiently collected. Since more brake dust is generated when the vehicle moves forward than brake dust generated when the vehicle moves backward, when a filter portion is provided on one of the disc entrance side and the disc exit side of the carrier 21, it is preferable to provide the filter portion 56 on the disc exit side. That is, at least the filter portion 56 on the disc exit side, of the disc entrance side and the disc exit side of the carrier 21, is provided.

In addition, in the disc brake 10 of the first embodiment, since the filter portion 55 and the filter portion 56 are made up of an elastic body, attachment to the carrier main body 29 is facilitated.

First Modification Example

Figure 26:
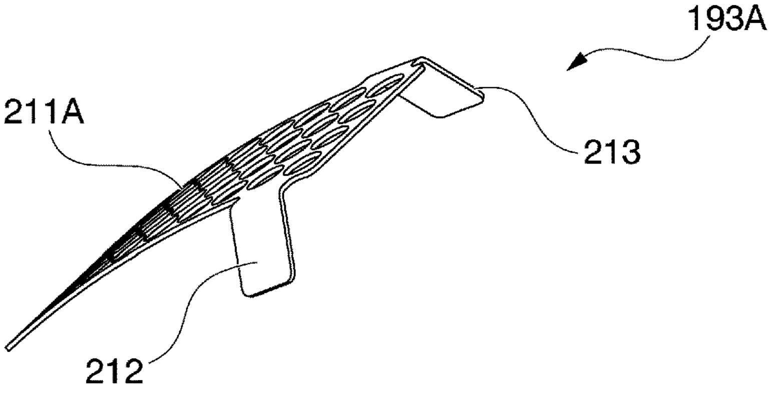
FIG. 26 is a perspective view illustrating a first modification example of a position setting plate portion of the disc brake of the first embodiment.
Figure 27:
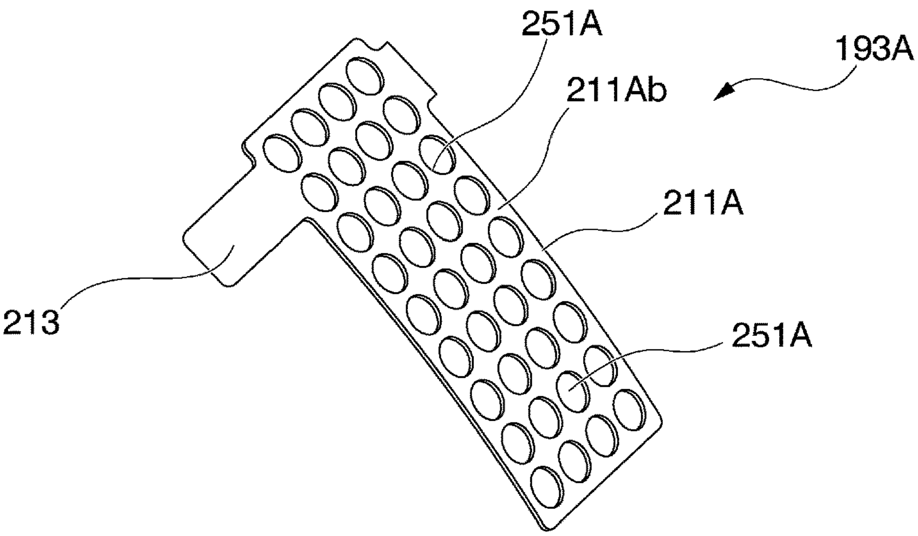
FIG. 27 is another perspective view illustrating the first modification example of the position setting plate portion of the disc brake of the first embodiment.
Figure 28:
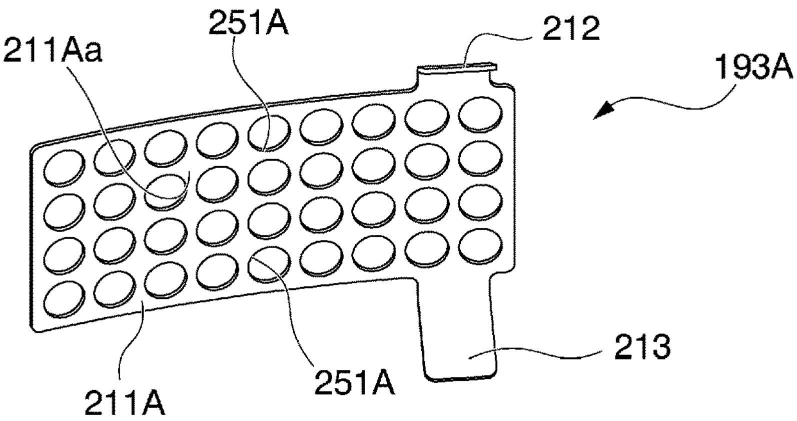
FIG. 28 is another perspective view illustrating the first modification example of the position setting plate portion of the disc brake of the first embodiment.

In the disc brake 10 of the first embodiment, in place of the position setting plate portion 193, a position setting plate portion 193A may be provided as illustrated in FIGS. 26 to 28. This position setting plate portion 193A has a curved plate portion 211A partially differing from the curved plate portion 211. The curved plate portion 211A differs from the curved plate portion 211 in that a plurality of holes 251A having a round hole shape penetrating the curved plate portion 211A in the plate thickness direction (radial direction) are formed in an array state. Thus, the curved plate portion 211A has an inward side curved surface portion 211Aa differing from the inward side curved surface portion 211*a* in that the plurality of holes 251A open and has an outward side curved surface portion 211Ab differing from the outward side curved surface portion 211*b* in that the plurality of holes 251A open. The position setting plate portion 193A is a so-called perforated metal. If such a position setting plate portion 193A is used, air including brake dust can be caused to favorably flow into the dust collection portion 191 through the plurality of holes 251A, and therefore brake dust can be even more efficiently collected by the dust collection portion 191.

Figure 29:
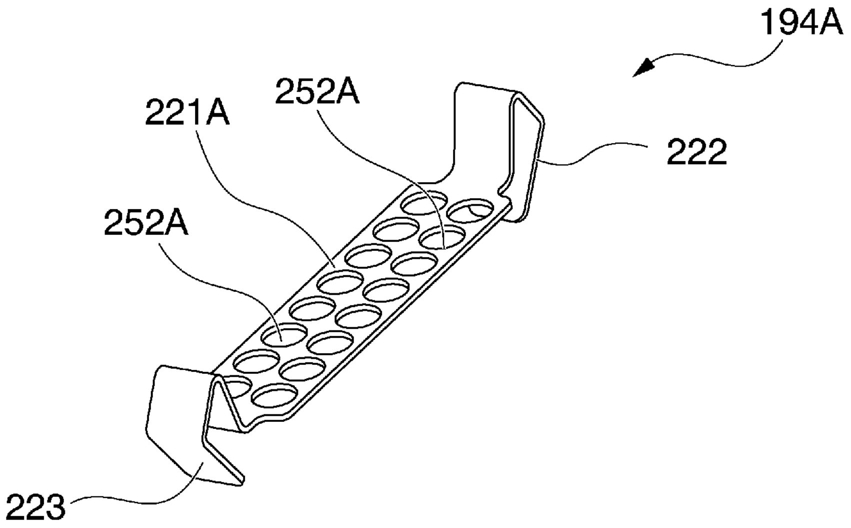
FIG. 29 is a perspective view illustrating a first modification example of a clip-type plate portion of the disc brake of the first embodiment.
Figure 30:
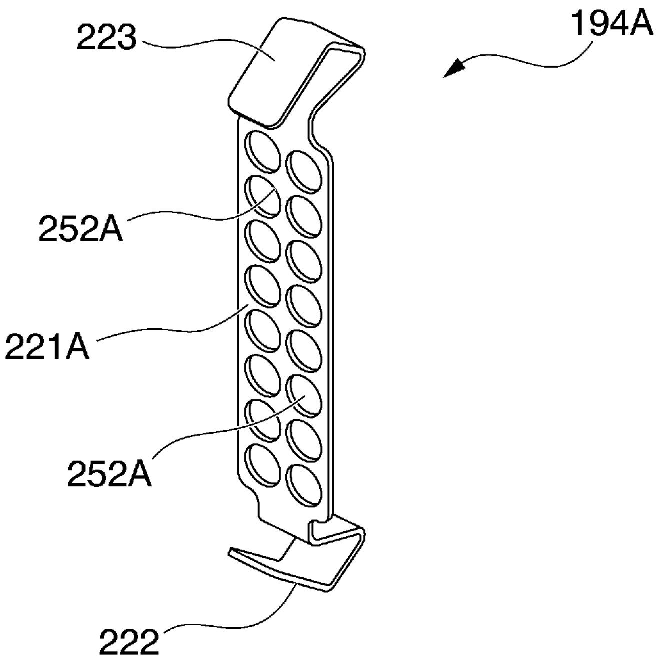
FIG. 30 is another perspective view illustrating the first modification example of the clip-type plate portion of the disc brake of the first embodiment.

In addition, in the disc brake 10 of the first embodiment, in place of the clip-type plate portion 194, a clip-type plate portion 194A may be provided as illustrated in FIGS. 29 and 30. This clip-type plate portion 194A has a substrate portion 221A partially differing from the substrate portion 221. The substrate portion 221A differs from the substrate portion 221 in that a plurality of holes 252A having a round hole shape penetrating the substrate portion 221A in the plate thickness direction are formed in an array state. The clip-type plate portion 194A is a so-called perforated metal. If such a clip-type plate portion 194A is used, air including brake dust can be caused to favorably flow to the dust collection portion 191 through the plurality of holes 252A, and therefore brake dust can be even more efficiently collected by the dust collection portion 191.

Second Modification Example

Figure 31:
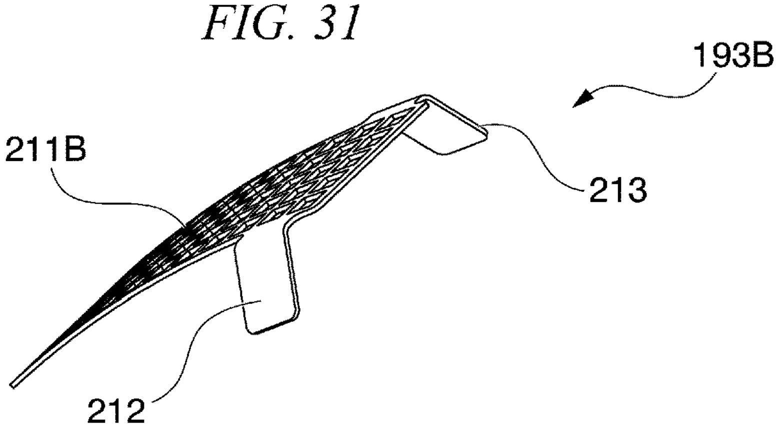
FIG. 31 is a perspective view illustrating a second modification example of a position setting plate portion of the disc brake of the first embodiment.
Figure 32:
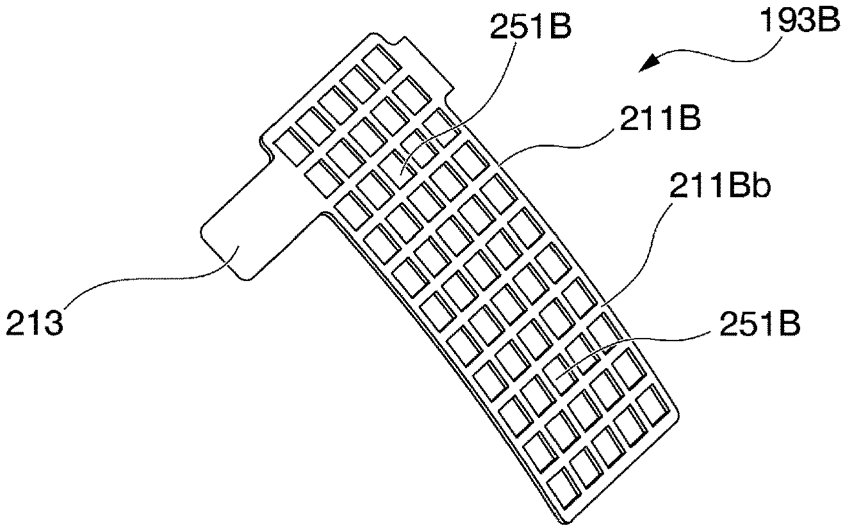
FIG. 32 is another perspective view illustrating the second modification example of the position setting plate portion of the disc brake of the first embodiment.
Figure 33:
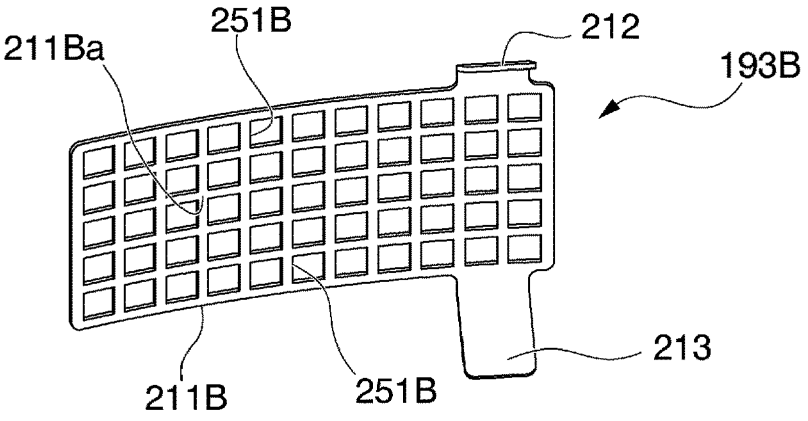
FIG. 33 is another perspective view illustrating the second modification example of the position setting plate portion of the disc brake of the first embodiment.

In the disc brake 10 of the first embodiment, in place of the position setting plate portion 193, a position setting plate portion 193B may be provided as illustrated in FIGS. 31 to 33. This position setting plate portion 193B has a curved plate portion 211B partially differing from the curved plate portion 211. The curved plate portion 211B differs from the curved plate portion 211 in that a plurality of holes 251B having an angular hole shape penetrating the curved plate portion 211B in the plate thickness direction (radial direction) are formed in an array state. Thus, the curved plate portion 211B has an inward side curved surface portion 211Ba differing from the inward side curved surface portion 211*a* in that the plurality of holes 251B open and has an outward side curved surface portion 211Bb differing from the outward side curved surface portion 211*b* in that the plurality of holes 251B open. The position setting plate portion 193B is a so-called mesh metal. If such a position setting plate portion 193B is used, air including brake dust can be caused to favorably flow to the dust collection portion 191 through the plurality of holes 251B, and therefore brake dust can be even more efficiently collected by the dust collection portion 191.

Figure 34:
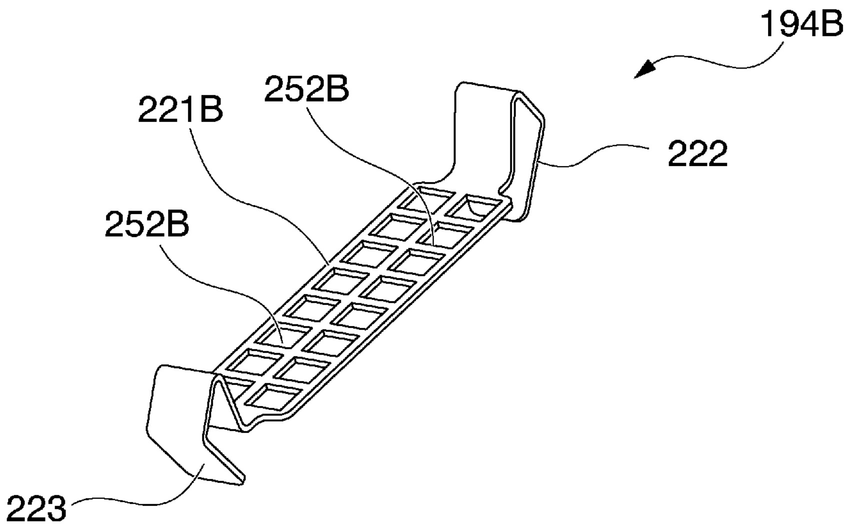
FIG. 34 is a perspective view illustrating a second modification example of a clip-type plate portion of the disc brake of the first embodiment.
Figure 35:
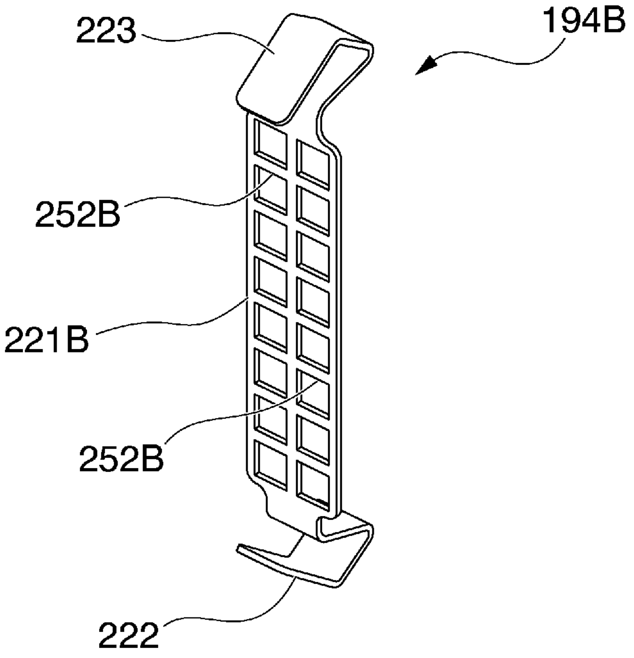
FIG. 35 is another perspective view illustrating the second modification example of the clip-type plate portion of the disc brake of the first embodiment.
Figure 36:
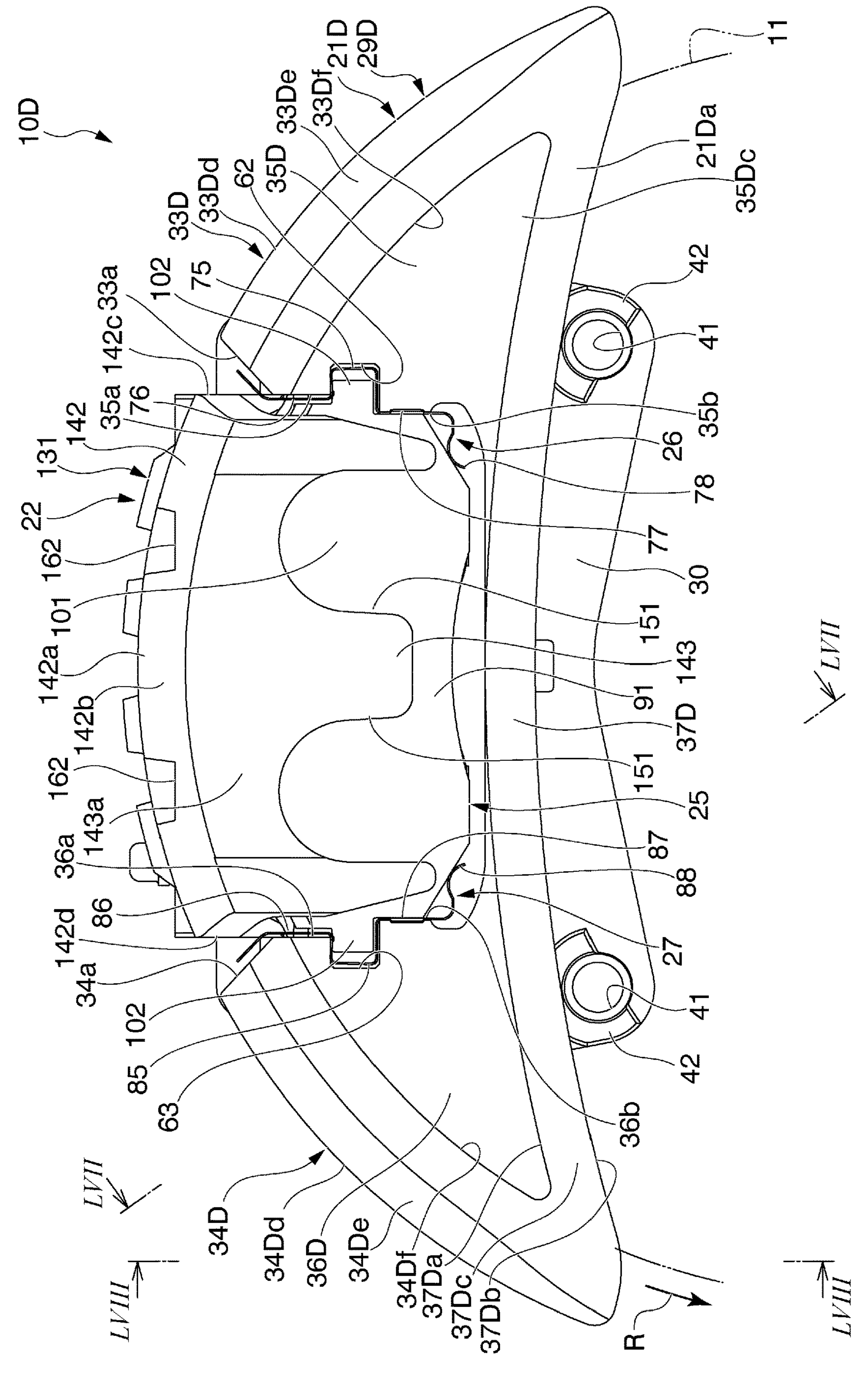
FIG. 36 is a front view illustrating a disc brake of a second embodiment.
Figure 37:
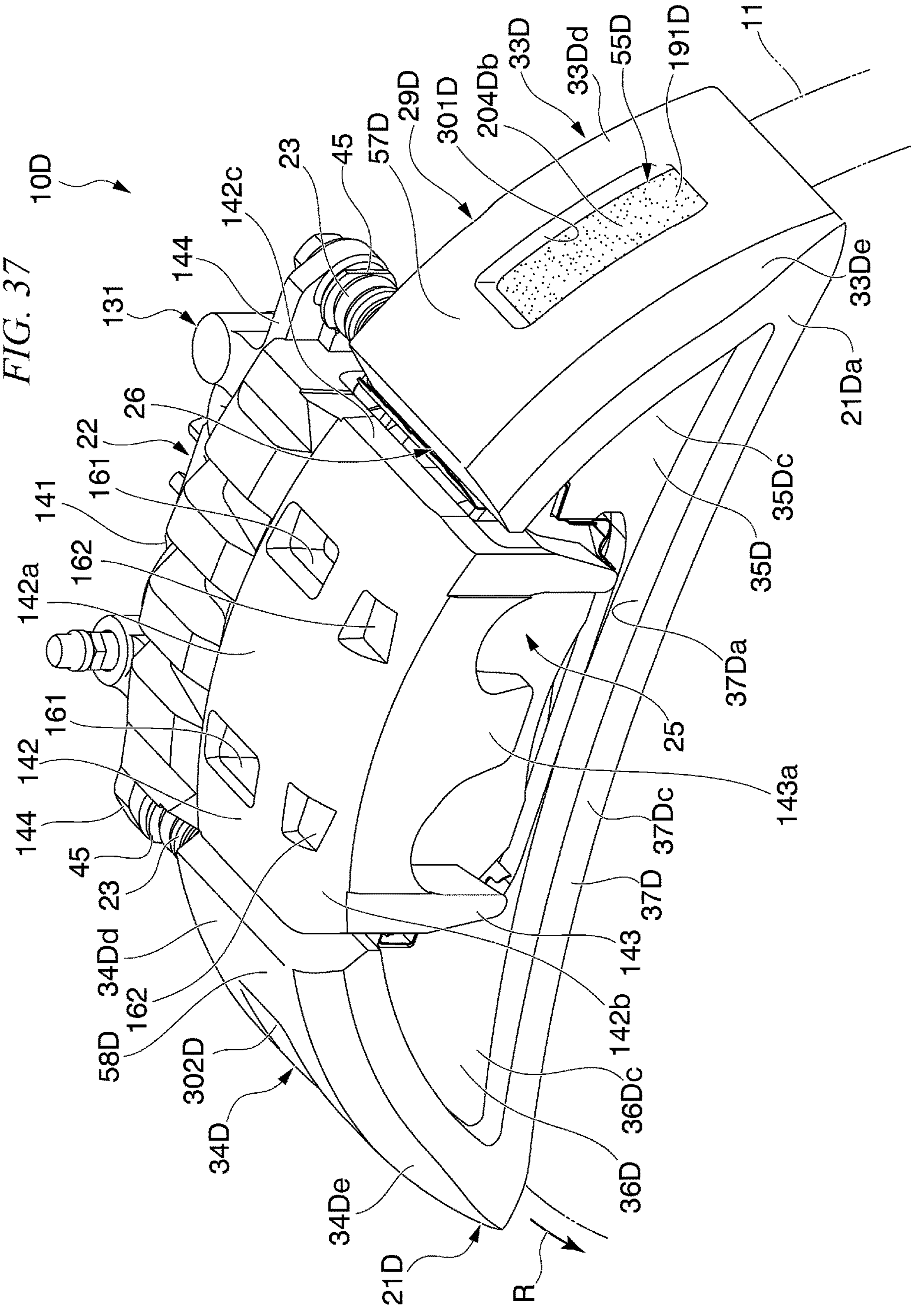
FIG. 37 is a perspective view illustrating the disc brake of the second embodiment.
Figure 38:
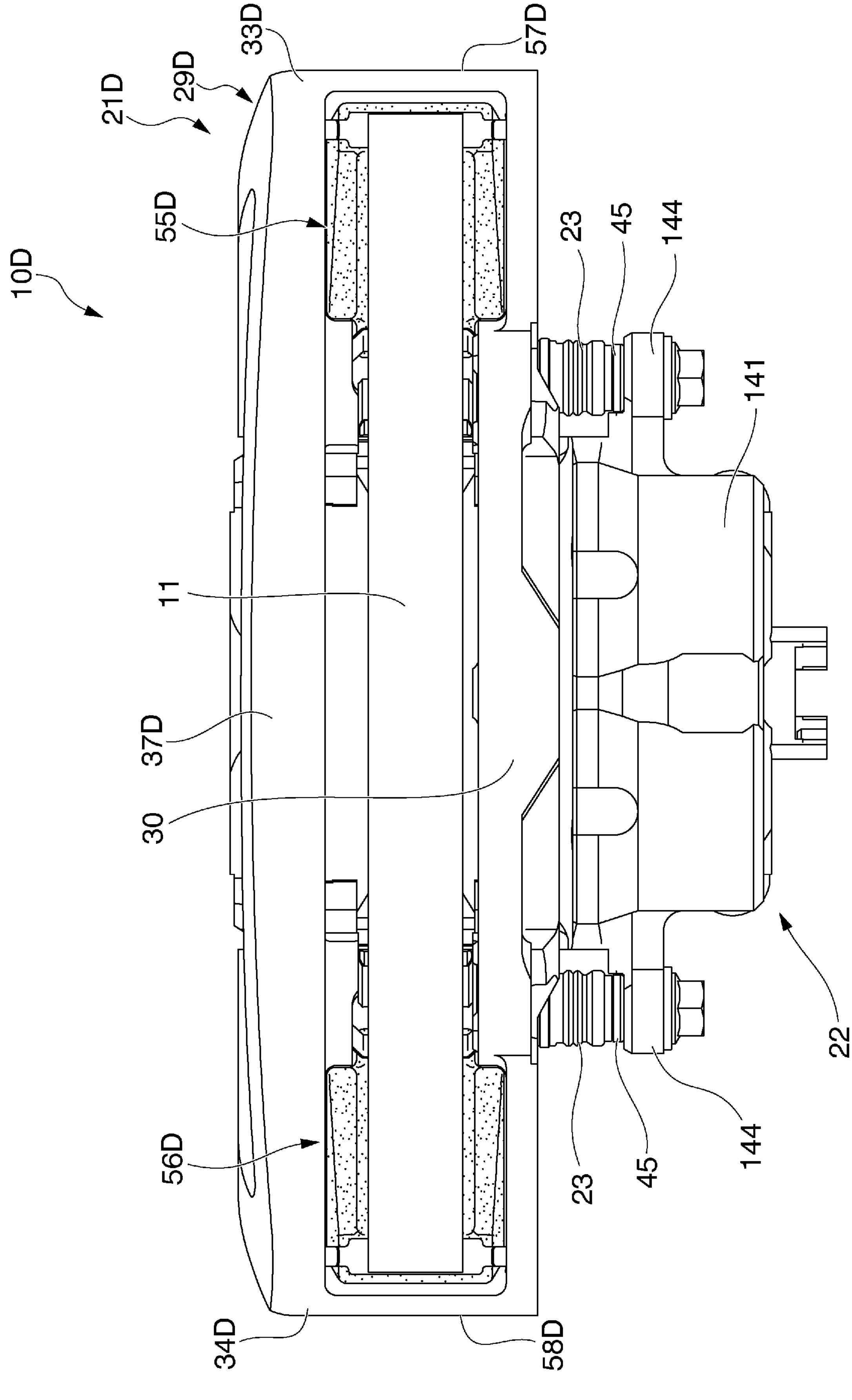
FIG. 38 is a view illustrating the disc brake of the second embodiment viewed from the inward side in the disc radial direction.
Figure 39:
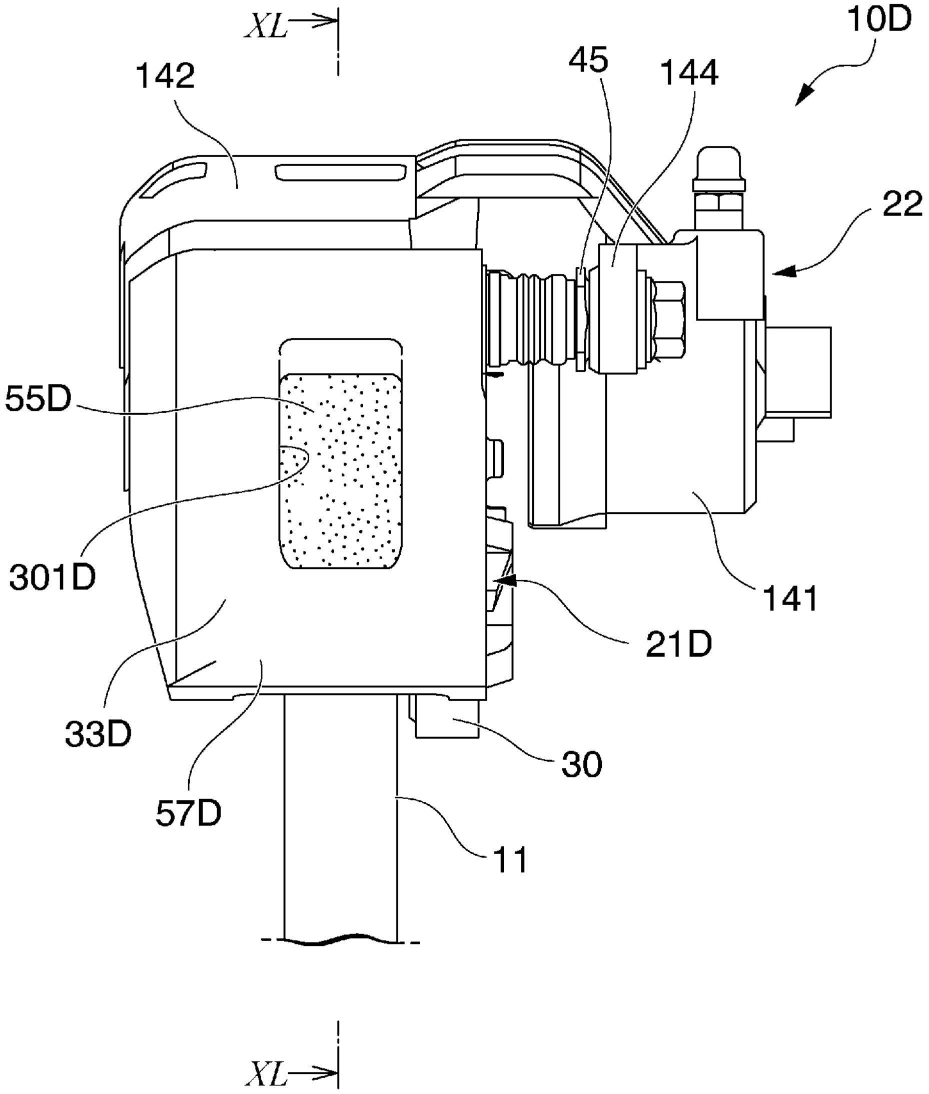
FIG. 39 is a side view illustrating the disc brake of the second embodiment.

In addition, in the disc brake 10 of the first embodiment, in place of the clip-type plate portion 194, a clip-type plate portion 194B as illustrated in FIGS. 34 and 35 may be provided. This clip-type plate portion 194B has a substrate portion 221B partially differing from the substrate portion 221. The substrate portion 221B differs from the substrate portion 221 in that a plurality of holes 252B having an angular hole shape penetrating the substrate portion 221B in the plate thickness direction are provided in an array state. The clip-type plate portion 194B is a so-called mesh metal. If such a clip-type plate portion 194B is used, air including brake dust can be caused to favorably flow to the dust collection portion 191 through the holes 252B, and therefore brake dust can be even more efficiently collected by the dust collection portion 191.

Second Embodiment

A second embodiment will be described focusing on parts differing from the first embodiment mainly on the basis of FIGS. 36 to 64. Parts common to those of the first embodiment will be expressed by the same names and the same reference signs.

As illustrated in FIGS. 36 to 45, in place of the carrier 21 of the first embodiment, a disc brake 10D of the second embodiment includes a carrier 21D partially differing from it. The carrier 21D has a carrier main body 29D partially differing from the carrier main body 29 and has a pair of filter portions 55D and 56D partially differing from the filter portions 55 and 56 as illustrated in FIGS. 41 to 44.

Figure 46:
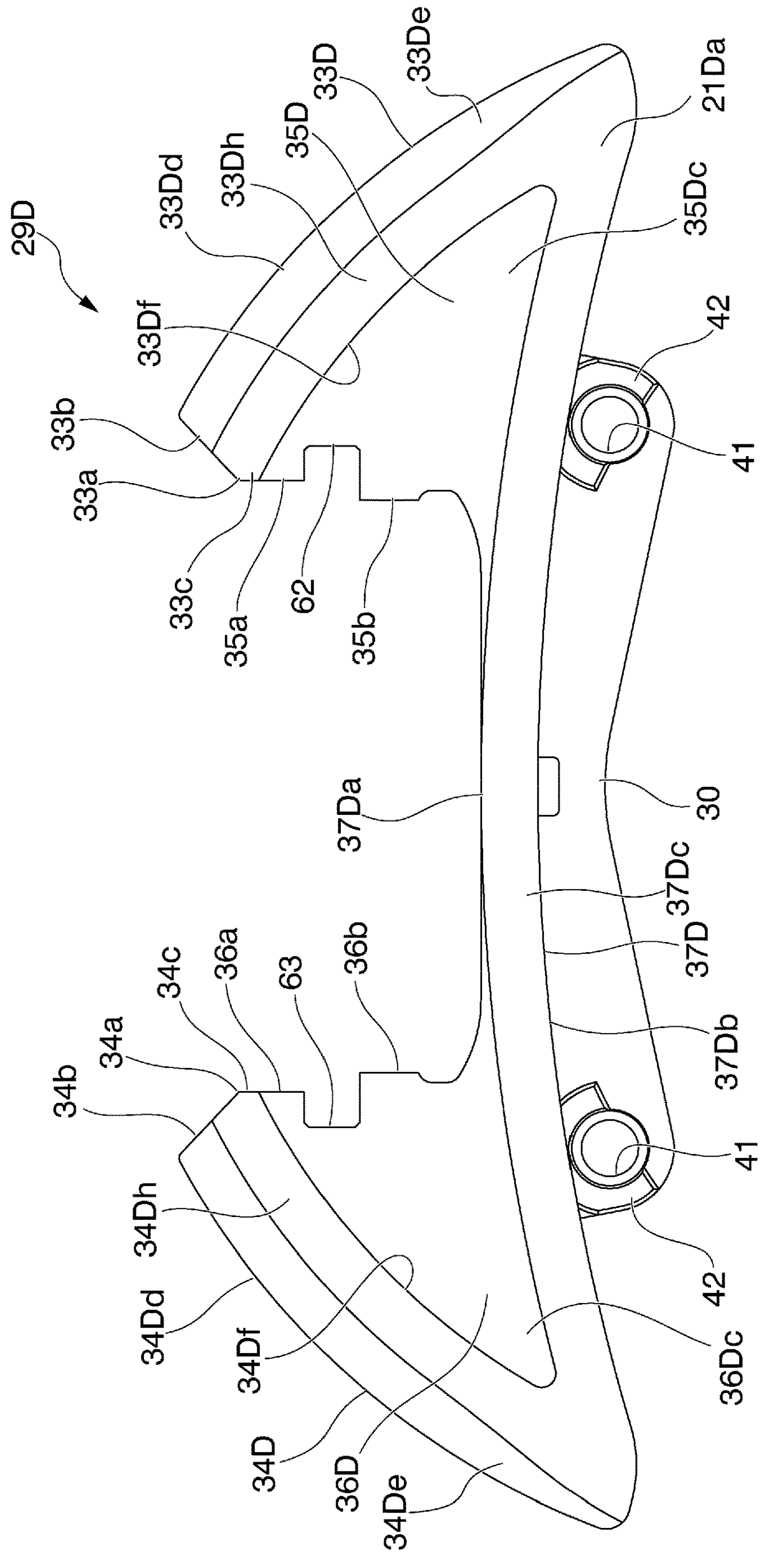
FIG. 46 is a front view illustrating a carrier main body of the disc brake of the second embodiment.
Figure 47:
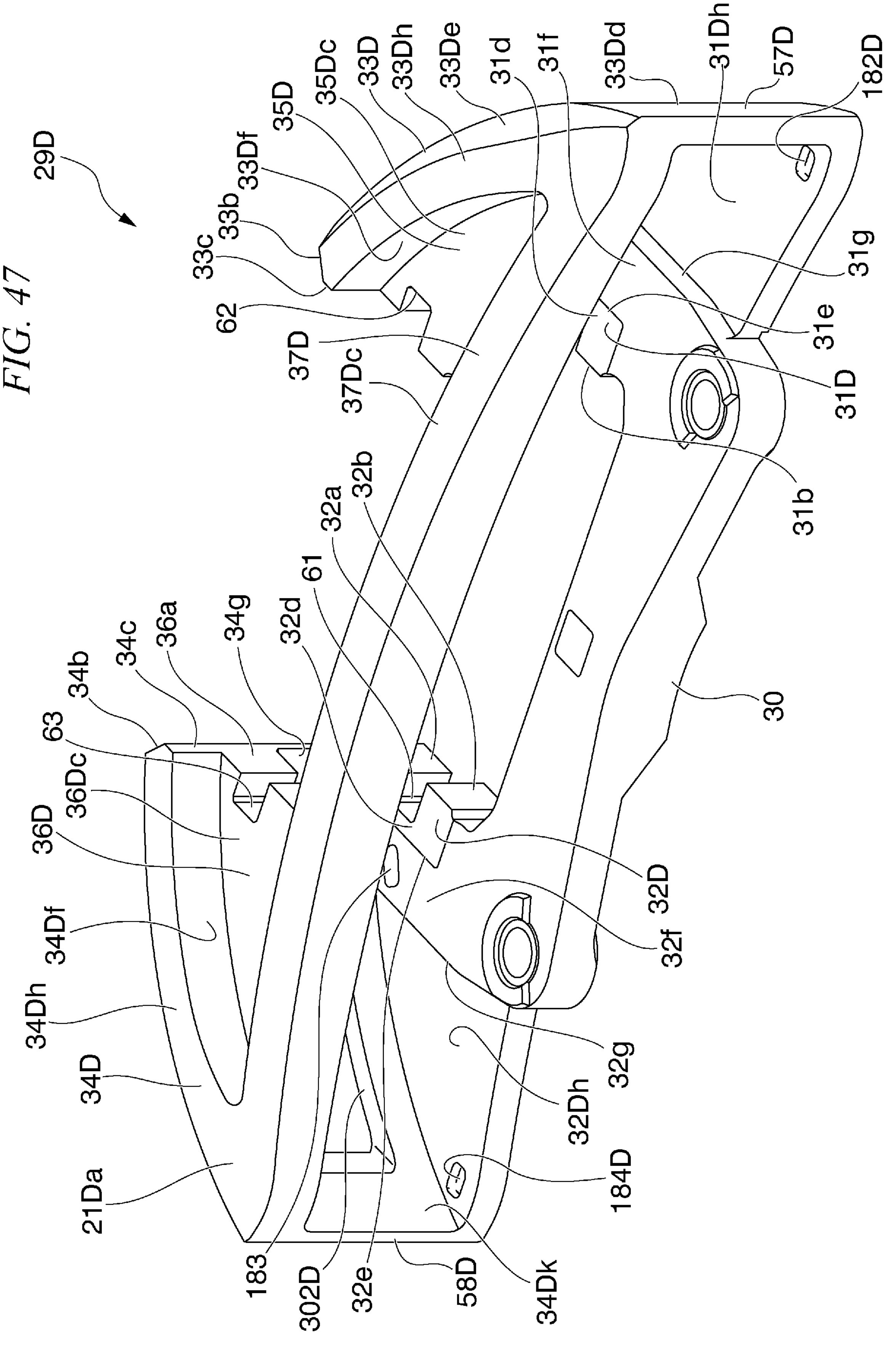
FIG. 47 is a perspective view illustrating the carrier main body of the disc brake of the second embodiment.
Figure 48:
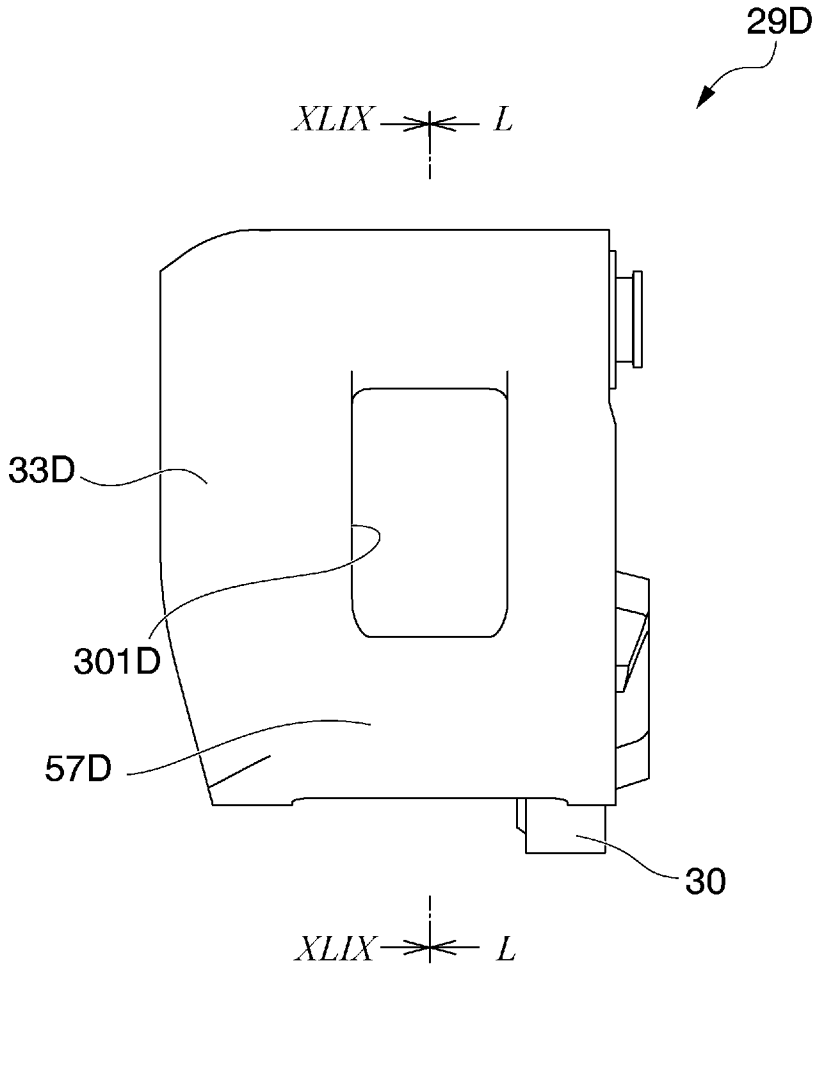
FIG. 48 is a side view illustrating the carrier main body of the disc brake of the second embodiment.
Figure 49:
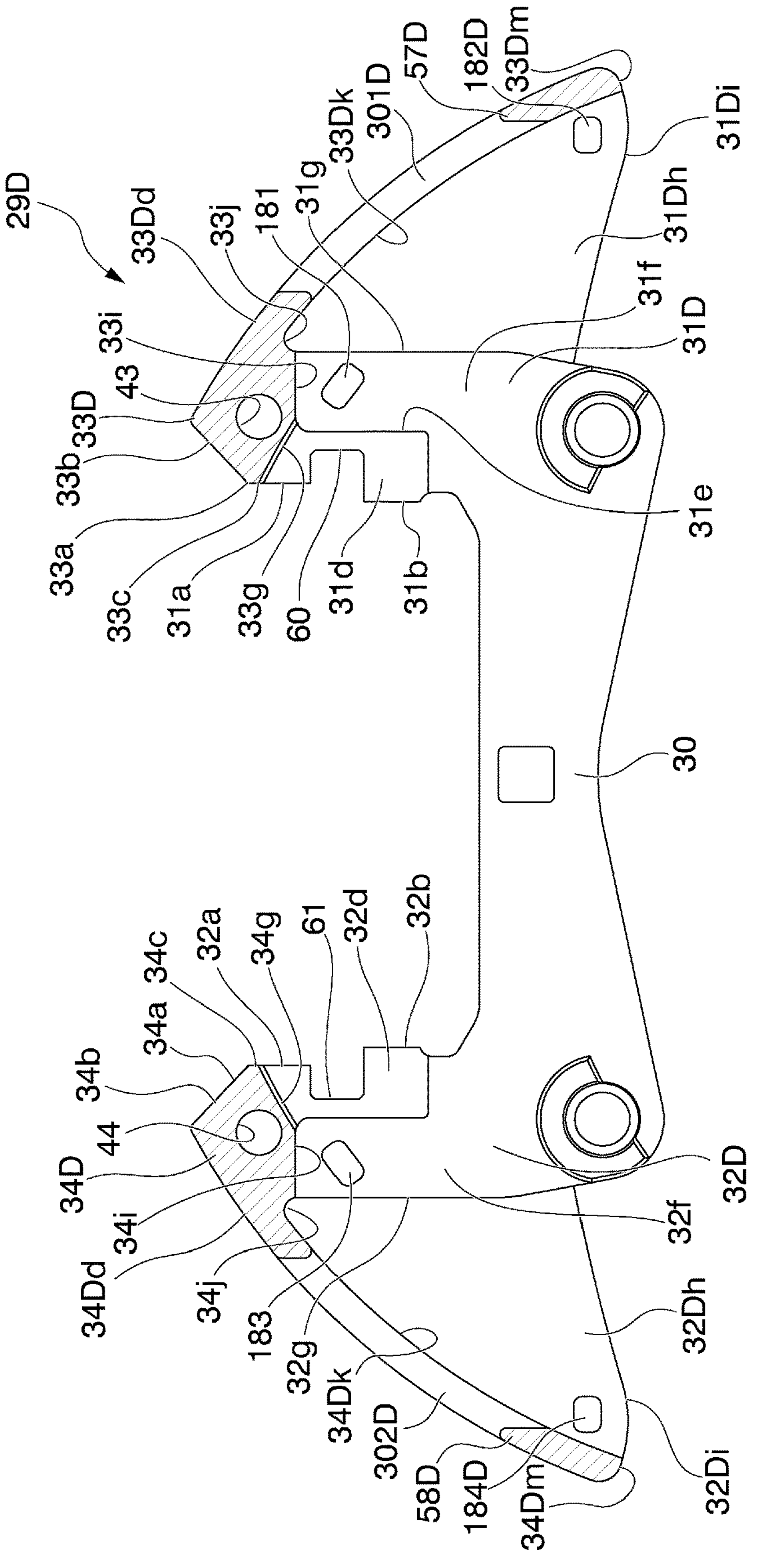
FIG. 49 is a cross-sectional view along XLIX-XLIX in FIG. 48 illustrating the carrier main body of the disc brake of the second embodiment.
Figure 50:
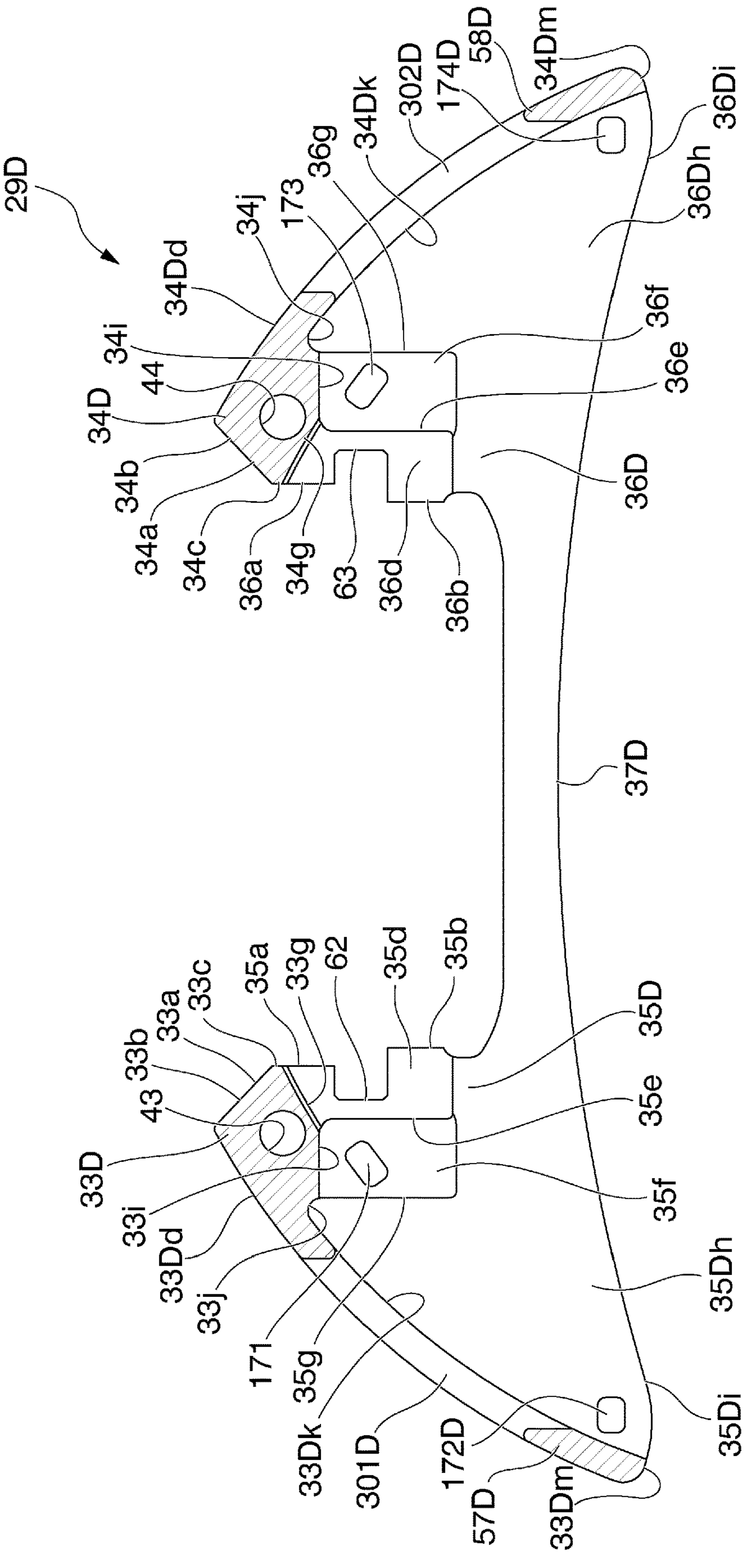
FIG. 50 is a cross-sectional view along L-L in FIG. 48 illustrating the carrier main body of the disc brake of the second embodiment.

The carrier main body 29D has the shape illustrated in FIGS. 46 to 50. As illustrated in FIGS. 46, 47, 49, and 50, the carrier main body 29D has a pair of outer circumferential frame portions 33D and 34D differing from the pair of outer circumferential frame portions 33 and 34 in having a shape elongated in the disc circumferential direction. According to this, as illustrated in FIGS. 47 and 49, the carrier main body 29D has a pair of inner side pad support portions 31D and 32D differing from the pair of inner side pad support portions 31 and 32 in having a shape elongated in the disc circumferential direction. In addition, as illustrated in FIGS. 46, 47, and 50, the carrier main body 29D has a pair of outer side pad support portions 35D and 36D differing from the pair of outer side pad support portions 35 and 36 in having a shape elongated in the disc circumferential direction. As illustrated in FIGS. 46 and 47, the carrier main body 29D has a coupling beam portion 37D differing from the coupling beam portion 37 in shape. The carrier main body 29D also has a shape of mirror symmetry based on the center in the disc circumferential direction.

As illustrated in FIG. 46, the outer circumferential frame portion 33D has an outer circumferential end surface 33Dd differing from the outer circumferential end surface 33*d* in being elongated in the disc circumferential direction. The outer circumferential frame portion 33D has a chamfer 33De differing from the chamfer 33*e* in being elongated in the disc circumferential direction. The outer circumferential frame portion 33D has an inner circumferential end surface 33Df differing from the inner circumferential end surface 33*f* in being elongated in the disc circumferential direction. The outer circumferential frame portion 33D has an outward side end surface 33Dh differing from the outward side end surface 33*h* in being elongated in the disc circumferential direction. As illustrated in FIGS. 49 and 50, the outer circumferential frame portion 33D has an inner circumferential abutment surface 33Dk differing from the inner circumferential abutment surface 33*k* in being elongated in the disc circumferential direction. The outer circumferential frame portion 33D has a disc path portion 57D differing from the disc path portion 57 in being elongated in the disc circumferential direction. The outer circumferential frame portion 33D has a circumferential direction end surface 33Dm differing from the circumferential direction end surface 33*m*. The circumferential direction end surface 33Dm has a longer distance in the disc circumferential direction from the outward side facing surface portion 33*b* than that of the circumferential direction end surface 33*m*.

In the outer circumferential frame portion 33D, a hole 301D penetrating the outer circumferential frame portion 33D along the reference line in the disc radial direction is formed between the outer side pad support portion 35D and the inner side pad support portion 31D. In the hole 301D, one end opens on the outer circumferential end surface 33Dd, and the other end opens on the inner circumferential abutment surface 33Dk.

As illustrated in FIG. 46, the outer circumferential frame portion 34D has an outer circumferential end surface 34Dd differing from the outer circumferential end surface 34*d* in being elongated in the disc circumferential direction. The outer circumferential frame portion 34D has a chamfer 34De differing from the chamfer 34*e* in being elongated in the disc circumferential direction. The outer circumferential frame portion 34D has an inner circumferential end surface 34Df differing from the inner circumferential end surface 34*f* in being elongated in the disc circumferential direction. The outer circumferential frame portion 34D has an outward side end surface 34Dh differing from the outward side end surface 34*h* in elongated in the disc circumferential direction. As illustrated in FIGS. 49 and 50, the outer circumferential frame portion 34D has an inner circumferential abutment surface 34Dk differing from the inner circumferential abutment surface 34*k* in being elongated in the disc circumferential direction. The outer circumferential frame portion 34D has a disc path portion 58D differing from the disc path portion 58 in being elongated in the disc circumferential direction. The outer circumferential frame portion 34D has a circumferential direction end surface 34Dm differing from the circumferential direction end surface 34*m*. The circumferential direction end surface 34Dm has a longer distance in the disc circumferential direction from the outward side facing surface portion 34*b* than that of the circumferential direction end surface 34*m*.

In the outer circumferential frame portion 34D, a hole 302D penetrating the outer circumferential frame portion 34D along the reference line in the disc radial direction is formed between the outer side pad support portion 36D and the inner side pad support portion 32D. In the hole 302D, one end opens on the outer circumferential end surface 34Dd, and the other end opens on the inner circumferential abutment surface 34Dk.

As illustrated in FIGS. 46 and 47, the outer side pad support portion 35D has an outward side end surface 35Dc differing from the outward side end surface 35*c* in being elongated in the disc circumferential direction. As illustrated in FIG. 50, the outer side pad support portion 35D has an inward facing abutment surface 35Dh differing from the inward facing abutment surface 35*h* in being elongated in the disc circumferential direction. The outer side pad support portion 35D has a surface portion 35Di differing from the surface portion 35*i*. The surface portion 35Di is inclined in a manner of being positioned on the inward side in the disc radial direction in the direction of the reference line in the disc radial direction toward the outward side in the disc circumferential direction. In the outer side pad support portion 35D, a second engagement hole 172D differing from the second engagement hole 172 in position and angle is formed. The second engagement hole 172D is formed in the vicinity of the end portion of the inward facing abutment surface 35Dh on a side opposite to the outer side pad support portion 36D in the disc circumferential direction and elongated in a direction orthogonal to the reference line in the disc radial direction.

As illustrated in FIGS. 46 and 47, the outer side pad support portion 36D has an outward side end surface 36Dc differing from the outward side end surface 36*c* in being elongated in the disc circumferential direction. As illustrated in FIG. 50, the outer side pad support portion 36D has an inward facing abutment surface 36Dh differing from the inward facing abutment surface 36*h* in being elongated in the disc circumferential direction. The outer side pad support portion 36D has a surface portion 36Di differing from the surface portion 36*i*. The surface portion 36Di is inclined in a manner of being positioned on the inward side in the disc radial direction in the direction of the reference line in the disc radial direction toward the outward side in the disc circumferential direction. In the outer side pad support portion 36D, a second engagement hole 174D differing from the second engagement hole 174 in position and angle is formed. The second engagement hole 174D is formed in the vicinity of the end portion of the inward facing abutment surface 36Dh on a side opposite to the outer side pad support portion 35D in the disc circumferential direction and elongated in a direction orthogonal to the reference line in the disc radial direction.

As illustrated in FIG. 46, the coupling beam portion 37D is curved in an arc shape in a manner of being positioned on the inward side in the disc radial direction in the direction of the reference line in the disc radial direction as being away from the center in the disc circumferential direction. The coupling beam portion 37D has an outward facing end surface 37Da differing from the outward facing end surface 37*a*, an inward facing end surface 37Db differing from the inward facing end surface 37*b*, and an outward side end surface 37Dc differing from the outward side end surface 37*c*. The outward facing end surface 37Da forms a part of a cylindrical surface shape, and the inward facing end surface 37Db also forms a part of a cylindrical surface shape. The outward side end surface 37Dc has an arc shape. Thus, the carrier 21D and the carrier main body 29D have an outward side end surface 21Da differing from the outward side end surface 21*a* in shape in the end portion on the outward side in the disc axial direction.

As illustrated in FIG. 49, the inner side pad support portion 31D has an outward facing abutment surface 31Dh differing from the outward facing abutment surface 31*h* in being elongated in the disc circumferential direction. The inner side pad support portion 31D has a surface portion 31Di differing from the surface portion 31*i*. The surface portion 31Di is inclined in a manner of being positioned on the inward side in the disc radial direction in the direction of the reference line in the disc radial direction toward the outward side in the disc circumferential direction. In the inner side pad support portion 31D, a second engagement hole 182D differing from the second engagement hole 182 in position and angle is formed. The second engagement hole 182D is formed in the vicinity of the end portion of the outward facing abutment surface 31Dh on a side opposite to the inner side pad support portion 32D in the disc circumferential direction and elongated in a direction orthogonal to the reference line in the disc radial direction. The second engagement hole 182D faces the second engagement hole 172D in the disc axial direction in a manner of being positionally aligned in the disc radial direction and the disc circumferential direction.

The inner side pad support portion 32D has an outward facing abutment surface 32Dh differing from the outward facing abutment surface 32*h* in being elongated in the disc circumferential direction. The inner side pad support portion 32D has a surface portion 32Di differing from the surface portion 32*i*. The surface portion 32Di is inclined in a manner of being positioned on the inward side in the disc radial direction in the direction of the reference line in the disc radial direction toward the outward side in the disc circumferential direction. In the inner side pad support portion 32D, a second engagement hole 184D differing from the second engagement hole 184 in position and angle is formed. The second engagement hole 184D is formed in the vicinity of the end portion of the outward facing abutment surface 32Dh on a side opposite to the inner side pad support portion 31D in the disc circumferential direction and elongated in a direction orthogonal to the reference line in the disc radial direction. The second engagement hole 184D faces the second engagement hole 174D in the disc axial direction in a manner of being positionally aligned in the disc radial direction and the disc circumferential direction.

Figure 42:
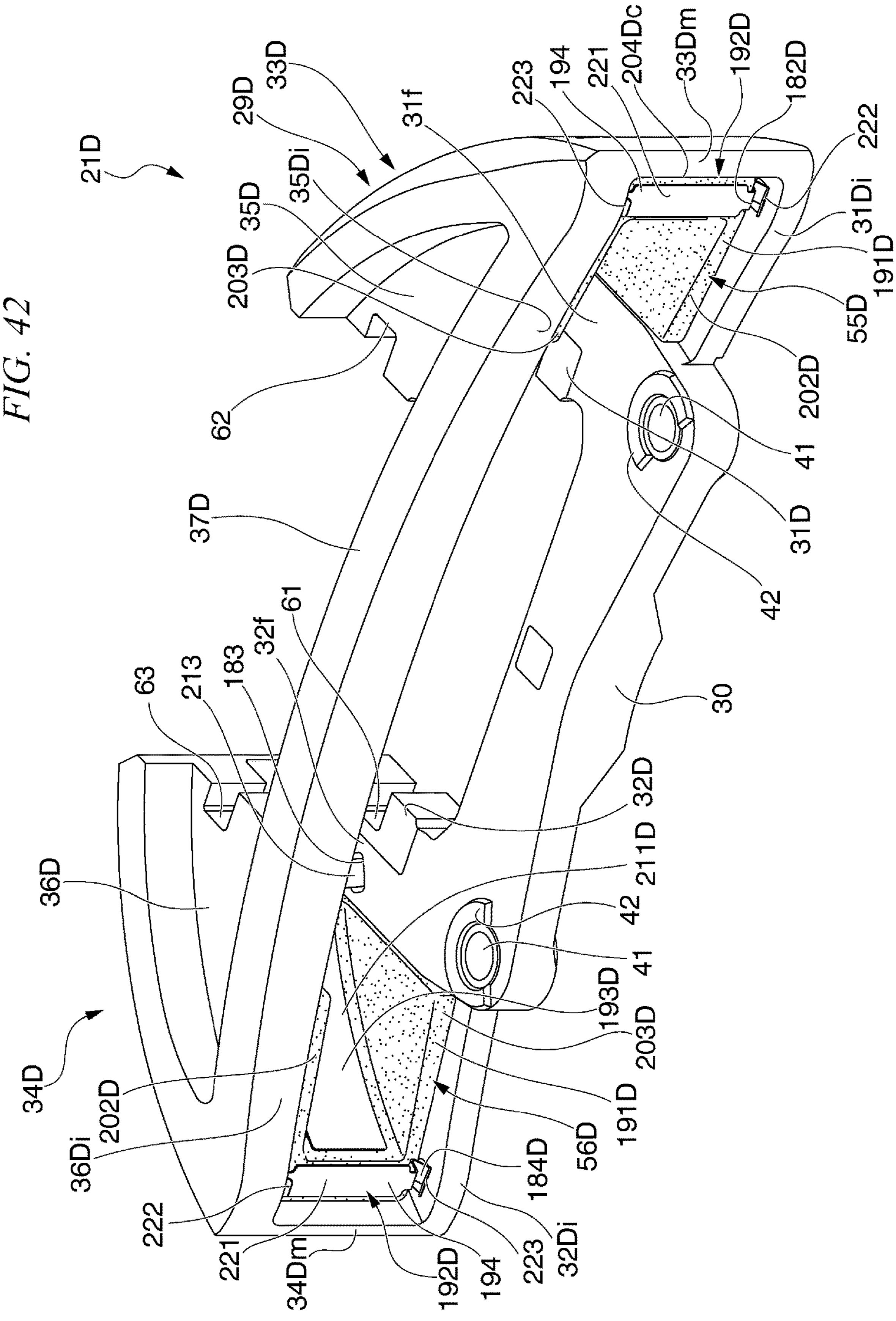
FIG. 42 is a perspective view illustrating a carrier of the disc brake of the second embodiment.
Figure 43:
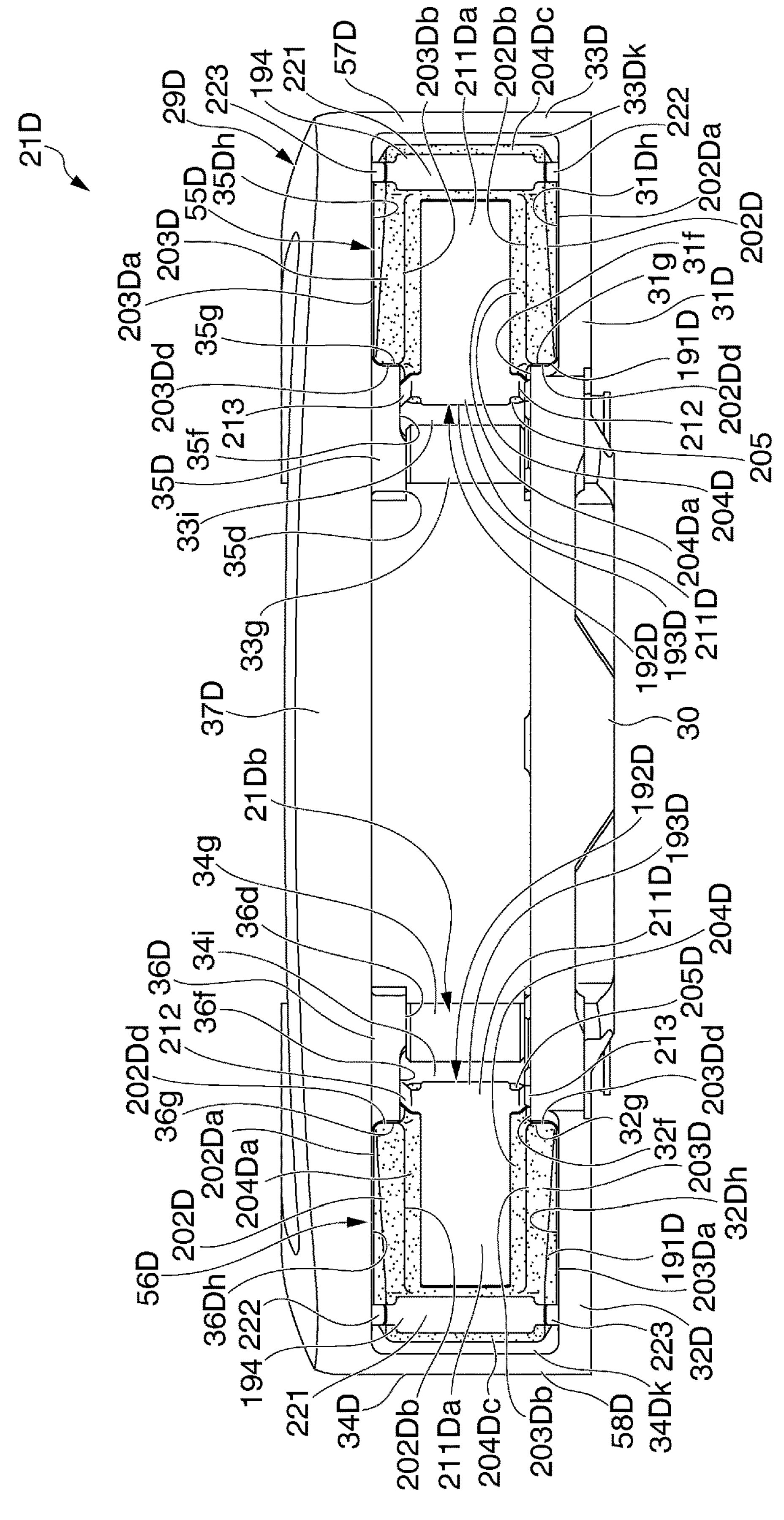
FIG. 43 is a view illustrating the carrier of the disc brake of the second embodiment viewed from the inward side in the disc radial direction.
Figure 44:
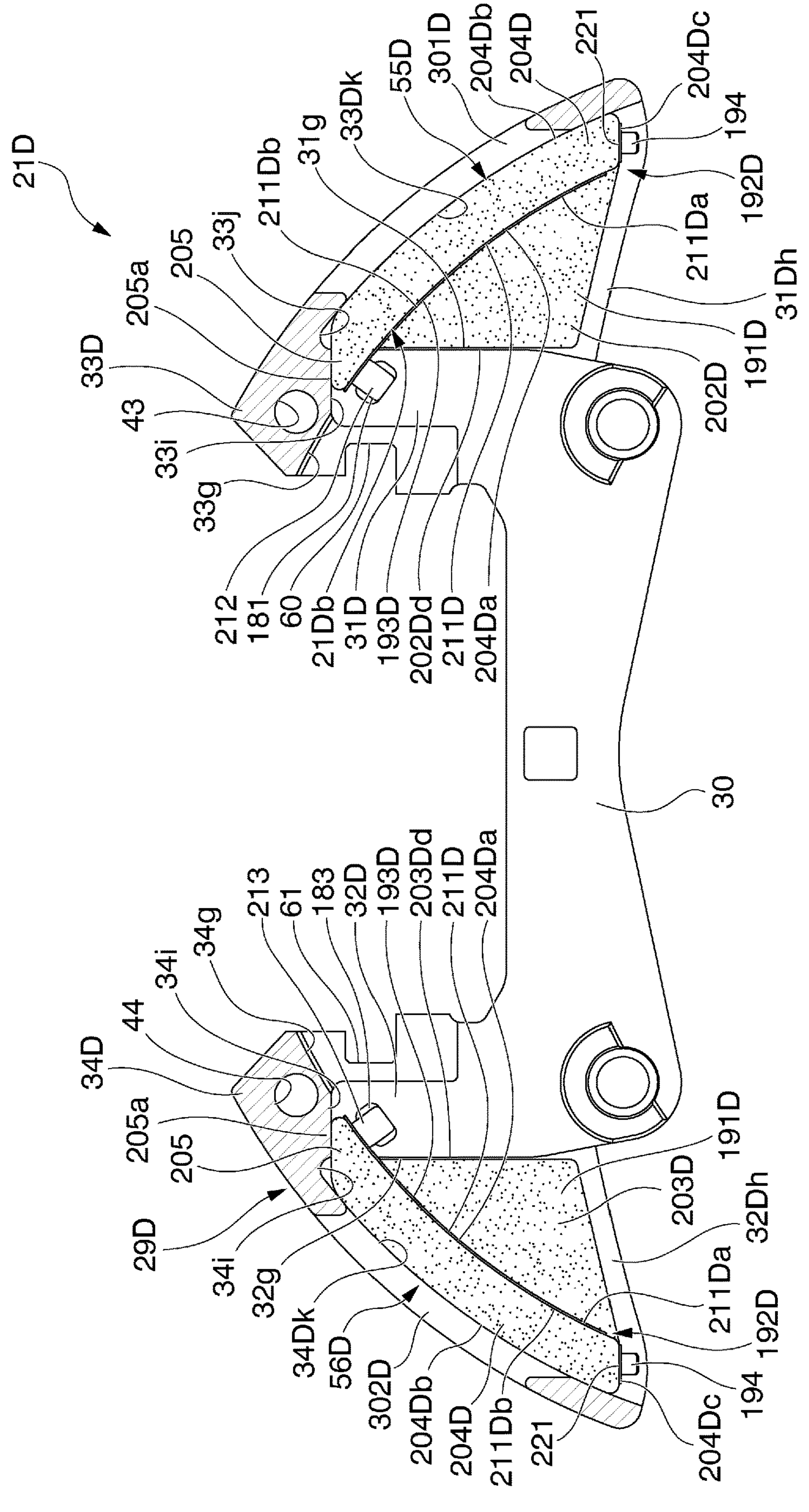
FIG. 44 is a cross-sectional view along XL-XL in FIG. 39 illustrating the carrier of the disc brake of the second embodiment.
Figure 45:
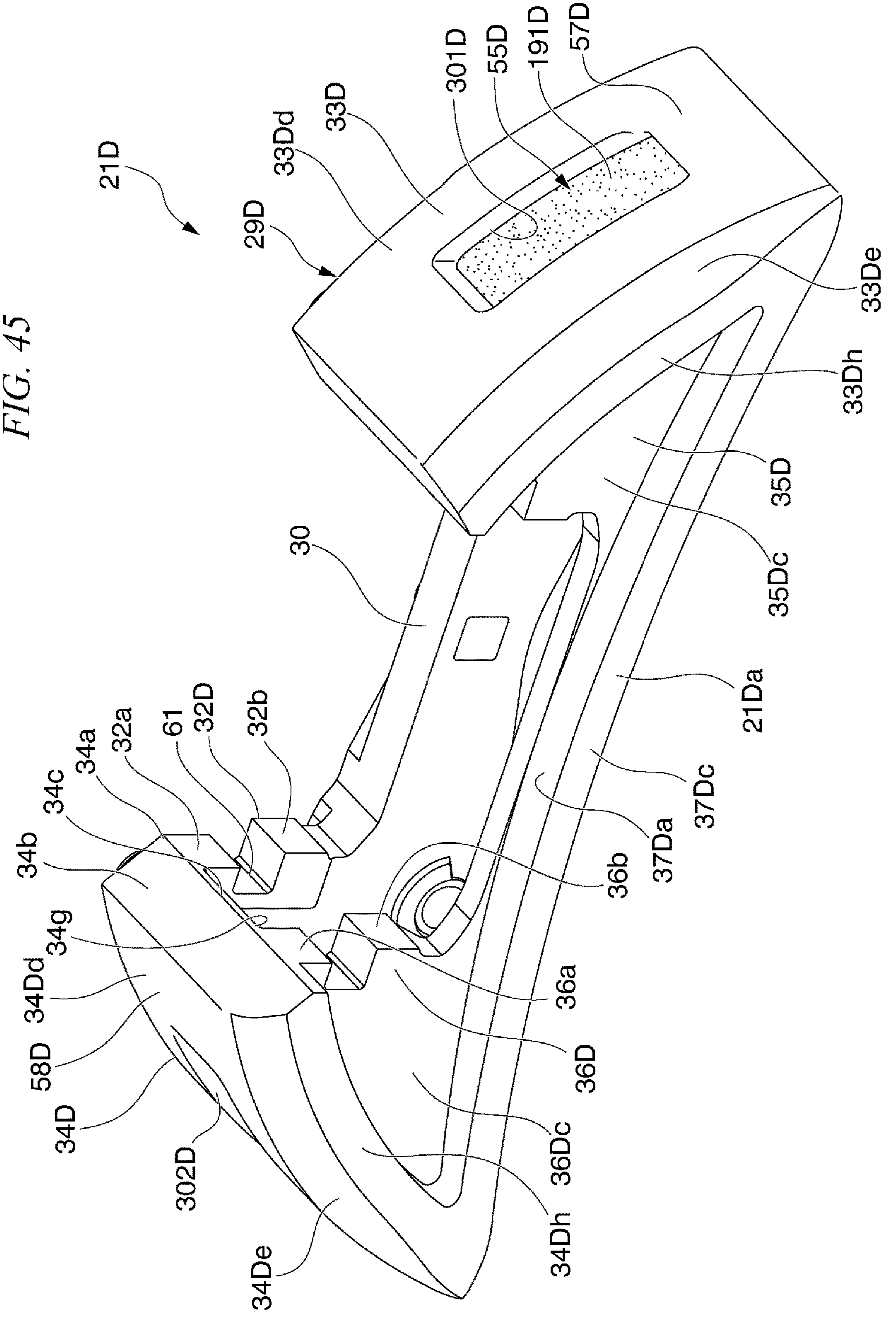
FIG. 45 is a perspective view illustrating the carrier of the disc brake of the second embodiment.

The filter portions 55D and 56D illustrated in FIGS. 42 to 44 are also common components and disposed in the carrier main body 29D in a mirror symmetrical shape. Each of the filter portions 55D and 56D is constituted of a dust collection portion 191D partially differing from the dust collection portion 191, and an attachment plate 192D partially differing from the attachment plate 192. The attachment plate 192D has a position setting plate portion 193D partially differing from the position setting plate portion 193 and is made up of the position setting plate portion 193D and the clip-type plate portion 194.

Figure 51:
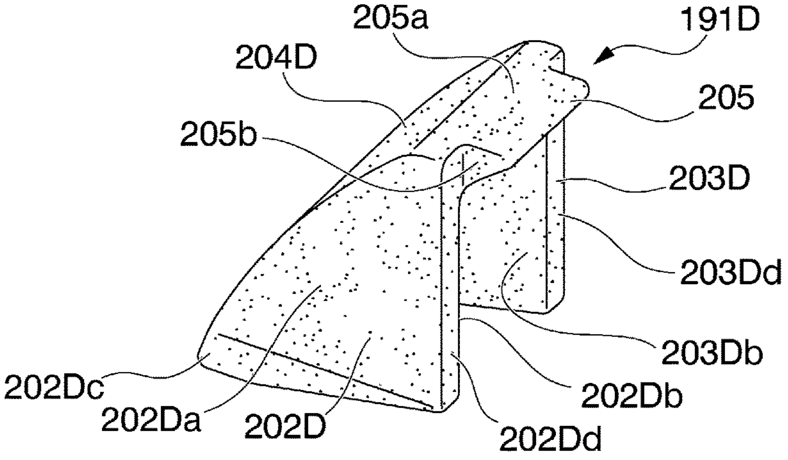
FIG. 51 is a perspective view illustrating a dust collection portion of the disc brake of the second embodiment.
Figure 52:
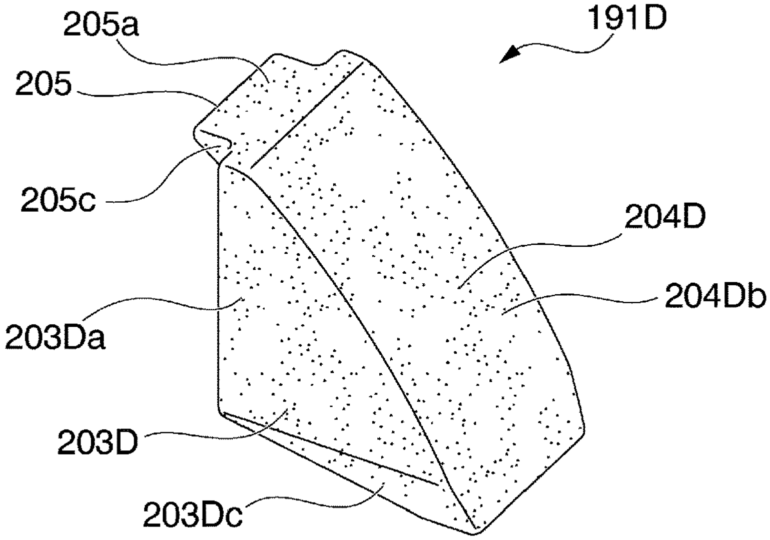
FIG. 52 is another perspective view illustrating the dust collection portion of the disc brake of the second embodiment.
Figure 53:
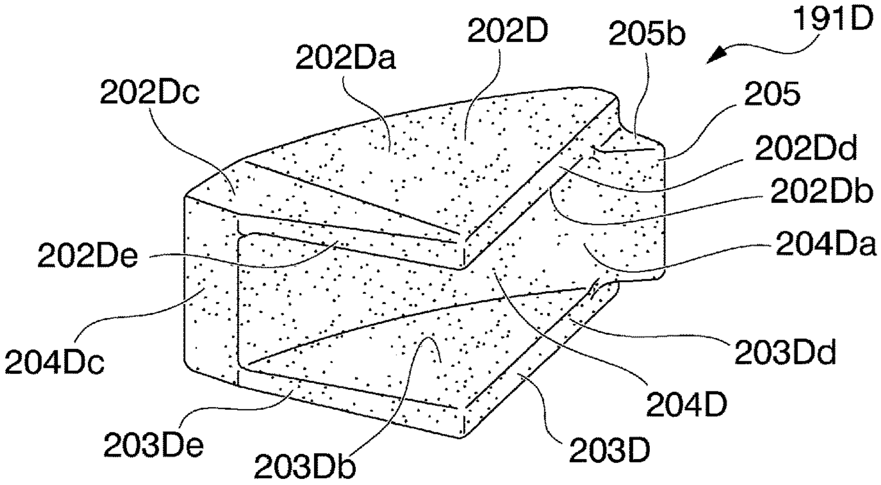
FIG. 53 is another perspective view illustrating the dust collection portion of the disc brake of the second embodiment.

As illustrated in FIGS. 51 to 53, the dust collection portion 191D has a curved portion 204D differing from the curved portion 204 in having a longer length in the circumferential direction. The curved portion 204D has an inward side curved surface portion 204Da differing from the inward side curved surface portion 204*a* in having a longer length in the circumferential direction. The curved portion 204D has an outward side curved surface portion 204Db differing from the outward side curved surface portion 204*b* in having a longer length in the circumferential direction. The dust collection portion 191D has a surface portion 204Dc differing from the surface portion 204*c*. The surface portion 204Dc has a longer distance from the projection portion 205 than that of the surface portion 204*c*.

The dust collection portion 191D has a plate portion 202D differing from the plate portion 202 in having a longer length extending to a side opposite to the projection portion 205. The plate portion 202D has an outer surface portion 202Da differing from the outer surface portion 202*a* in having a longer length extending to a side opposite to the projection portion 205. The plate portion 202D has an inner surface portion 202Db differing from the inner surface portion 202*b* in having a longer length extending to a side opposite to the projection portion 205. The plate portion 202D has a surface portion 202Dd differing from the surface portion 202*d* in having a longer length extending to a side opposite to the projection portion 205. The plate portion 202D has a surface portion 202De differing from the surface portion 202*e*. The surface portion 202De is inclined with respect to the surface portion 204Dc such that the surface portion 204Dc side is flush with the surface portion 204Dc and approaches the projection portion 205 toward the inner surface portion 202Db side. The plate portion 202D has an inclined surface portion 202Dc differing from the inclined surface portion 202*c*. In the inclined surface portion 202Dc, a width in a direction in which the outer surface portion 202Da and the surface portion 202De are connected becomes narrower toward the surface portion 202Dd side.

The dust collection portion 191D has a plate portion 203D differing from the plate portion 203 in having a longer length extending to a side opposite to the projection portion 205. The plate portion 203D has an outer surface portion 203Da differing from the outer surface portion 203*a* in having a longer length extending to a side opposite to the projection portion 205. The plate portion 203D has an inner surface portion 203Db differing from the inner surface portion 203*b* in having a longer length extending to a side opposite to the projection portion 205. The plate portion 203D has a surface portion 203Dd differing from the surface portion 203*d* in having a longer length extending to a side opposite to the projection portion 205. The plate portion 203D has a surface portion 203De differing from the surface portion 203*e*. The surface portion 203De is inclined with respect to the surface portion 204Dc such that the surface portion 204Dc side is flush with the surface portion 204Dc and approaches the projection portion 205 toward the inner surface portion 203Db side. The plate portion 203D has an inclined surface portion 203Dc differing from the inclined surface portion 203*c*. In the inclined surface portion 203Dc, a width in a direction in which the outer surface portion 203Da and the surface portion 203De are connected becomes narrower toward the surface portion 203Dd side.

Figure 54:
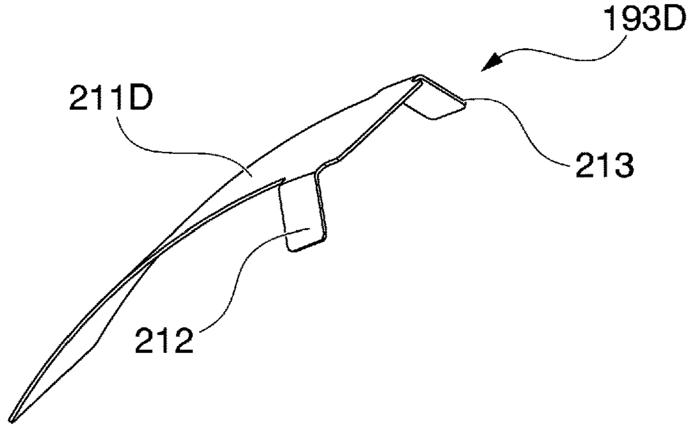
FIG. 54 is a perspective view illustrating a position setting plate portion of the disc brake of the second embodiment.
Figure 55:
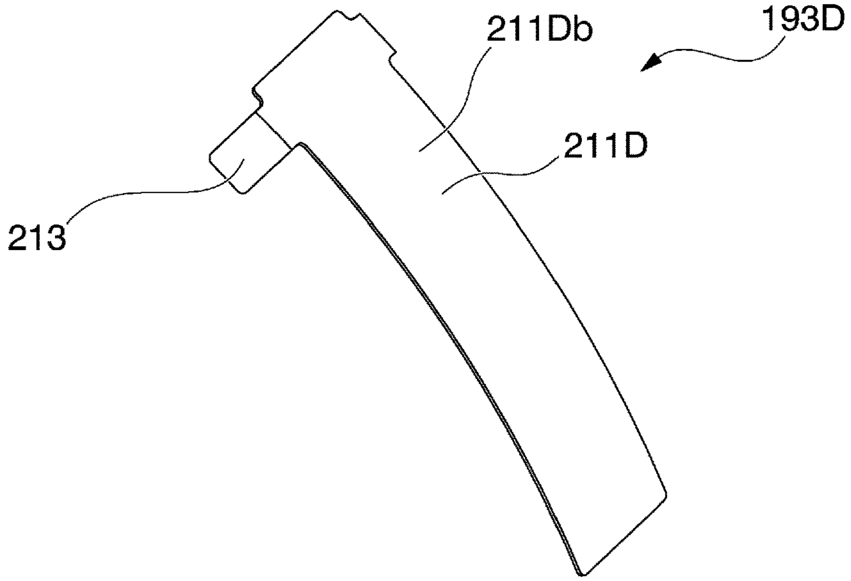
FIG. 55 is a perspective view illustrating the position setting plate portion of the disc brake of the second embodiment.
Figure 56:
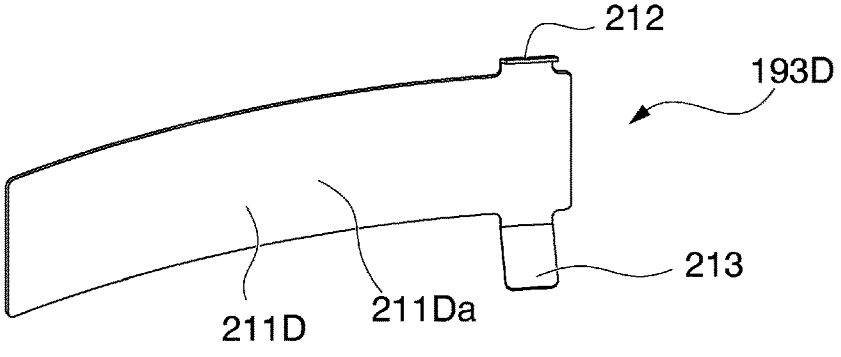
FIG. 56 is a perspective view illustrating the position setting plate portion of the disc brake of the second embodiment.

As illustrated in FIGS. 54 to 56, the position setting plate portion 193D has a curved plate portion 211D differing from the curved plate portion 211 in having a longer length in the circumferential direction. The curved plate portion 211D has an inward side curved surface portion 211Da differing from the inward side curved surface portion 211*a* in having a longer length in the circumferential direction. The curved plate portion 211D has an outward side curved surface portion 211Db differing from the outward side curved surface portion 211*b* in having a longer length in the circumferential direction.

As illustrated in FIG. 43, the filter portion 55D is attached to the carrier main body 29D, the dust collection portion 191D thereof abuts the outward facing abutment surface 31Dh of the inner side pad support portion 31D in a surface contact manner in the outer surface portion 202Da and abuts the large stepped surface 31*g* in a surface contact manner in the surface portion 202Dd. In addition, the dust collection portion 191D of the filter portion 55D abuts the inward facing abutment surface 35Dh of the outer side pad support portion 35D in a surface contact manner in the outer surface portion 203Da and abuts the large stepped surface 35*g* in a surface contact manner in the surface portion 203Dd. In addition, as illustrated in FIG. 44, the dust collection portion 191D of the filter portion 55D abuts the inner circumferential abutment surface 33Dk of the outer circumferential frame portion 33D in a surface contact manner in the outward side curved surface portion 204Db and abuts the inward side flat surface 33*i* in a surface contact manner in the top surface portion 205*a*. At this time, in the dust collection portion 191D, the curved portion 204D covers the hole 301D in its entirety on the inward side in the disc radial direction in the outward side curved surface portion 204Db. In other words, in the carrier main body 29D, the hole 301D for exposing the dust collection portion 191D of the filter portion 55D to the outward side in the disc radial direction is provided at a position of the filter portion 55D.

In the filter portion 55D, while having the dust collection portion 191D in such a state, the position setting plate portion 193D abuts the inward side curved surface portion 204Da of the dust collection portion 191D in a surface contact manner in the outward side curved surface portion 211Db of the curved plate portion 211D. In the position setting plate portion 193D, the attachment portion 212 engages with the first engagement hole 181 of the inner side pad support portion 31D, and the attachment portion 213 engages with the first engagement hole 171 of the outer side pad support portion 35D. Consequently, the position setting plate portion 193D is provided in the direction of the disc center axis with respect to the dust collection portion 191D. In this state, the position setting plate portion 193D presses the curved portion 204D of the dust collection portion 191D against the outer circumferential frame portion 33D in a manner of coming into surface contact with the inner circumferential abutment surface 33Dk in the outward side curved surface portion 204Db.

The position setting plate portion 193D positionally sets the dust collection portion 191D with respect to the carrier main body 29D. As illustrated in FIG. 43, the dust collection portion 191D positionally set by the position setting plate portion 193D abuts the outward facing abutment surface 31Dh in a surface contact manner in the outer surface portion 202Da, abuts the inward facing abutment surface 35Dh in a surface contact manner in the outer surface portion 203Da, and as illustrated in FIG. 44, abuts the inner circumferential abutment surface 33Dk in a surface contact manner in the outward side curved surface portion 204Db. At this time as well, in the position setting plate portion 193D, since the attachment portions 212 and 213 having a flat plate shape enter the first engagement holes 181 and 171 in tip portions in a state of obliquely extending to the inward side in the disc radial direction from the curved plate portion 211D such that the tip portions are separated from each other, it is in a state of being unlikely to be detached from the carrier main body 29D.

In the filter portion 55D on the disc entrance side, while having the dust collection portion 191D in the positionally set state as described above, as illustrated in FIG. 44, the clip-type plate portion 194 abuts the surface portion 204Dc of the dust collection portion 191D in a surface contact manner in the substrate portion 221. Furthermore, the attachment portion 222 engages with the second engagement hole 182D of the inner side pad support portion 31D, and the attachment portion 223 engages with the second engagement hole 172D of the outer side pad support portion 35D. Consequently, the clip-type plate portion 194 is provided next to the dust collection portion 191D in the disc circumferential direction, specifically, on the disc entrance side. In this state, the clip-type plate portion 194 presses the dust collection portion 191D against the outer circumferential frame portion 33D in a manner of coming into surface contact with the inward side flat surface 33*i* in the top surface portion 205*a*. Accordingly, the clip-type plate portion 194 restricts movement of the dust collection portion 191D in the disc circumferential direction in a state of being positionally set in the carrier main body 29D by the position setting plate portion 193D together with the inward side flat surface 33*i*.

Similar to the filter portion 55D, the filter portion 56D on the disc exit side is attached to the carrier main body 29D in a mirror symmetrical shape with respect to the filter portion 55D. Consequently, in the filter portion 56D, as illustrated in FIG. 43, the dust collection portion 191D abuts the inward facing abutment surface 36Dh of the outer side pad support portion 36D in a surface contact manner in the outer surface portion 202Da and abuts the large stepped surface 36*g* in a surface contact manner in the surface portion 202Dd. In addition, the dust collection portion 191D of the filter portion 56D abuts the outward facing abutment surface 32Dh of the inner side pad support portion 32D in a surface contact manner in the outer surface portion 203Da and abuts the large stepped surface 32*g* in a surface contact manner in the surface portion 203Dd. In addition, as illustrated in FIG. 44, the dust collection portion 191D of the filter portion 56D abuts the inner circumferential abutment surface 34Dk of the outer circumferential frame portion 34D in a surface contact manner in the outward side curved surface portion 204Db and abuts the inward side flat surface 34*i* in a surface contact manner in the top surface portion 205*a*. At this time, in the dust collection portion 191D, the curved portion 204D covers the hole 302D in its entirety on the inward side in the disc radial direction in the outward side curved surface portion 204Db. In other words, in the carrier main body 29D, the hole 302D for exposing the dust collection portion 191D of the filter portion 56D to the outward side in the disc radial direction is provided at a position of the filter portion 56D.

Figure 57:
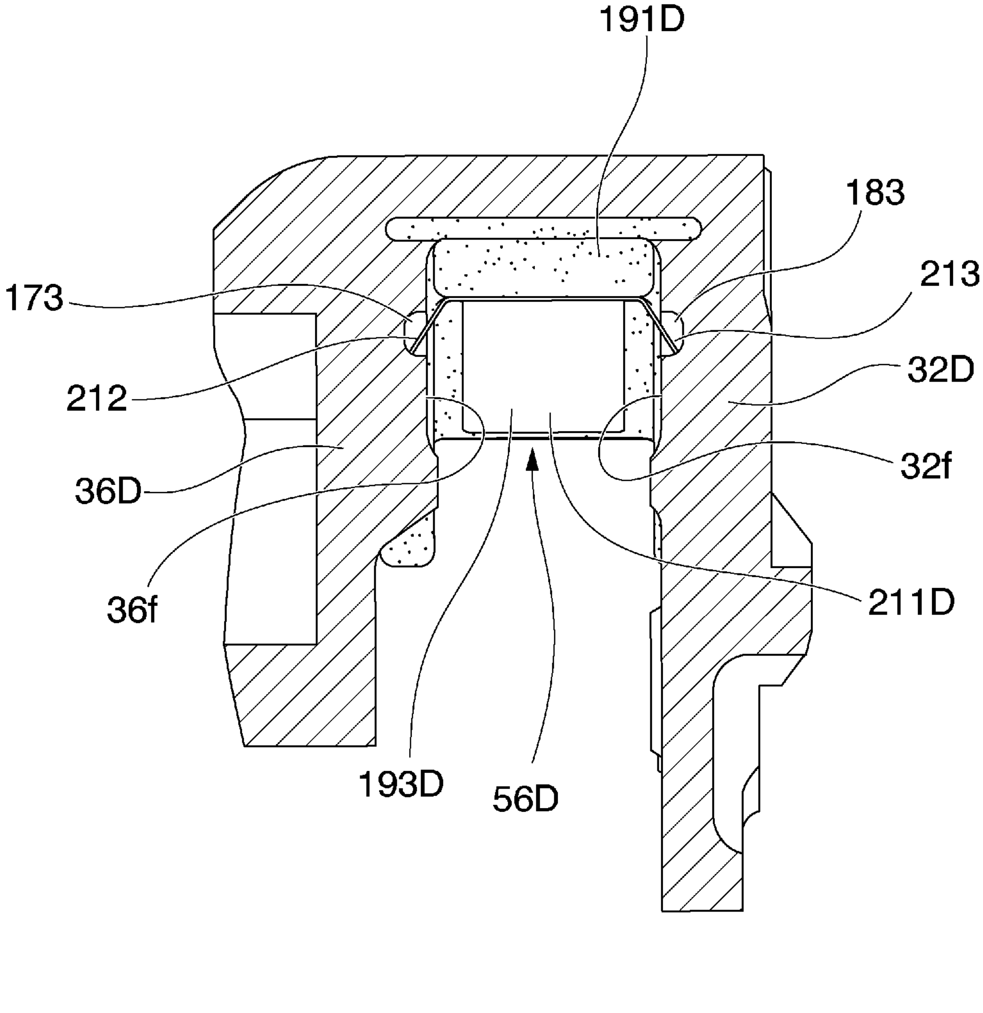
FIG. 57 is a cross-sectional view along LVII-LVII in FIG. 36 illustrating the carrier of the disc brake of the second embodiment.

In addition, in the filter portion 56D, as illustrated in FIG. 57, the position setting plate portion 193D engages with the first engagement hole 173 of the outer side pad support portion 36D in the attachment portion 212 and engages with the first engagement hole 183 of the inner side pad support portion 32D in the attachment portion 213. Accordingly, in the filter portion 56D, the position setting plate portion 193D positionally sets the dust collection portion 191D in the foregoing state.

Figure 58:
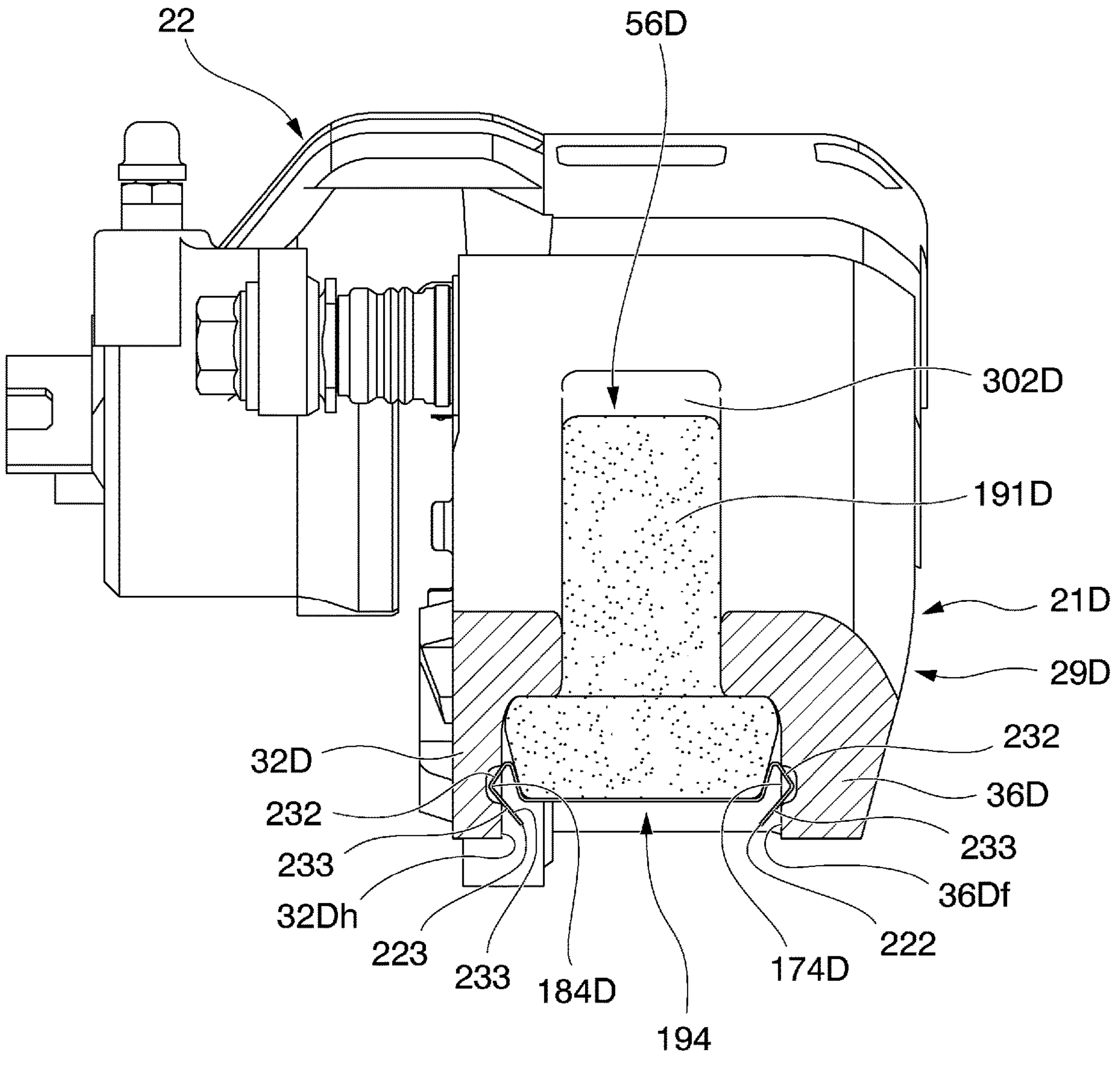
FIG. 58 is a cross-sectional view along LVIII-LVIII in FIG. 36 illustrating the disc brake of the second embodiment.

In addition, in the filter portion 56D, as illustrated in FIG. 58, the clip-type plate portion 194 engages with the second engagement hole 174D of the outer side pad support portion 36D in the attachment portion 222, and the attachment portion 223 engages with the second engagement hole 184D of the inner side pad support portion 32D. Accordingly, in the filter portion 56D, the clip-type plate portion 194 supports the dust collection portion 191D so as to maintain the foregoing state.

Figure 40:
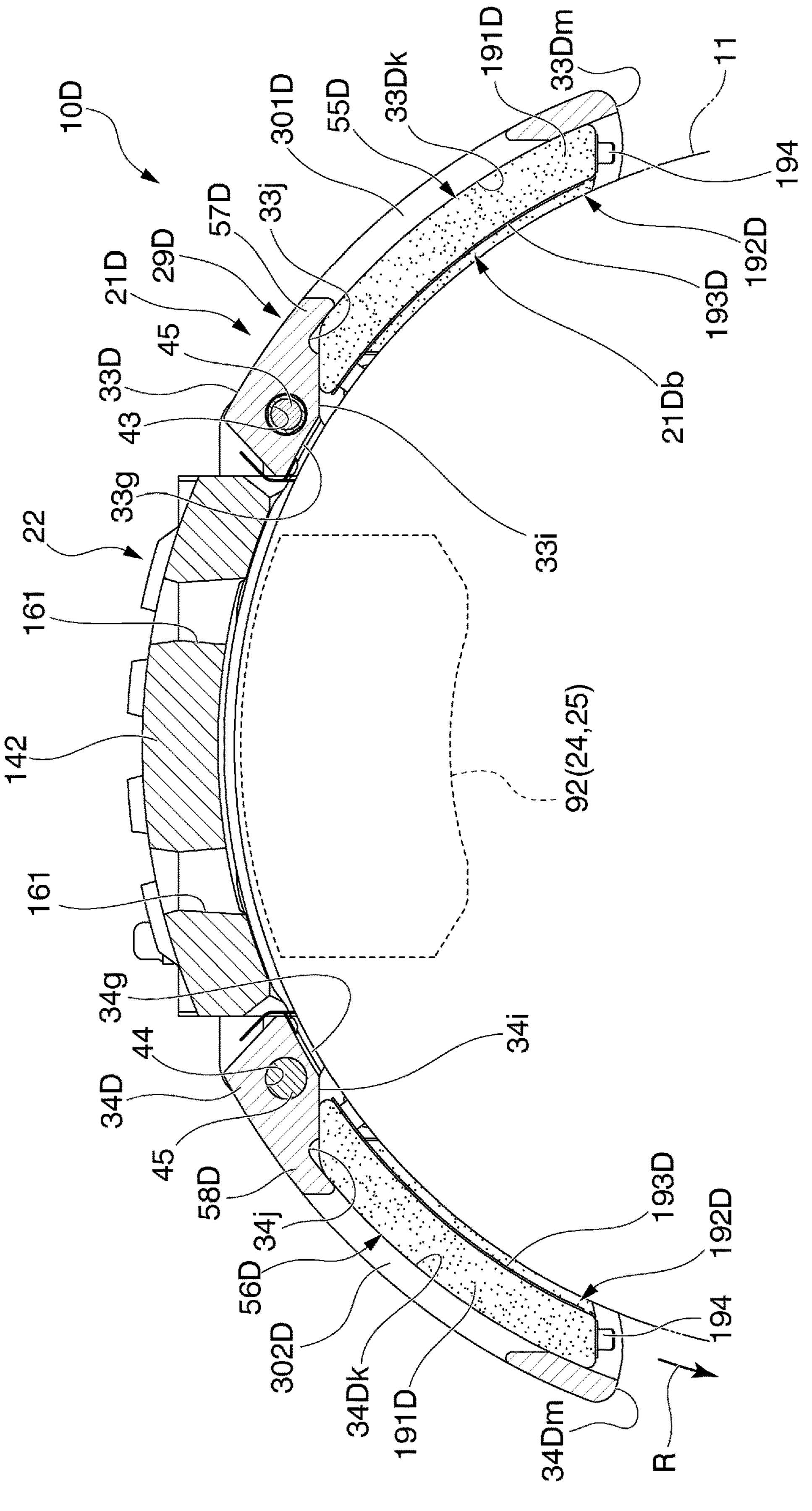
FIG. 40 is a cross-sectional view along XL-XL in FIG. 39 illustrating the disc brake of the second embodiment.
Figure 41:
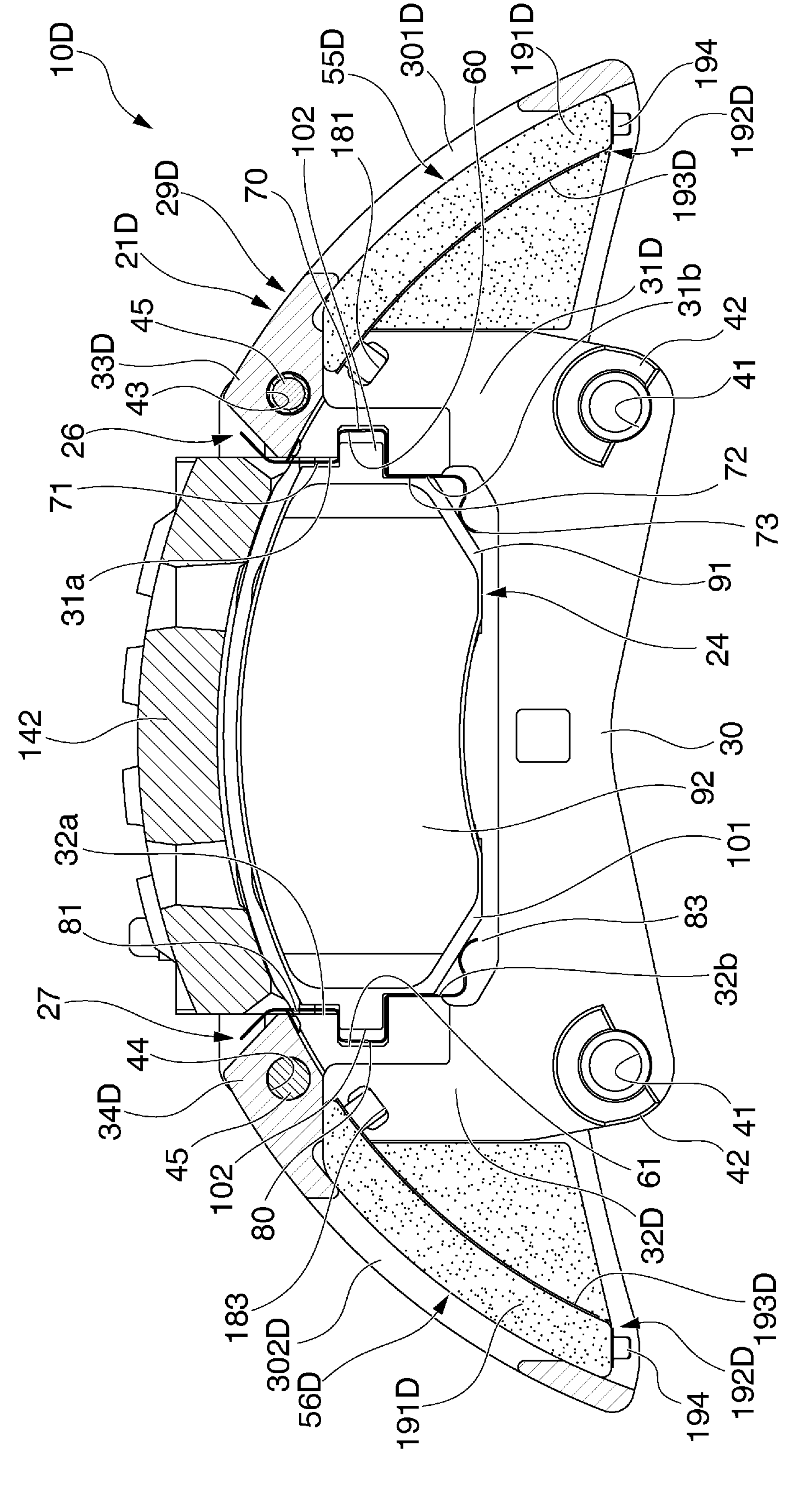
FIG. 41 is a cross-sectional view along XL-XL in FIG. 39 illustrating the disc brake of the second embodiment excluding the disc.

The carrier 21D having a constitution in which the filter portion 55D and the filter portion 56D are attached to the carrier main body 29D has an inner circumferential surface 21Db having the constitution illustrated in FIG. 43. The inner circumferential surface 21Db is constituted of the inner circumferential end surfaces 33*g* and 34*g* and the inward side flat surfaces 33*i* and 34*i* of the outer circumferential frame portions 33D and 34D of the carrier main body 29D on the inward side in the disc radial direction, the inward side curved surface portion 204Da of the curved portion 204D of the dust collection portion 191D of the filter portion 55D on the inward side in the disc radial direction, the inward side curved surface portion 211Da of the curved plate portion 211D of the position setting plate portion 193D of the filter portion 55D on the inward side in the disc radial direction, the inward side curved surface portion 204Da of the curved portion 204D of the dust collection portion 191D of the filter portion 56D on the inward side in the disc radial direction, and the inward side curved surface portion 211Da of the curved plate portion 211D of the position setting plate portion 193D of the filter portion 56D on the inward side in the disc radial direction. As illustrated in FIG. 40, the inner circumferential surface 21Db is formed along the outer circumferential edge of the disc rotor 11 on the outward side in the disc radial direction.

The filter portion 55D and the filter portion 56D on the inner circumferential surface 21Db of the carrier 21D are provided in a manner of facing the outer circumferential edge of the disc rotor 11. In other words, the carrier 21D includes the inner circumferential surface 21Db formed along the outer circumferential edge of the disc rotor 11 and the filter portions 55D and 56D located on the inner circumferential surface 21Db and provided in a manner of facing the outer circumferential edge of the disc rotor 11. The filter portion 55D and the filter portion 56D are provided on both the disc entrance side and the disc exit side, of the carrier 21D. Thus, the dust collection portion 191D of the filter portion 55D and the dust collection portion 191D of the filter portion 56D are also provided on both the disc entrance side and the disc exit side, of the carrier 21D.

In the disc brake 10D, when the vehicle is traveling forward, brake dust generated at the time of braking is captured mainly by the dust collection portion 191D of the filter portion 56D provided on the side in front of the disc rotor 11 in the rotation direction from the lining 92, that is, the disc exit side. In addition, when the vehicle is traveling backward, brake dust is captured mainly by the dust collection portion 191D of the filter portion 55D provided on the side in front of the disc rotor 11 in the rotation direction from the lining 92.

In the disc brake 10D of the second embodiment, since the holes 301D and 302D are formed in the carrier main body 29D of the carrier 21D, in the carrier 21D, air flows to the outward side from the inward side in the disc radial direction through the filter portion 55D and the hole 301D, and air flows to the outward side from the inward side in the disc radial direction through the filter portion 56D and the hole 302D. Thus, since a flow rate of air passing through the filter portion 55D and the filter portion 56D can be increased due to the flow of air, a larger amount of air including brake dust generated at the time of braking can be caused to flow to the dust collection portion 191D of the filter portion 55D and the dust collection portion 191D of the filter portion 56D from the lining 92 and the disc rotor 11. Accordingly, brake dust can be more efficiently collected.

In addition, in the disc brake 10D of the second embodiment, since the holes 301D and 302D are formed in the carrier main body 29D, increase in weight of the carrier main body 29D can be curbed.

First Modification Example

Figure 59:
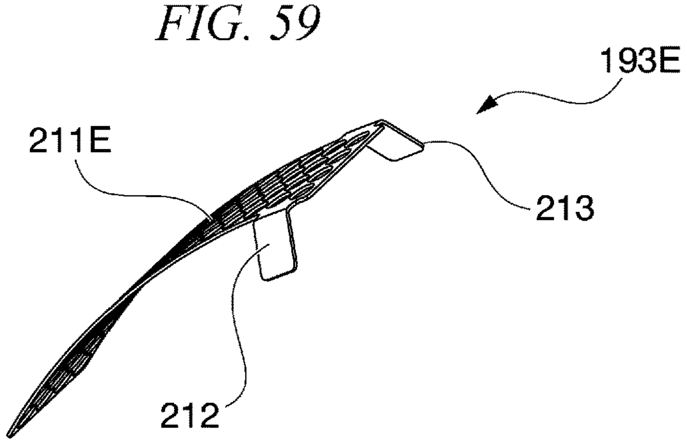
FIG. 59 is a perspective view illustrating a first modification example of a position setting plate portion of the disc brake of the second embodiment.
Figure 60:
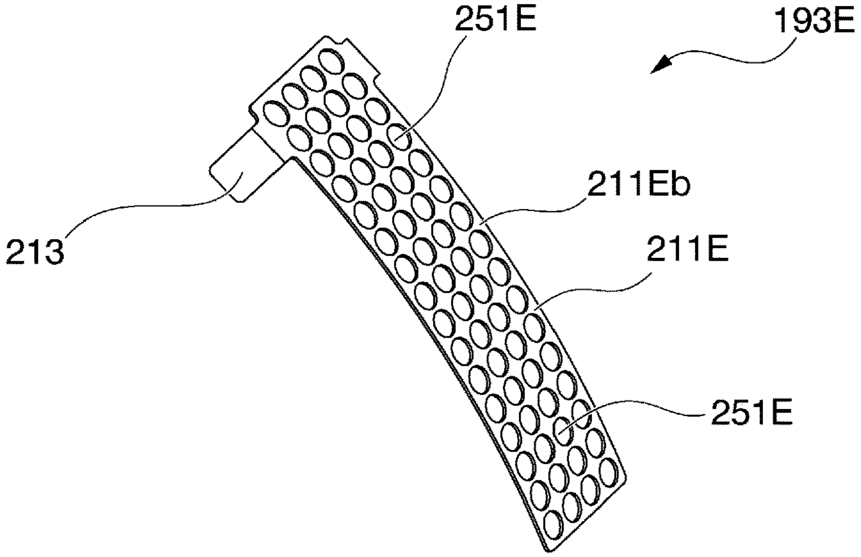
FIG. 60 is another perspective view illustrating the first modification example of the position setting plate portion of the disc brake of the second embodiment.
Figure 61:
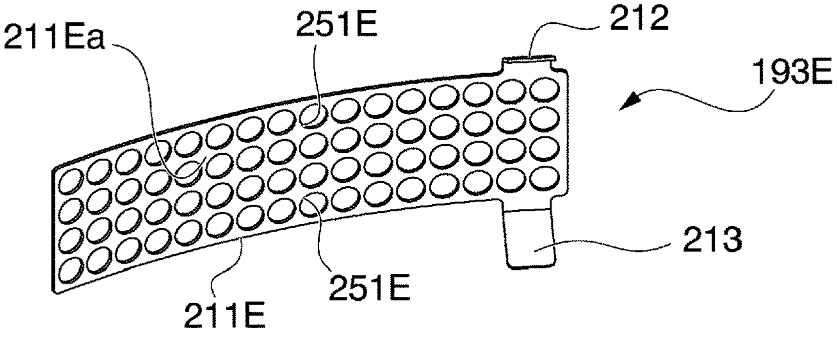
FIG. 61 is another perspective view illustrating the first modification example of the position setting plate portion of the disc brake of the second embodiment.

In the disc brake 10D of the second embodiment, in place of the position setting plate portion 193D, a position setting plate portion 193E may be provided as illustrated in FIGS. 59 to 61. This position setting plate portion 193E has a curved plate portion 211E partially differing from the curved plate portion 211D. The curved plate portion 211E differs from the curved plate portion 211D in that a plurality of holes 251E having a round hole shape penetrating the curved plate portion 211E in the plate thickness direction (radial direction) are formed in an array state. Thus, the curved plate portion 211E has an inward side curved surface portion 211Ea differing from the inward side curved surface portion 211Da in that the plurality of holes 251E open and has an outward side curved surface portion 211Eb differing from the outward side curved surface portion 211Db in that the plurality of holes 251E open. If such a position setting plate portion 193E is used, air including brake dust can be caused to favorably flow into the dust collection portion 191D through the plurality of holes 251E, and therefore brake dust can be even more efficiently collected by the dust collection portion 191D.

In addition, in the disc brake 10D of the second embodiment as well, in place of the clip-type plate portion 194, the clip-type plate portion 194A may be provided. If the clip-type plate portion 194A is used, air including brake dust can be caused to favorably flow to the dust collection portion 191D through the plurality of holes 252A, and therefore brake dust can be even more efficiently collected by the dust collection portion 191D.

Second Modification Example

Figure 62:
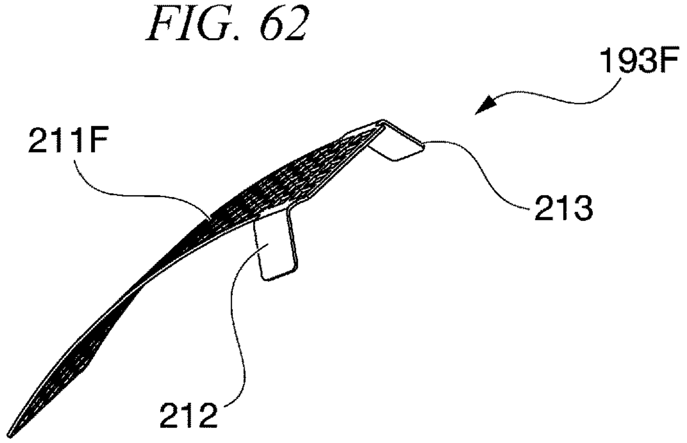
FIG. 62 is a perspective view illustrating a second modification example of a position setting plate portion of the disc brake of the second embodiment.
Figure 63:
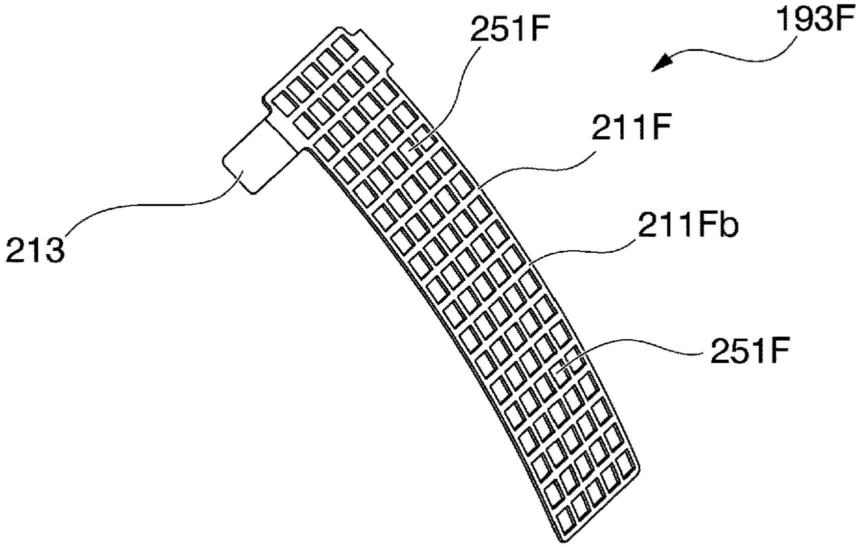
FIG. 63 is another perspective view illustrating the second modification example of the position setting plate portion of the disc brake of the second embodiment.
Figure 64:
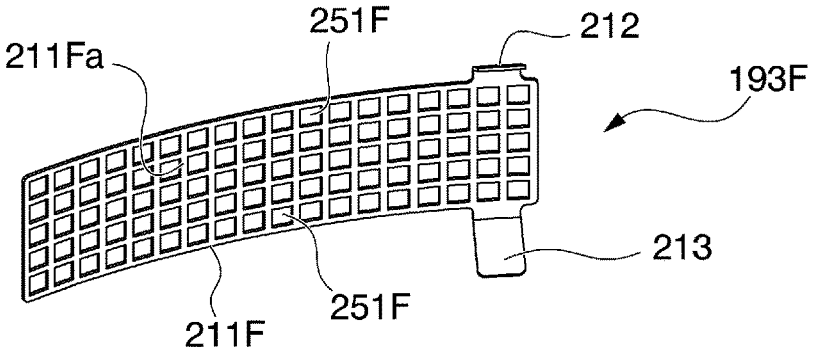
FIG. 64 is another perspective view illustrating the second modification example of the position setting plate portion of the disc brake of the second embodiment.
Figure 65:
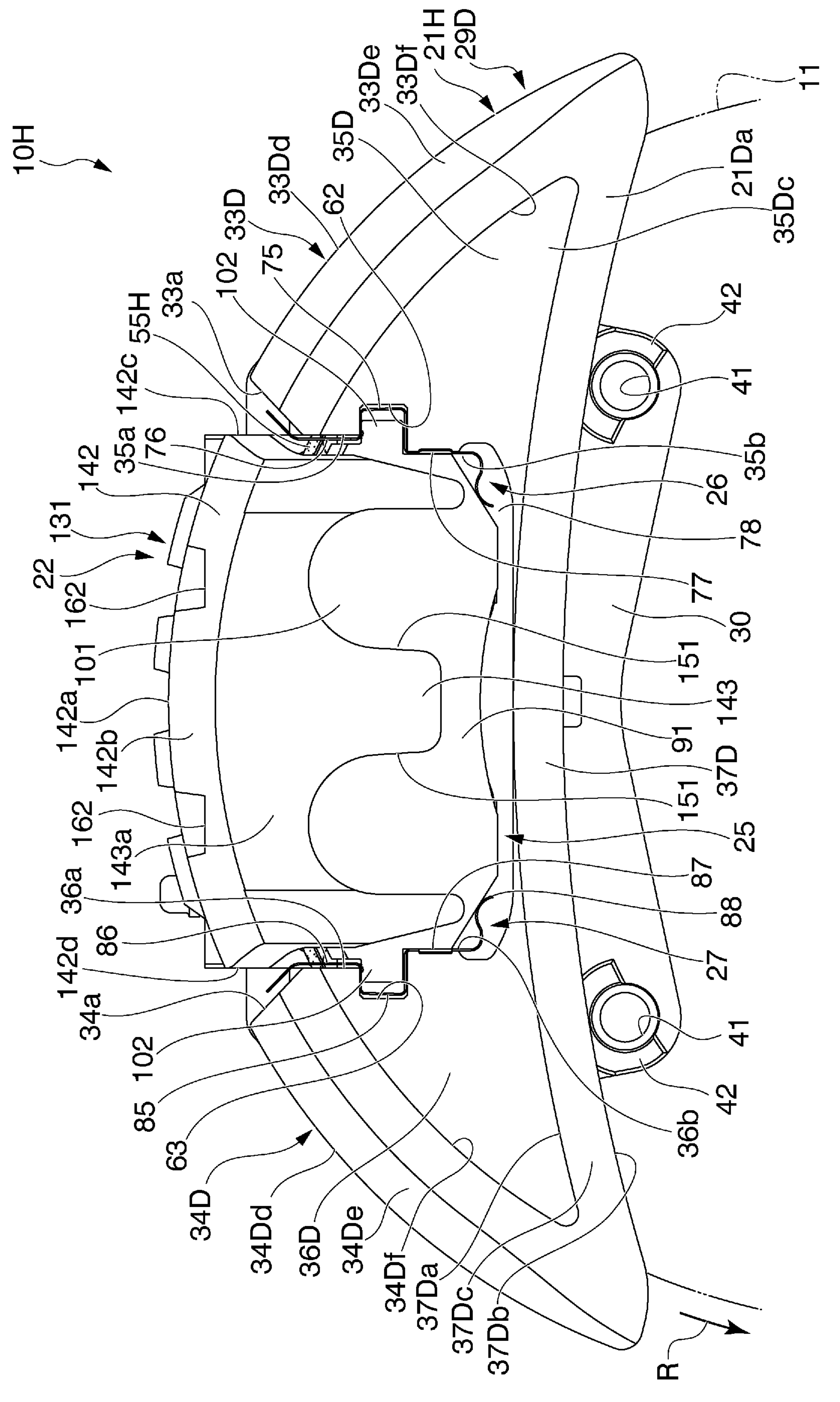
FIG. 65 is a front view illustrating a disc brake of a third embodiment.
Figure 66:
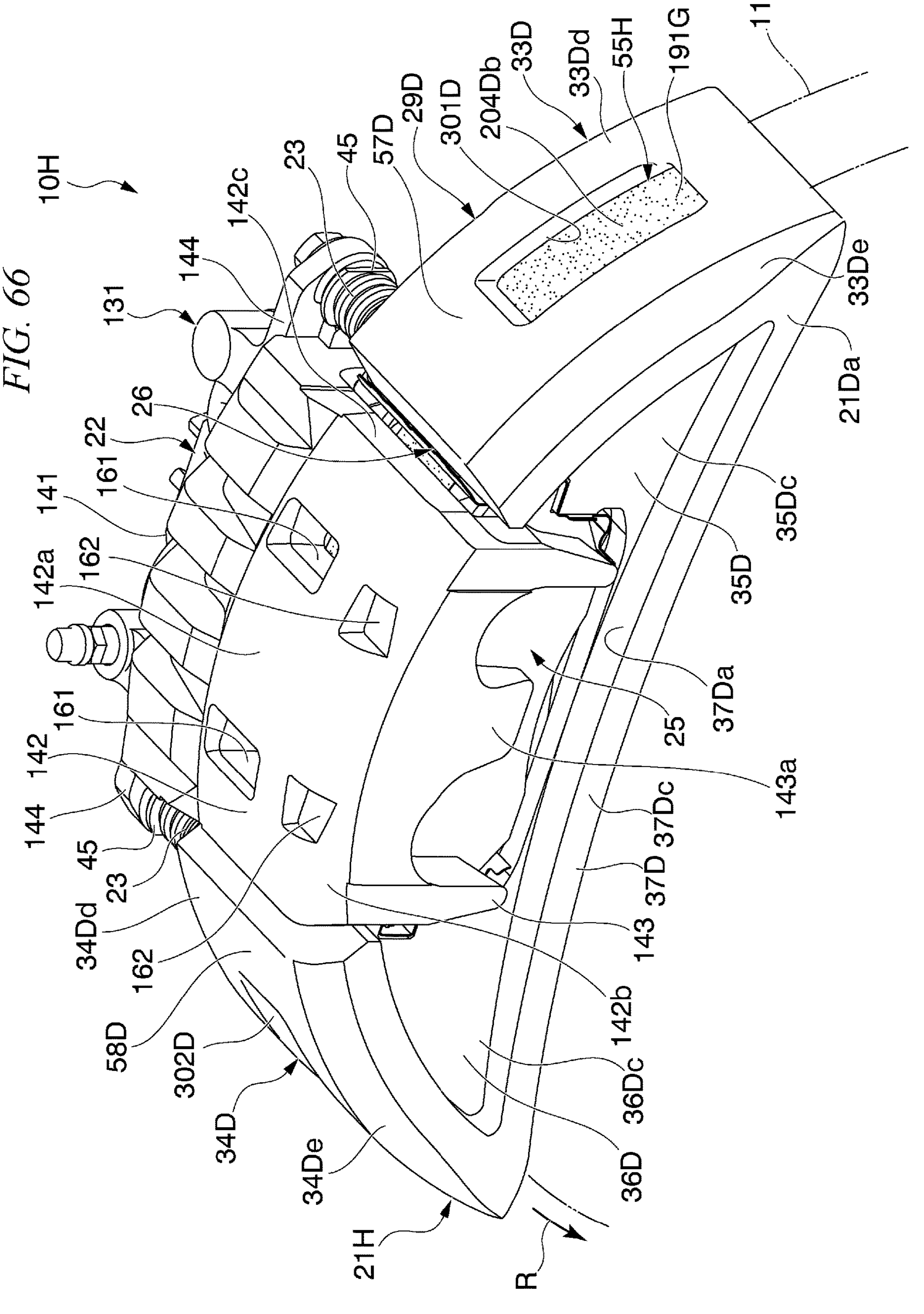
FIG. 66 is a perspective view illustrating the disc brake of the third embodiment.
Figure 67:
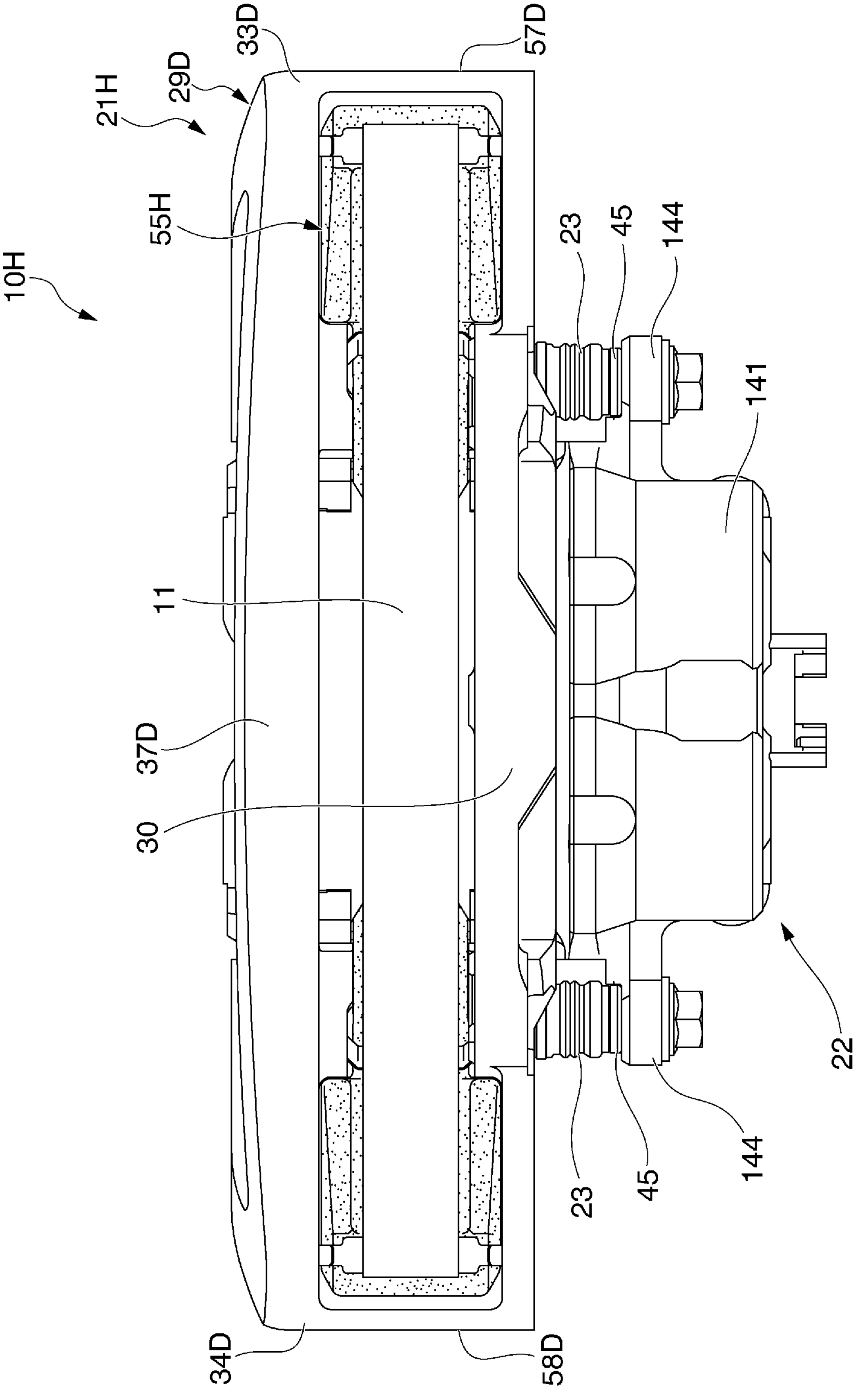
FIG. 67 is a view illustrating the disc brake of the third embodiment viewed from the inward side in the disc radial direction.
Figure 68:
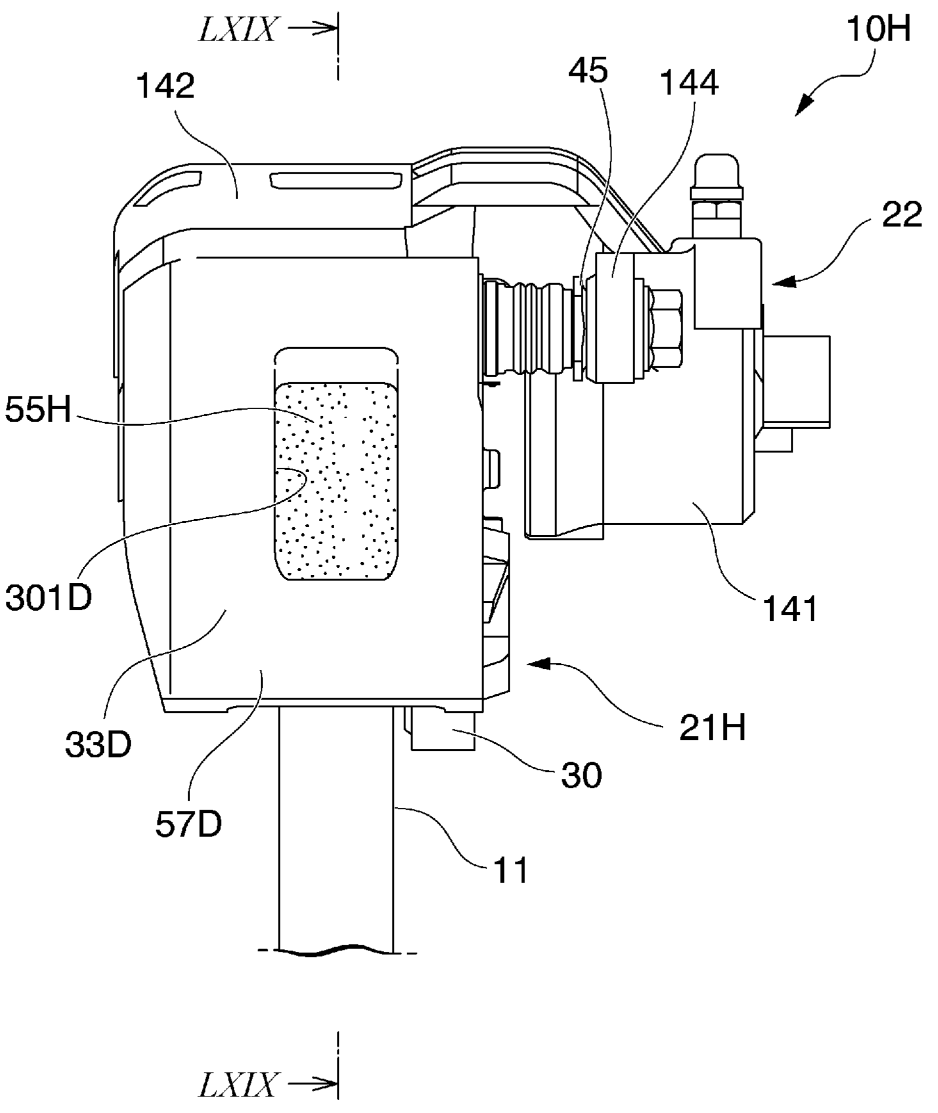
FIG. 68 is a side view illustrating the disc brake of the third embodiment.

In the disc brake 10D of the second embodiment, in place of the position setting plate portion 193D, a position setting plate portion 193F may be provided as illustrated in FIGS. 62 to 64. This position setting plate portion 193F has a curved plate portion 211F partially differing from the curved plate portion 211D. The curved plate portion 211F differs from the curved plate portion 211D in that a plurality of holes 251F having an angular hole shape penetrating the curved plate portion 211F in the plate thickness direction (radial direction) are formed in an array state. Thus, the curved plate portion 211F has an inward side curved surface portion 211Fa differing from the inward side curved surface portion 211Da in that the plurality of holes 251F open and has an outward side curved surface portion 211Fb differing from the outward side curved surface portion 211Db in that the plurality of holes 251F open. If such a position setting plate portion 193F is used, air including brake dust can be caused to favorably flow to the dust collection portion 191D through the plurality of holes 251F, and therefore brake dust can be even more efficiently collected by the dust collection portion 191D.

In addition, in the disc brake 10D of the second embodiment, in place of the clip-type plate portion 194, the clip-type plate portion 194B may be provided. If the clip-type plate portion 194B is used, air including brake dust can be caused to favorably flow to the dust collection portion 191D through the holes 252B, and therefore brake dust can be even more efficiently collected by the dust collection portion 191D.

Third Embodiment

A second embodiment will be described focusing on parts differing from the second embodiment mainly on the basis of FIGS. 65 to 84. Parts common to those of the second embodiment will be expressed by the same names and the same reference signs.

As illustrated in FIGS. 65 to 70, in place of the carrier 21D of the second embodiment, a disc brake 10H of the third embodiment includes a carrier 21H partially differing from it. As illustrated in FIGS. 69 to 75, the carrier 21H has a filter portion 55H partially differing from the filter portions 55D and 56D.

As illustrated in FIGS. 69 to 73, the filter portion 55H is constituted of a pair of dust collection portions 191H that are common components partially differing from the dust collection portion 191D, and an attachment plate 192H partially differing from the attachment plate 192. The attachment plate 192H has a position setting plate portion 193H partially differing from the position setting plate portion 193D and is made up of the position setting plate portion 193H and a pair of clip-type plate portions 194.

Figure 76:
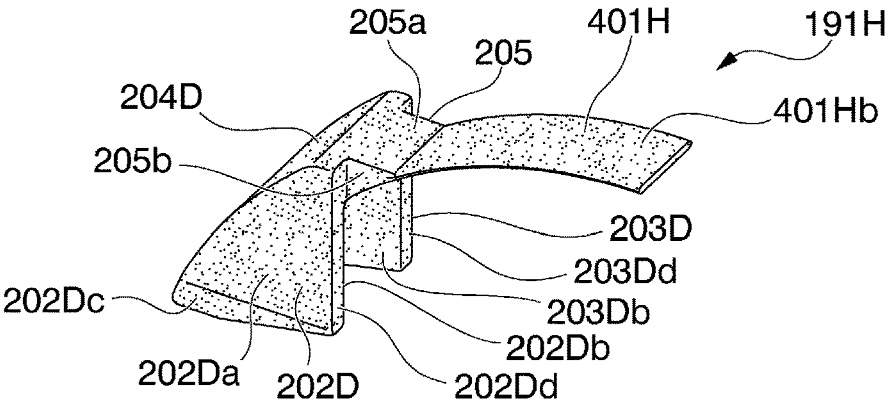
FIG. 76 is a perspective view illustrating a dust collection portion of the disc brake of the third embodiment.
Figure 77:
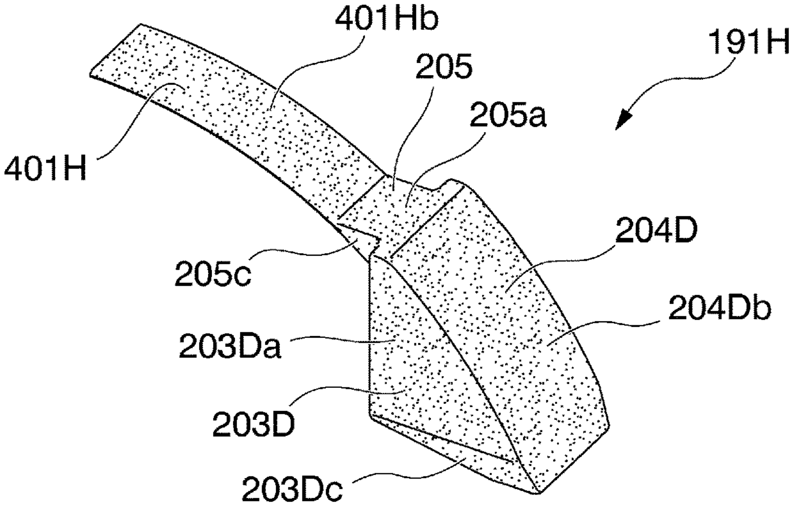
FIG. 77 is another perspective view illustrating the dust collection portion of the disc brake of the third embodiment.
Figure 78:
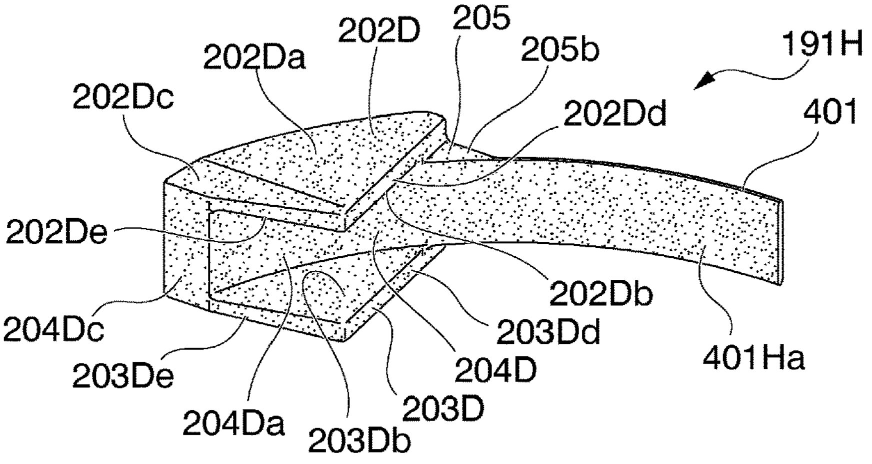
FIG. 78 is another perspective view illustrating the dust collection portion of the disc brake of the third embodiment.

As illustrated in FIGS. 76 to 78, the dust collection portion 191H differs from the dust collection portion 191D in having an extending portion 401H extending in a direction opposite to the surface portion 204Dc in the circumferential direction of the curved portion 204D from the projection portion 205 of the curved portion 204D. The extending portion 401H forms a part of a cylindrical shape, and an inward side curved surface portion 401Ha on the inward side thereof in the radial direction is continuously disposed in the same cylindrical surface as the inward side curved surface portion 204Da of the curved portion 204D. The extending portion 401H has a smaller thickness in the radial direction than the curved portion 204D. In the extending portion 401H, an outward side curved surface portion 401Hb thereof on the outward side in the radial direction has a part of a cylindrical shape coaxial with inward side curved surface portions 204Da and 401Ha.

Figure 79:
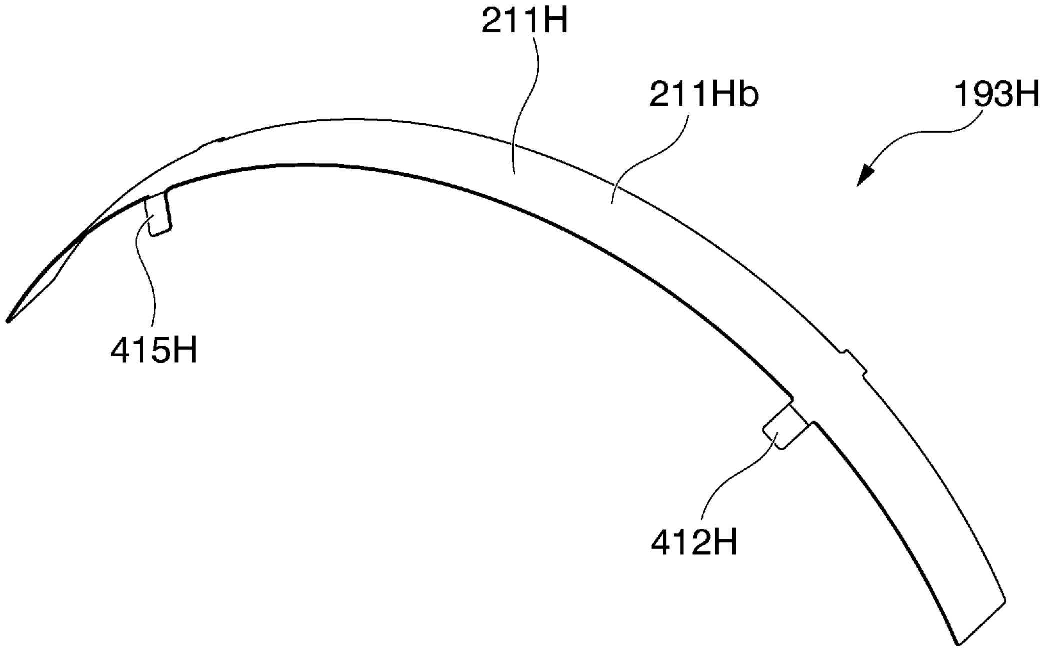
FIG. 79 is a perspective view illustrating a position setting plate portion of the disc brake of the third embodiment.
Figure 80:
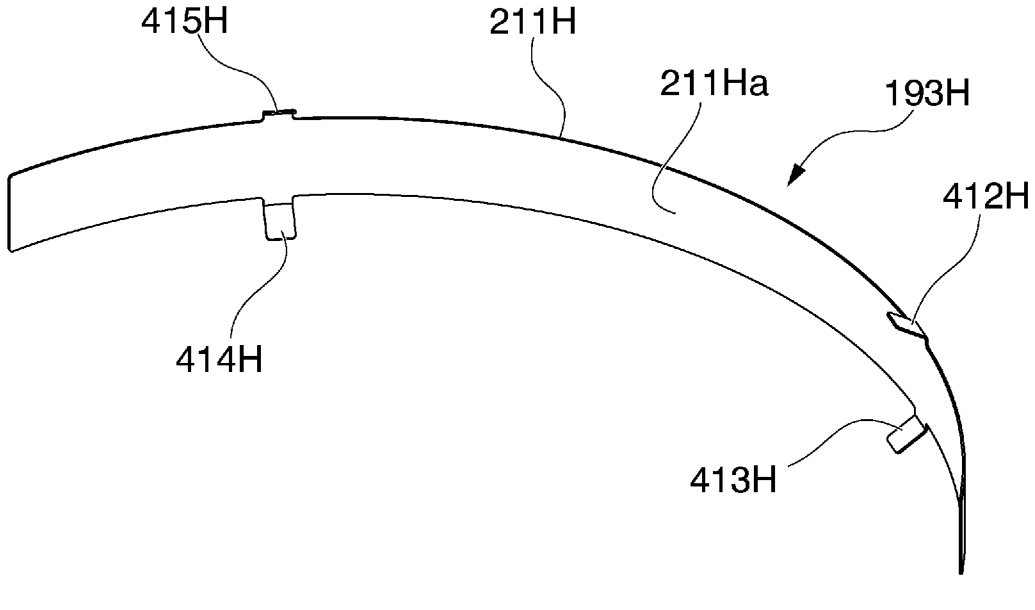
FIG. 80 is another perspective view illustrating the position setting plate portion of the disc brake of the third embodiment.

As illustrated in FIGS. 79 and 80, the position setting plate portion 193H has a curved plate portion 211H differing from the curved plate portion 211D in having a longer length in the circumferential direction. The curved plate portion 211H is also curved in a manner of forming a part of a cylindrical shape. Thus, the curved plate portion 211H has an inward side curved surface portion 211Ha differing from the inward side curved surface portion 211Da in having a longer length in the circumferential direction. The curved plate portion 211H has an outward side curved surface portion 211Hb differing from the outward side curved surface portion 211Db in having a longer length in the circumferential direction. The position setting plate portion 193H has a pair of attachment portions 412H and 413H having a flat plate shape similar to the attachment portions 222 and 223 and protruding to the outward side of the curved plate portion 211H in the axial direction from both end edge portions of the curved plate portion 211H in the axial direction on one end side of the curved plate portion 211H in the circumferential direction, and a pair of attachment portions 414H and 415H having a flat plate shape similar to the attachment portions 222 and 223 and protruding to the outward side of the curved plate portion 211H in the axial direction from both end edge portions of the curved plate portion 211H in the axial direction on the other end side of the curved plate portion 211H in the circumferential direction. The attachment portions 412H to 415H extend to the inward side of the curved plate portion 211H in the radial direction.

Figure 72:
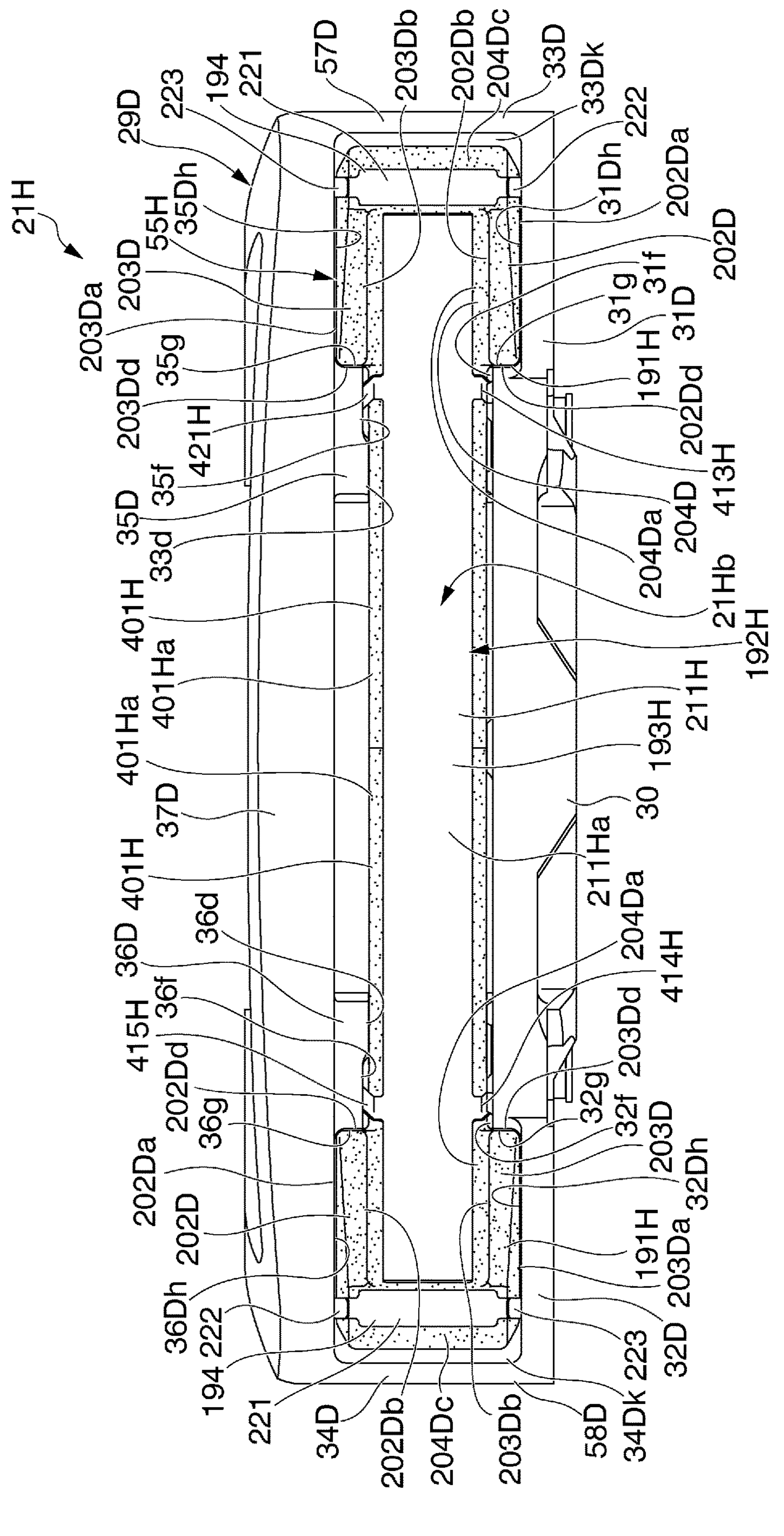
FIG. 72 is a view illustrating the carrier of the disc brake of the third embodiment viewed from the inward side in the disc radial direction.
Figure 73:
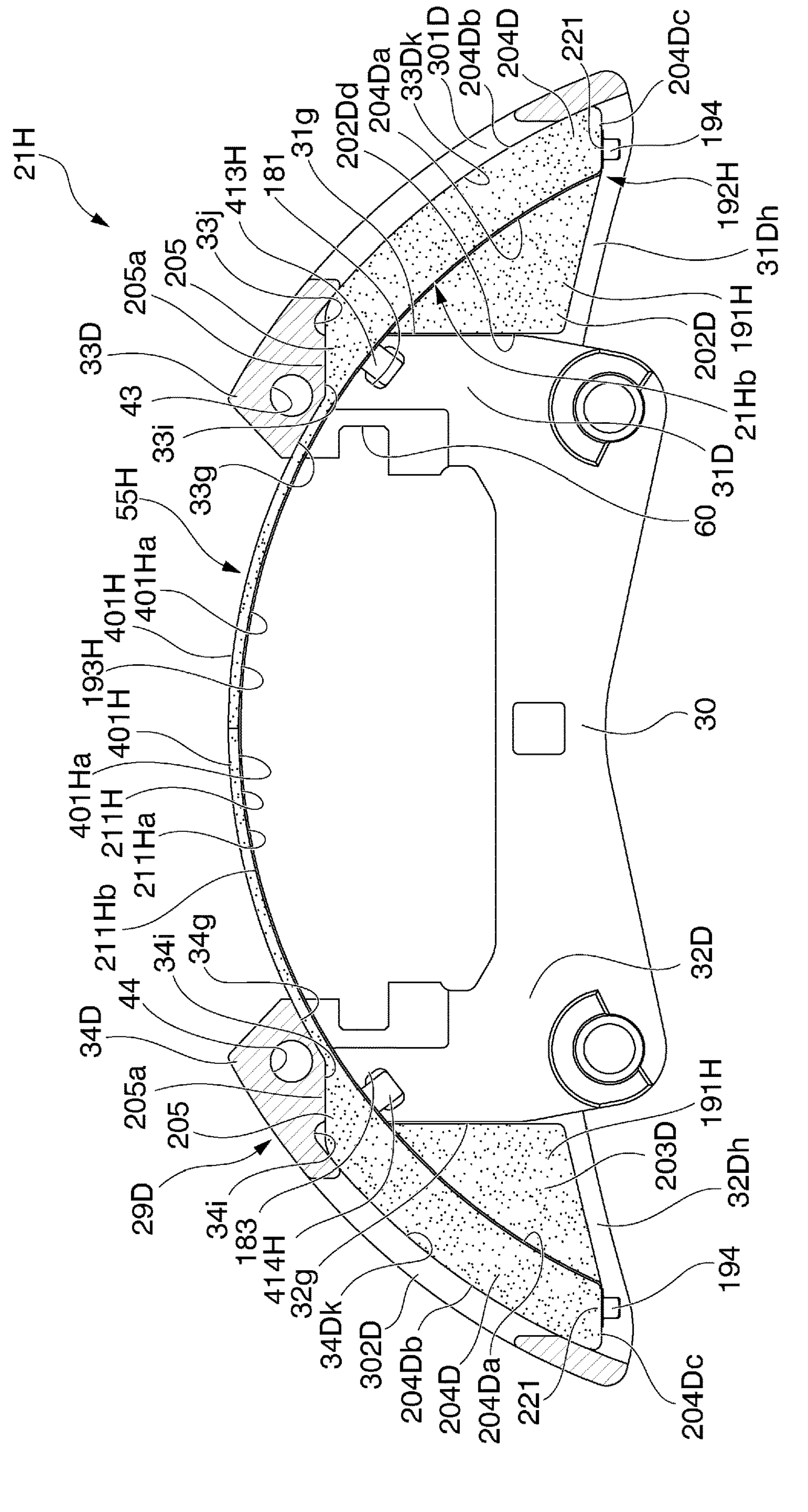
FIG. 73 is a cross-sectional view along LXIX-LXIX in FIG. 68 illustrating the carrier of the disc brake of the third embodiment.
Figure 74:
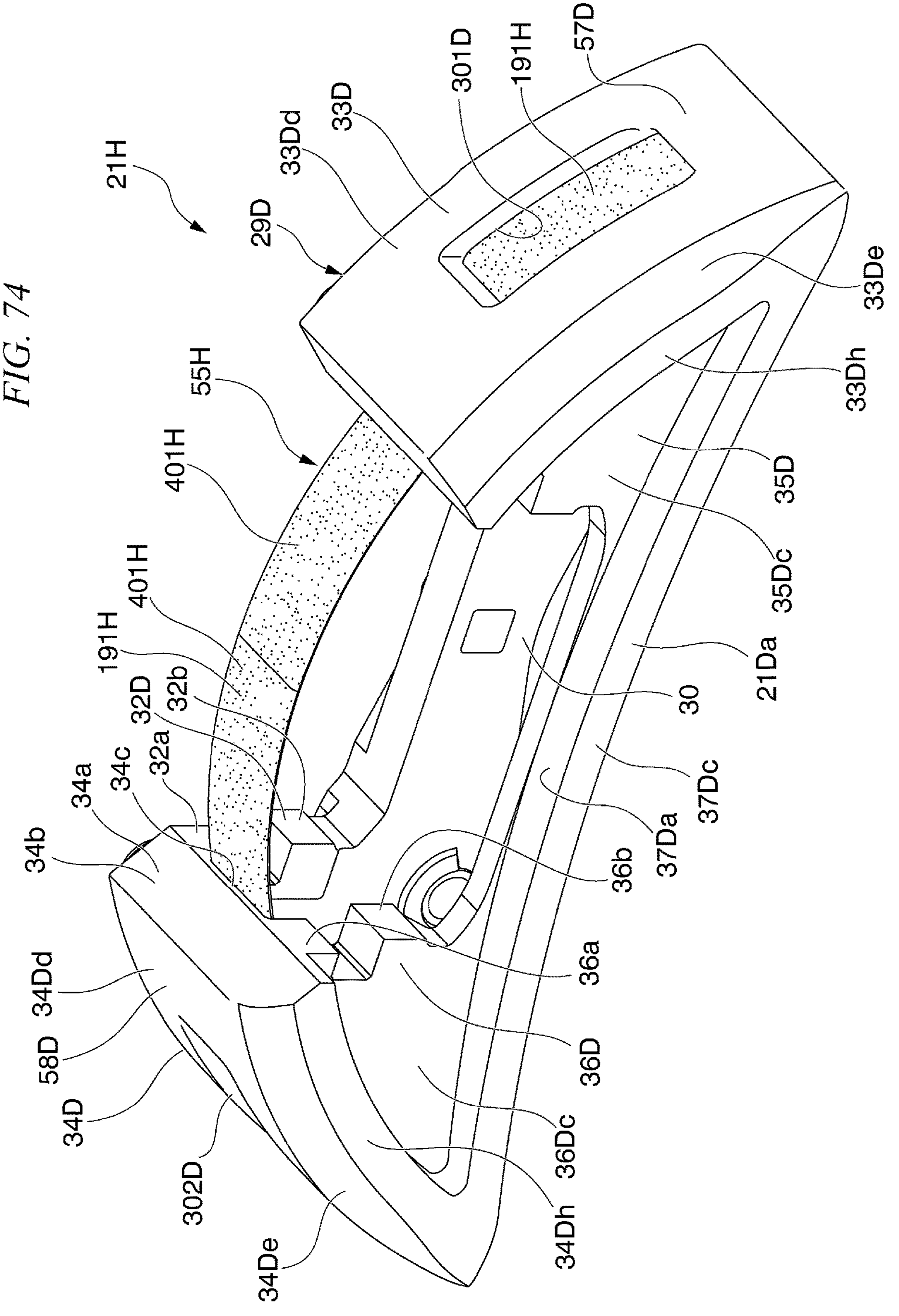
FIG. 74 is a perspective view illustrating the carrier of the disc brake of the third embodiment.
Figure 75:
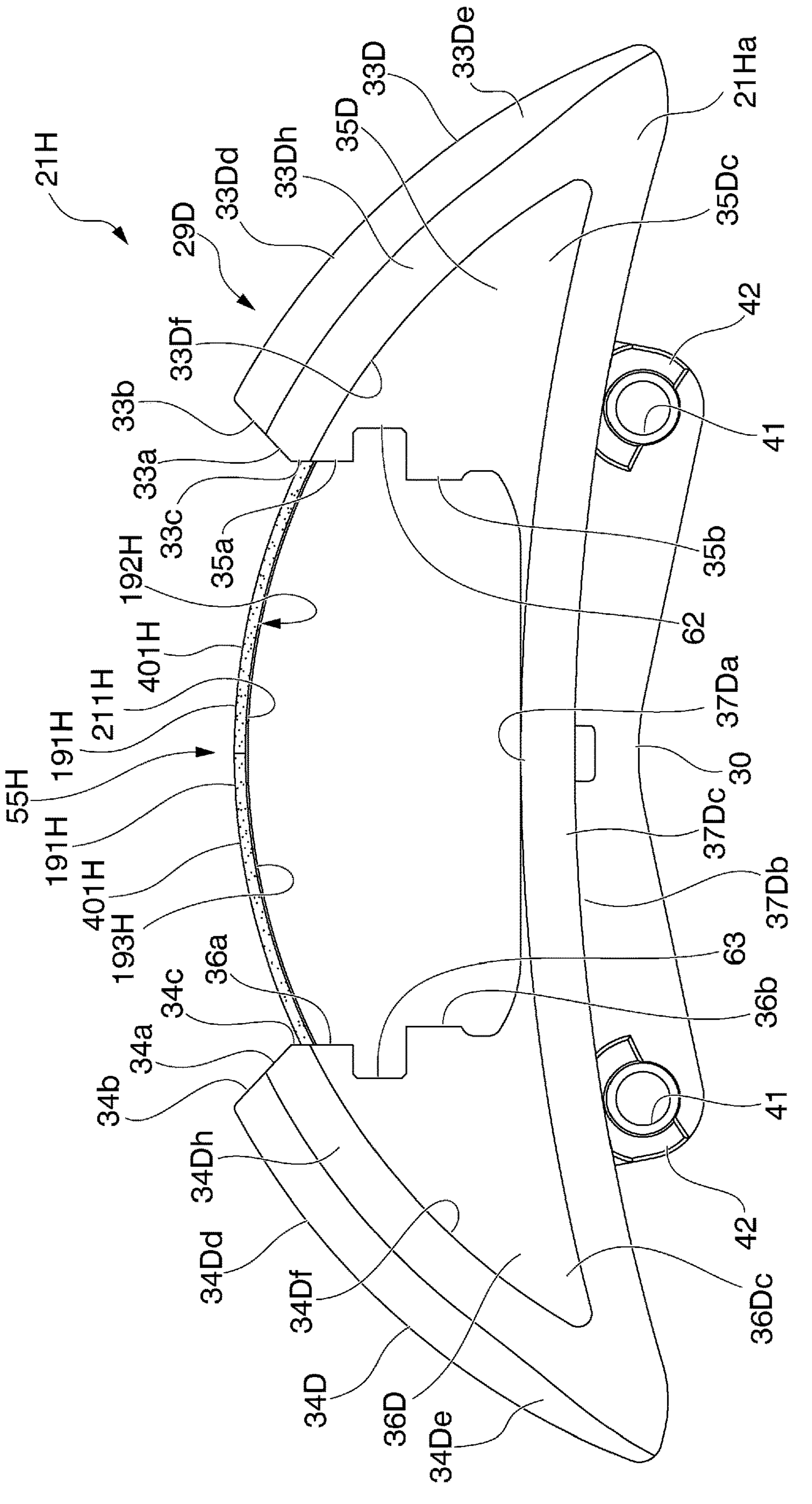
FIG. 75 is a front view illustrating the carrier of the disc brake of the third embodiment.

As illustrated in FIG. 72, when the filter portion 55H is attached to the carrier main body 29D, one dust collection portion 191H disposed on the disc entrance side abuts the outward facing abutment surface 31Dh of the inner side pad support portion 31D on the disc entrance side in a surface contact manner in the outer surface portion 202Da and abuts the large stepped surface 31*g* in a surface contact manner in the surface portion 202Dd. In addition, this one dust collection portion 191H abuts the inward facing abutment surface 35Dh of the outer side pad support portion 35D on the disc entrance side in a surface contact manner in the outer surface portion 203Da and abuts the large stepped surface 35*g* in a surface contact manner in the surface portion 203Dd. In addition, as illustrated in FIG. 73, this one dust collection portion 191H abuts the inner circumferential abutment surface 33Dk of the outer circumferential frame portion 33D in a surface contact manner in the outward side curved surface portion 204Db and abuts the inward side flat surface 33*i* in a surface contact manner in the top surface portion 205*a*. At this time, in this one dust collection portion 191H, the curved portion 204D covers the hole 301D in its entirety on the inward side in the disc radial direction in the outward side curved surface portion 204Db. In addition, at this time, in this one dust collection portion 191H, the extending portion 401H extends to the disc exit side in the disc circumferential direction from the projection portion 205.

As illustrated in FIG. 72, in the filter portion 55H in a state of being attached to the carrier main body 29D, the other dust collection portion 191H disposed on the disc exit side abuts the inward facing abutment surface 36Dh of the outer side pad support portion 36D in a surface contact manner in the outer surface portion 202Da and abuts the large stepped surface 36*g* in a surface contact manner in the surface portion 202Dd. In addition, the other dust collection portion 191H abuts the outward facing abutment surface 32Dh of the inner side pad support portion 32D in a surface contact manner in the outer surface portion 203Da and abuts the large stepped surface 32*g* in a surface contact manner in the surface portion 203Dd. In addition, as illustrated in FIG. 73, the other dust collection portion 191H abuts the inner circumferential abutment surface 34Dk of the outer circumferential frame portion 34D in a surface contact manner in the outward side curved surface portion 204Db and abuts the inward side flat surface 34*i* in a surface contact manner in the top surface portion 205*a*. At this time, in the other dust collection portion 191H, the curved portion 204D covers the hole 302D in its entirety on the inward side in the disc radial direction in the outward side curved surface portion 204Db. In addition, at this time, in the other dust collection portion 191H, the extending portion 401H extends to the disc entrance side in the disc circumferential direction from the projection portion 205 and abuts the extending portion 401H of the dust collection portion 191H on the disc entrance side, thereby being in a connected state with this extending portion 401H in the disc circumferential direction.

In the filter portion 55H, while having the pair of dust collection portions 191H in such a state, the position setting plate portion 193H abuts both the inward side curved surface portion 204Da and the inward side curved surface portion 401Ha of the pair of dust collection portions 191H in a surface contact manner in the outward side curved surface portion 211Hb of the curved plate portion 211H. In the position setting plate portion 193H, the attachment portion 413H engages with the first engagement hole 181 of the inner side pad support portion 31D, the attachment portion 412H engages with the first engagement hole 171 of the outer side pad support portion 35D (refer to FIG. 50), the attachment portion 414H engages with the first engagement hole 183 of the inner side pad support portion 32D, and the attachment portion 415H engages with the first engagement hole 173 of the outer side pad support portion 36D (refer to FIG. 50). Consequently, the position setting plate portion 193H is provided in the direction of the disc center axis with respect to the pair of dust collection portions 191H. In this state, the position setting plate portion 193H presses the curved portion 204D of one dust collection portion 191H against the outer circumferential frame portion 33D in a manner of coming into surface contact with the inner circumferential abutment surface 33Dk in the outward side curved surface portion 204Db and presses the curved portion 204D of the other dust collection portion 191H against the outer circumferential frame portion 34D in a manner of coming into surface contact with the inner circumferential abutment surface 34Dk in the outward side curved surface portion 204Db.

The position setting plate portion 193H positionally sets the dust collection portion 191D on the disc entrance side with respect to the carrier main body 29D. As illustrated in FIG. 72, the dust collection portion 191D on the disc entrance side positionally set by the position setting plate portion 193H abuts the outward facing abutment surface 31Dh in a surface contact manner in the outer surface portion 202Da, abuts the inward facing abutment surface 35Dh in a surface contact manner in the outer surface portion 203Da, and as illustrated in FIG. 73, abuts the inner circumferential abutment surface 33Dk in a surface contact manner in the outward side curved surface portion 204Db. In addition, the position setting plate portion 193H positionally sets the dust collection portion 191D on the disc exit side with respect to the carrier main body 29D. As illustrated in FIG. 72, the dust collection portion 191D on the disc exit side positionally set by the position setting plate portion 193H abuts the inward facing abutment surface 36Dh in a surface contact manner in the outer surface portion 202Da, abuts the outward facing abutment surface 32Dh in a surface contact manner in the outer surface portion 203Da, and as illustrated in FIG. 73, abuts the inner circumferential abutment surface 34Dk in a surface contact manner in the outward side curved surface portion 204Db. At this time, in the position setting plate portion 193H, the attachment portions 412H to 415H having a flat plate shape extend to the inward side in the disc radial direction from the curved plate portion 211H and are in a state of obliquely extending such that tip portions of the attachment portions 412H and 413H and the attachment portions 414H and 415H are separated from each other. The attachment portions 412H to 415H enter the first engagement holes 171, 181, 183, and 173 in the respective tip portions. For this reason, it is in a state of being unlikely to be detached from the carrier main body 29D.

Figure 71:
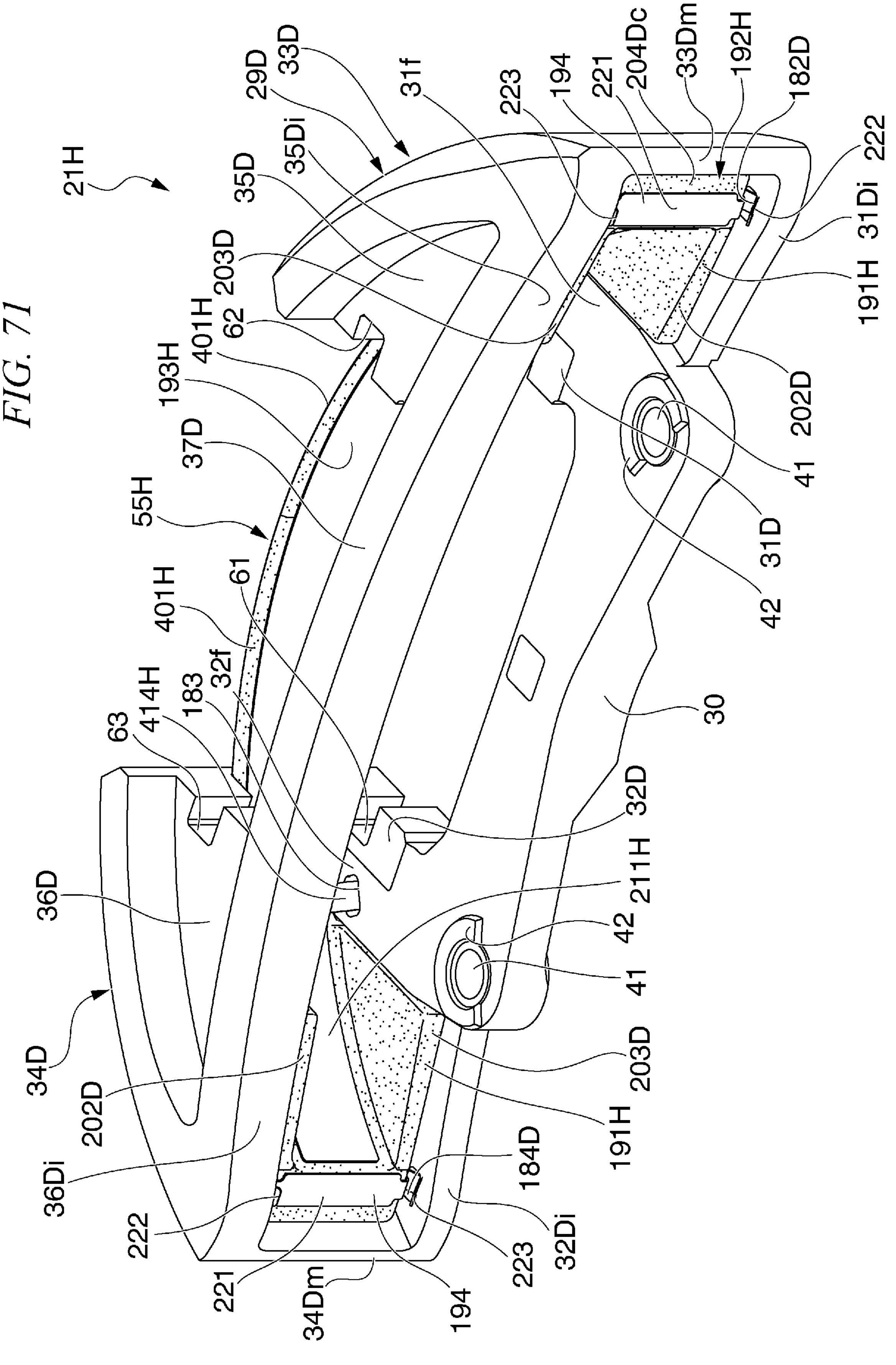
FIG. 71 is a perspective view illustrating a carrier of the disc brake of the third embodiment.

In the filter portion 55H, while having the pair of dust collection portions 191H in the positionally set state by one position setting plate portion 193H as described above, one clip-type plate portion 194 abuts the surface portion 204Dc of the dust collection portion 191H on the disc entrance side in a surface contact manner in the substrate portion 221. In this clip-type plate portion 194, as illustrated in FIG. 71, the attachment portion 222 engages with the second engagement hole 182D of the inner side pad support portion 31D, and the attachment portion 223 engages with the second engagement hole 172D of the outer side pad support portion 35D (refer to FIG. 50).

Consequently, this clip-type plate portion 194 is provided next to the dust collection portion 191H on the disc entrance side in the disc circumferential direction, specifically, on the disc entrance side. In this state, as illustrated in FIG. 73, this clip-type plate portion 194 presses the dust collection portion 191H on the disc entrance side against the outer circumferential frame portion 33D in a manner of coming into surface contact with the inward side flat surface 33*i* in the top surface portion 205*a*. Accordingly, this clip-type plate portion 194 restricts movement of the dust collection portion 191H on the disc entrance side in the disc circumferential direction positionally set in the carrier main body 29D by the position setting plate portion 193H together with the inward side flat surface 33*i*.

In addition, in the filter portion 55H, while having the pair of dust collection portions 191H in the positionally set state by one position setting plate portion 193H as described above, the other clip-type plate portion 194 abuts the surface portion 204Dc of the dust collection portion 191H on the disc exit side in a surface contact manner in the substrate portion 221. As illustrated in FIG. 71, in the other clip-type plate portion 194, the attachment portion 223 engages with the second engagement hole 184D of the inner side pad support portion 32D, and the attachment portion 222 engages with the second engagement hole 174D of the outer side pad support portion 36D (refer to FIG. 50).

Consequently, this clip-type plate portion 194 is provided next to the dust collection portion 191H on the disc exit side in the disc circumferential direction, specifically, on the disc exit side. In this state, as illustrated in FIG. 73, this clip-type plate portion 194 presses the dust collection portion 191H on the disc exit side against the outer circumferential frame portion 34D in a manner of coming into surface contact with the inward side flat surface 34*i* in the top surface portion 205*a*. Accordingly, this clip-type plate portion 194 restricts movement of the dust collection portion 191H on the disc exit side in the disc circumferential direction positionally set in the carrier main body 29D by the position setting plate portion 193H together with the inward side flat surface 34*i*.

In addition, due to the clip-type plate portion 194 on the disc entrance side and the clip-type plate portion 194 on the disc exit side, the extending portion 401H of the dust collection portion 191H on the disc entrance side and the extending portion 401H of the dust collection portion 191H on the disc exit side are connected by abutting each other in the disc circumferential direction. Accordingly, the filter portion 55H is continuously provided from the disc entrance side to the disc exit side of the carrier 21H, and the pair of dust collection portions 191H are also continuously provided from the disc entrance side to the disc exit side of the carrier 21H. In the filter portion 55H, the pair of continuously extending portions 401H are disposed at positions between the bridge portion 142 of the caliper 22 and the disc rotor 11 in the disc radial direction.

Figure 69:
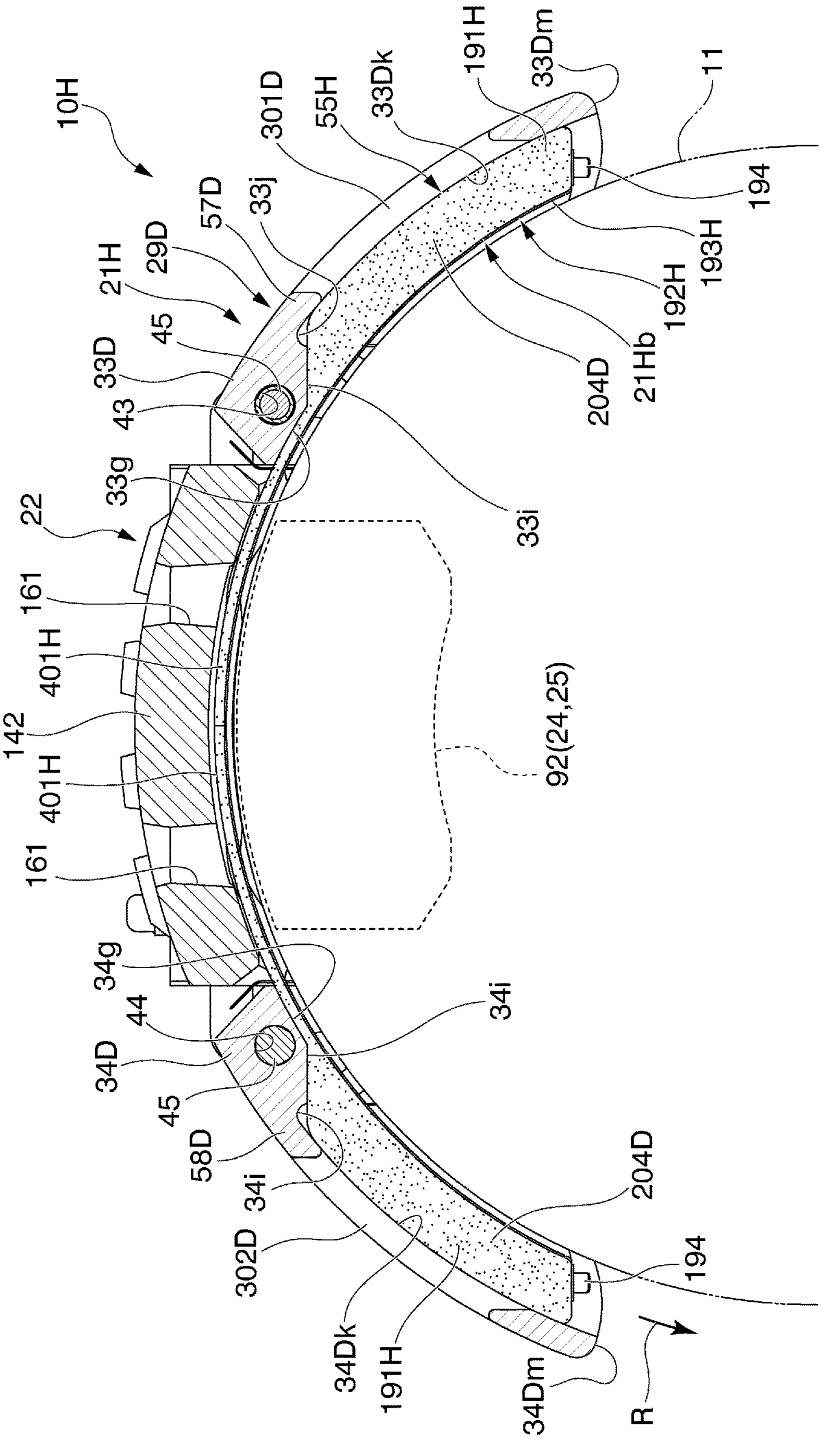
FIG. 69 is a cross-sectional view along LXIX-LXIX in FIG. 68 illustrating the disc brake of the third embodiment.
Figure 70:
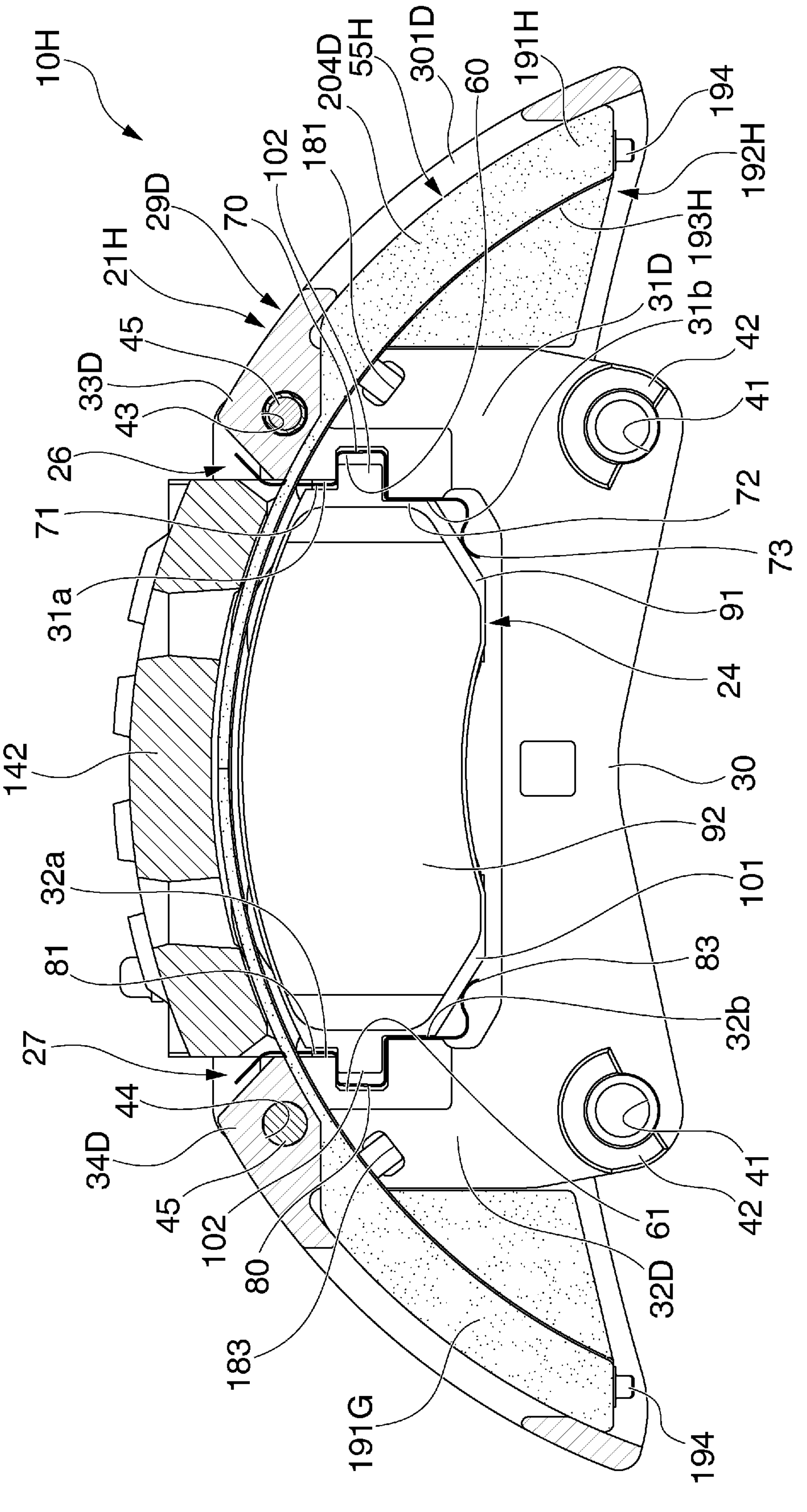
FIG. 70 is a cross-sectional view along LXIX-LXIX in FIG. 68 illustrating the disc brake of the third embodiment excluding the disc FIG. 68.

As illustrated in FIG. 72, in the carrier 21H having a constitution in which the filter portion 55H is attached to the carrier main body 29D, the inward side curved surface portions 204Da and 401Ha of a pair of dust collection portions 191D of the filter portion 55H, and the inward side curved surface portion 211Ha of the curved plate portion 211H on the inward side in the disc radial direction of the position setting plate portion 193H of the filter portion 55H constitute an inner circumferential surface 21Hb. As illustrated in FIG. 69, the inner circumferential surface 21Hb is formed along the outer circumferential edge of the disc rotor 11 on the outward side in the disc radial direction.

The filter portion 55H on this inner circumferential surface 21Hb is provided in a manner of facing the outer circumferential edge of the disc rotor 11. In other words, the carrier 21H includes the inner circumferential surface 21Hb formed along the outer circumferential edge of the disc rotor 11, and the filter portion 55H located on the inner circumferential surface 21Hb and provided in a manner of facing the outer circumferential edge of the disc rotor 11. In the filter portion 55H, the dust collection portion 191H is provided on both the disc entrance side and the disc exit side, of the carrier 21D.

In the disc brake 10H, when the vehicle is traveling forward, brake dust generated at the time of braking is captured mainly by the dust collection portion 191H provided on the side in front of the disc rotor 11 in the rotation direction from the lining 92 of the filter portion 55H, that is, the disc exit side. In addition, when the vehicle is traveling backward, brake dust is captured mainly by the dust collection portion 191H provided on the side in front of the disc rotor 11 in the rotation direction from the lining 92 of the filter portion 55H.

In the disc brake 10H of the third embodiment, the pair of dust collection portions 191H of the filter portion 55H is continuously provided from the disc entrance side to the disc exit side of the carrier 21H, brake dust can be more efficiently collected by the filter portion 55H.

First Modification Example

Figure 81:
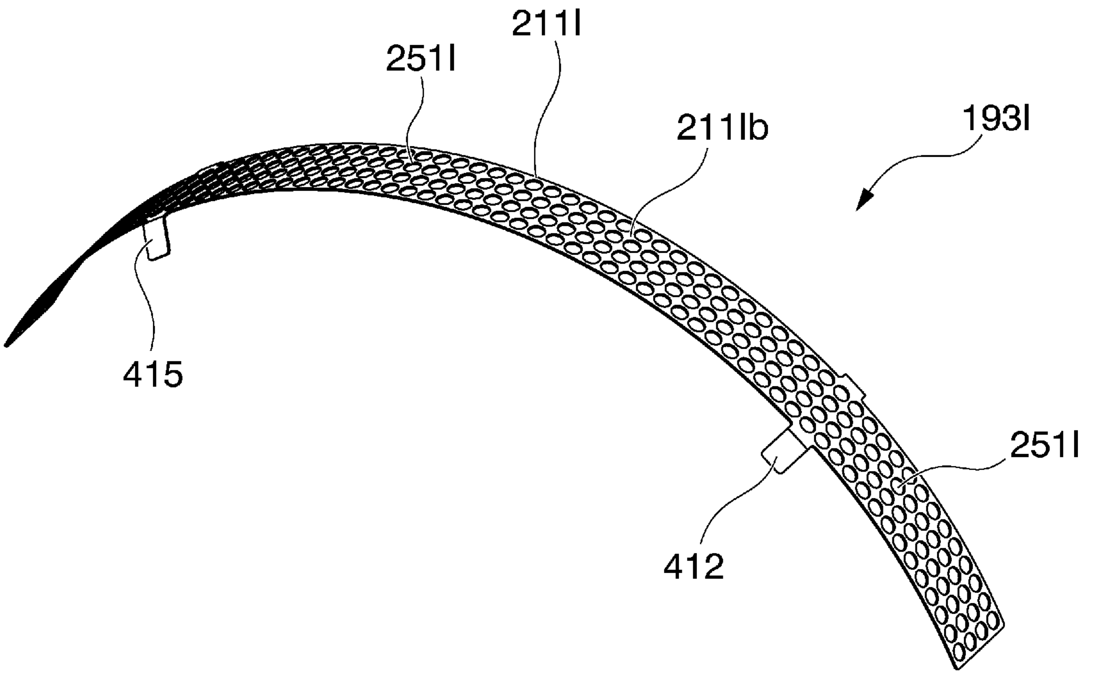
FIG. 81 is a perspective view illustrating a first modification example of a position setting plate portion of the disc brake of the third embodiment.
Figure 82:
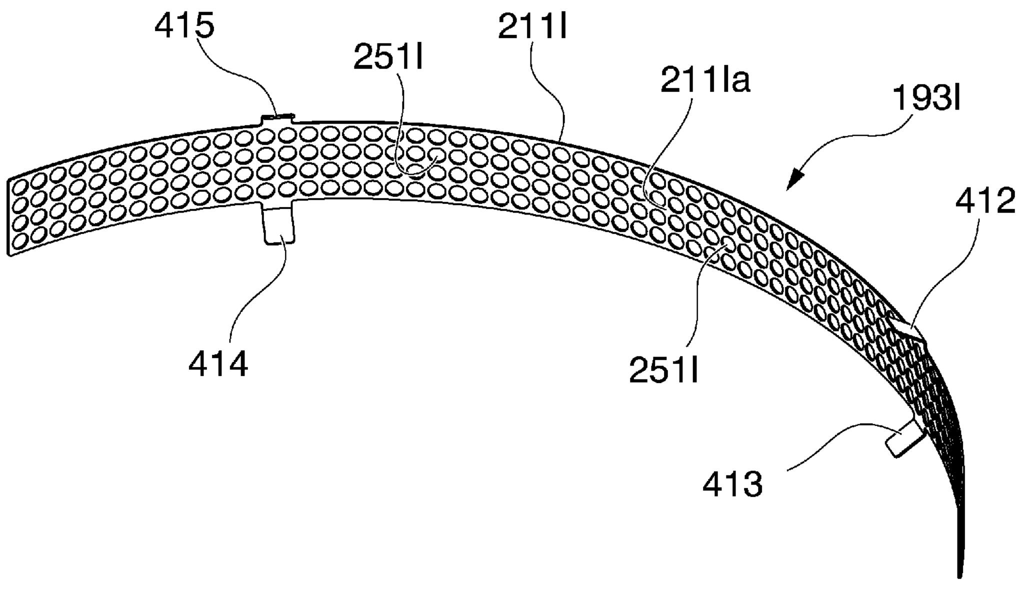
FIG. 82 is another perspective view illustrating the first modification example of the position setting plate portion of the disc brake of the third embodiment.

In the disc brake 10H of the third embodiment, in place of the position setting plate portion 193H, a position setting plate portion 193I may be provided as illustrated in FIGS. 81 and 82. This position setting plate portion 193I has a curved plate portion 211I partially differing from the curved plate portion 211H. The curved plate portion 211I differs from the curved plate portion 211H in that a plurality of holes 251I having a round hole shape penetrating the curved plate portion 211I in the plate thickness direction (radial direction) are formed in an array state. Thus, the curved plate portion 211I has an inward side curved surface portion 211Ia differing from the inward side curved surface portion 211Ha in that the plurality of holes 251I open. The curved plate portion 211I has an outward side curved surface portion 211Ib differing from the outward side curved surface portion 211Hb in that the plurality of holes 251I open. If such a position setting plate portion 193I is used, air including brake dust can be caused to favorably flow into the pair of dust collection portions 191H through the plurality of holes 251I, and therefore brake dust can be even more efficiently collected by the pair of dust collection portions 191H.

In addition, in the disc brake 10H of the third embodiment as well, in place of the clip-type plate portion 194, the clip-type plate portion 194A may be provided. If the clip-type plate portion 194A is used, air including brake dust can be caused to favorably flow to the dust collection portion 191H through the plurality of holes 252A, and therefore brake dust can be even more efficiently collected by the dust collection portion 191D.

Second Modification Example

Figure 83:
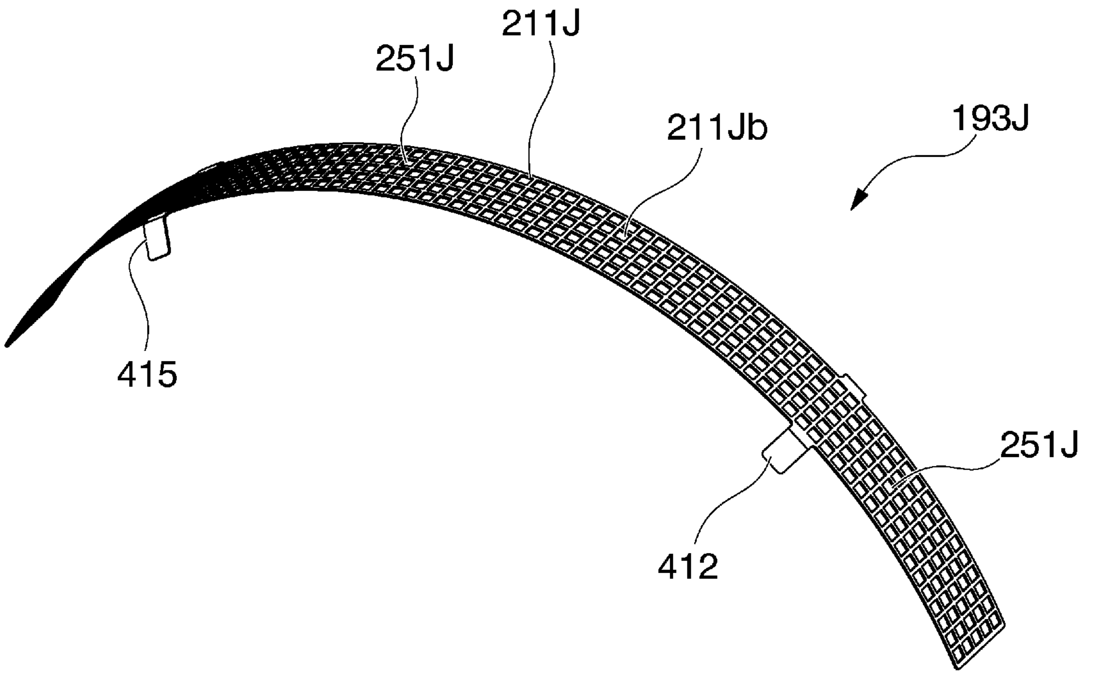
FIG. 83 is a perspective view illustrating a second modification example of a position setting plate portion of the disc brake of the third embodiment.
Figure 84:
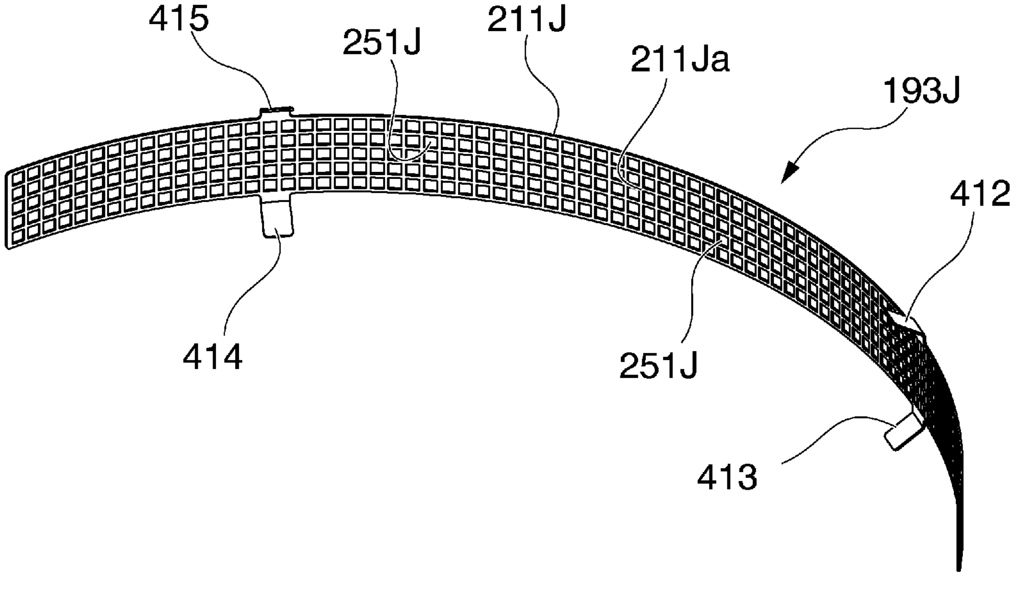
FIG. 84 is a perspective view illustrating the second modification example of the position setting plate portion of the disc brake of the third embodiment.

In the disc brake 10H of the third embodiment, in place of the position setting plate portion 193H, a position setting plate portion 193J may be provided as illustrated in FIGS. 83 and 84. This position setting plate portion 193J has a curved plate portion 211J partially differing from the curved plate portion 211H. The curved plate portion 211J differs from the curved plate portion 211H in that a plurality of holes 251J having an angular hole shape penetrating the curved plate portion 211J in the plate thickness direction (radial direction) are formed in an array state. Thus, the curved plate portion 211J has an inward side curved surface portion 211Ja differing from the inward side curved surface portion 211Ha in that the plurality of holes 251J open. The curved plate portion 211J has an outward side curved surface portion 211Jb differing from the outward side curved surface portion 211Hb in that the plurality of holes 251J open. If such a position setting plate portion 193J is used, air including brake dust can be caused to favorably flow to the pair of dust collection portions 191H through the plurality of holes 251J, and therefore brake dust can be even more efficiently collected by the pair of dust collection portions 191H.

In addition, in the disc brake 10H of the third embodiment, in place of the clip-type plate portion 194, the clip-type plate portion 194B may be provided. If the clip-type plate portion 194B is used, air including brake dust can be caused to favorably flow to the dust collection portion 191H through the holes 252B, and therefore brake dust can be even more efficiently collected by the pair of dust collection portions 191H.

In the foregoing first to third embodiments, cases in which the dust collection portion 191, 191D, or 191H is attached to the carrier main body 29 or 29D using the separate attachment plate 192, 192D, or 192H have been described as examples. Since the dust collection portion 191, 191D, or 191H is an elastic body, it is also possible to adopt a structure in which the dust collection portion 191, 191D, or 191H has a shape slightly larger than the size of an attachment part with respect to the carrier main body 29 or 29D to be held by the carrier main body 29 or 29D due to a reaction force tending to recover the original shape thereof. Accordingly, it is possible to realize a structure in which the attachment plate 192, 192D, or 192H is not used.

A disc brake (for example, the disc brake 10, 10D, or 10H) of a first aspect according to the embodiments described above includes a friction pad (for example, the friction pad 24 or 25) that is provided at a position next to a disc rotor (for example, the disc rotor 11) in a disc axial direction and provided to be able to move in the disc axial direction; and a carrier (for example, the carrier 21, 21D, or 21H) that has an inner circumferential surface (for example, the inner circumferential surface 21*b*, 21Db, or 21Hb) supporting the friction pad and formed along an outer circumferential edge of the disc rotor and a filter portion (for example, the filter portion 55, 56, 55D, 56D, or 55H) provided on the inner circumferential surface in a manner of facing the outer circumferential edge of the disc rotor. Accordingly, brake dust can be efficiently collected.

In the disc brake according to a second aspect, in the first aspect, the filter portion is provided on a disc exit side of the carrier.

In the disc brake according to a third aspect, in the first aspect, the filter portion is constituted of a dust collection portion (for example, the dust collection portion 191, 191D, or 191H) and an attachment plate (for example, the attachment plate 192, 192D, or 192H) for attaching the dust collection portion to a carrier main body (for example, the carrier main body 29 or 29D) of the carrier.

In the disc brake according to a fourth aspect, in the third aspect, the attachment plate is provided with an attachment portion (for example, the attachment portion 212, 213, 222, 223, or 412H to 415H) for attachment with respect to the carrier main body.

In the disc brake according to a fifth aspect, in the fourth aspect, the attachment plate includes a position setting plate portion (for example, the position setting plate portion 193, 193A to 193J) which positionally sets the dust collection portion and is unlikely to be detached from the carrier main body, and a clip-type plate portion (for example, the clip-type plate portion 194, 194A, or 194B) which supports the dust collection portion and is able to be detached from the carrier main body.

In the disc brake according to a sixth aspect, in the fifth aspect, the position setting plate portion is provided in a direction of a disc center axis with respect to the dust collection portion.

In the disc brake according to a seventh aspect, in the fifth aspect, the clip-type plate portion is provided next to the dust collection portion in a disc circumferential direction.

In the disc brake according to an eighth aspect, in the third aspect, the attachment plate is provided with a hole (for example, the hole 251A, 251B, 251E, 251F, 251I, or 251J).

In the disc brake according to a ninth aspect, in the third aspect, the dust collection portion is provided on both a disc entrance side and a disc exit side of the carrier.

In the disc brake according to a tenth aspect, in the first aspect, the filter portion is made up of an elastic body.

In the disc brake according to an eleventh aspect, in the first aspect, the carrier is provided with a hole (for example, the hole 301D or 302D) at a position of the filter portion.

In the disc brake according to a twelfth aspect, in the first aspect, the filter portion is made up of a first filter portion (for example, the filter portion 56 or 56D) and a second filter portion (for example, the filter portion 55 or 55D).

In the disc brake according to a thirteenth aspect, in the twelfth aspect, the first filter portion is provided on a disc exit side of the carrier.

In the disc brake according to a fourteenth aspect, in the first aspect, the filter portion (for example, the filter portion 55H) is continuously provided from a disc entrance side to a disc exit side of the carrier.

A carrier (for example, the carrier 21, 21D, or 21H) of a fifteenth aspect includes an inner circumferential surface (for example, the inner circumferential surface 21*b*, 21Db, or 21Hb) that supports a friction pad (for example, the friction pad 24 or 25) and is formed along an outer circumferential edge of a disc rotor (for example, the disc rotor 11), and a filter portion (for example, the filter portion 55, 56, 55D, 56D, or 55H) that is provided on the inner circumferential surface in a manner of facing the outer circumferential edge of the disc rotor. Accordingly, brake dust can be efficiently collected.

Shapes of the components constituting the carrier, the dust collection portion, and the disc brake are not limited to the shapes described in the foregoing embodiments.

REFERENCE SIGNS LIST

10, 10D, 10H Disc brake
11 Disc rotor
24, 25 Friction pad
21, 21D, 21H Carrier
21*b*, 21Db, 21Hb Inner circumferential surface
29, 29D Carrier main body
55, 56, 55D, 56D, 55H Filter portion
191, 191D, 191H Dust collection portion
192, 192D, 192H Attachment plate
193, 193A to 193J Position setting plate portion
194, 194A, 194B Clip-type plate portion
212, 213, 222, 223, 412H to 415H Attachment portion
251A, 251B, 251E, 251F, 251I, 251J Hole
301D, 302D Hole

The invention claimed is:

1. A disc brake comprising:
a friction pad that is provided at a position next to a disc rotor in a disc axial direction and configured to be able to move in the disc axial direction; and
a carrier that has an inner circumferential surface supporting the friction pad and formed along an outer circumferential edge of the disc rotor and a filter portion provided on the inner circumferential surface and facing the outer circumferential edge of the disc rotor,
wherein the filter portion has a dust collection portion made of an elastic body and an attachment plate made of an elastic body for attaching the dust collection portion to a carrier main body of the carrier, and
wherein the attachment plate presses the dust collection portion against the inner circumferential surface of the carrier main body to bring the dust collection portion into surface contact with the inner circumferential surface.

2. The disc brake according to claim 1,
wherein the filter portion is provided on a disc exit side of the carrier.

3. The disc brake according to claim 1,
wherein the attachment plate is provided with an attachment portion for attachment with the carrier main body.

4. The disc brake according to claim 3,
wherein the attachment plate includes:
a position setting plate portion which positionally sets the dust collection portion and is unlikely to be detached from the carrier main body, and
a clip-type plate portion which supports the dust collection portion and is able to be detached from the carrier main body.

5. The disc brake according to claim 4,
wherein the position setting plate portion is provided in a direction of a disc center axis with respect to the dust collection portion.

6. The disc brake according to claim 4,
wherein the clip-type plate portion is provided next to the dust collection portion in a disc circumferential direction.

7. The disc brake according to claim 1, wherein the attachment plate is provided with a hole.

8. The disc brake according to claim 1,
wherein the dust collection portion is provided on both sides a disc entrance side and a disc exit side of the carrier.

9. The disc brake according to claim 1,
wherein the carrier is provided with a hole at a position of the filter portion.

10. The disc brake according to claim 1,
wherein the filter portion has a first filter portion and a second filter portion.

11. The disc brake according to claim 10,
wherein the first filter portion is provided on a disc exit side of the carrier.

12. The disc brake according to claim 1,
wherein the filter portion is continuously provided from a disc entrance side to a disc exit side of the carrier.

* * * * *